United States Patent [19]
Araki

[11] Patent Number: 5,887,028
[45] Date of Patent: Mar. 23, 1999

[54] DIGITAL RECEIVER

[75] Inventor: Mikio Araki, Tokyo, Japan

[73] Assignee: Mitsubishi Denki Kabushiki Kaisha, Tokyo, Japan

[21] Appl. No.: 574,588

[22] Filed: Dec. 14, 1995

[30] Foreign Application Priority Data

Jul. 18, 1995 [JP] Japan ................................. 7-181961

[51] Int. Cl.$^6$ ....................................................... H04B 3/46
[52] U.S. Cl. .......................... 375/224; 375/316; 375/317; 329/361; 371/22.1
[58] Field of Search .................................. 375/224, 317, 375/316, 327, 340, 347; 329/315, 361; 327/22.1; 371/22.1

[56] References Cited

U.S. PATENT DOCUMENTS

| | | | |
|---|---|---|---|
| 3,879,577 | 4/1975 | Progler | 371/22.1 |
| 4,121,165 | 10/1978 | Dogliotti et al. | 329/361 |
| 4,214,213 | 7/1980 | Ferrie | 327/26 |
| 4,309,772 | 1/1982 | Kloker et al. | 375/340 |
| 4,509,180 | 4/1985 | Neyer | 375/317 |
| 5,090,026 | 2/1992 | Stern et al. | 375/296 |
| 5,323,421 | 6/1994 | LaRosa et al. | |
| 5,359,606 | 10/1994 | Lekmine et al. | 375/316 |

FOREIGN PATENT DOCUMENTS

| | | |
|---|---|---|
| 0620657A1 | 4/1994 | European Pat. Off. |
| 4309518A1 | 10/1994 | Germany. |
| 447729 | 2/1992 | Japan. |
| 447730 | 2/1992 | Japan. |
| 4-114530 | 4/1992 | Japan. |
| 5-206902 | 8/1993 | Japan. |
| 6-276113 | 9/1994 | Japan. |

*Primary Examiner*—Jason Chan
*Assistant Examiner*—Congvan Tran

[57] ABSTRACT

A digital receiver has a receiving section for receiving a digital modulated signal, a digital demodulation section for judging a logical state of a detection output signal obtained by performing a digital detection operation for the digital modulated signal, for demodulating the digital modulated signal and for generating a data signal. The digital demodulation section has a binary conversion circuit for converting the data signal into a binary signal and a receiving quality detection device for detecting a receiving quality of the data signal based on a wave-form of the binary signal. The receiving quality detection device has a pulse generator for generating pulses having a time width between a positive pulse width of the wave-form of the binary signal based on the digital modulated signal and a time width between a third time width and a time width which is obtained by subtracting a negative pulse width of the wave-form of the binary signal from a second pulse width. The digital demodulation section has a wave-form shifter for shifting the wave-form of the binary signal of the in phase, a data judgement device for judging a state of the detection output signal based on a synchronous clock signal, and an exclusive OR device for performing a logical exclusive OR operation between the wave-form of a wave-form of output from the data judgement device and a wave-form of output from the wave-form shift means.

20 Claims, 41 Drawing Sheets

| LOGIC OF TRIGGER SIGNAL (sig56) | 0 | 1 | 0 | 1 |
|---|---|---|---|---|
| LOGIC OF CLOCK SIGNAL (sig9b) | 0 | 0 | 1 | 1 |
| SELECTED OSCILLATOR | 59 | 58 | 59 | 60 |

SPECTRUM OF BASEBAND SIGNAL OF
FM MULTIPLEX BROADCASTING

FIG. 48

|  | 16bit | 190bit | 82bit |
|---|---|---|---|
| | BIC1 | DATA | PARITY |
| | BIC1 | DATA | PARITY |
| | BIC1 | DATA | PARITY |
| | ... | ... | ... |
| | BIC1 | DATA | PARITY |
| | BIC3 | DATA | PARITY |
| | BIC3 | DATA | PARITY |
| | BIC4 | PARITY | PARITY |
| | BIC3 | DATA | PARITY |
| 272 block | BIC3 | DATA | PARITY |
| | BIC4 | PARITY | PARITY |
| | BIC2 | DATA | PARITY |
| | BIC2 | DATA | PARITY |
| | ... | ... | ... |
| | BIC2 | DATA | PARITY |
| | BIC3 | DATA | PARITY |
| | BIC3 | DATA | PARITY |
| | BIC4 | PARITY | PARITY |
| | BIC3 | DATA | PARITY |
| | BIC3 | DATA | PARITY |
| | BIC4 | PARITY | PARITY |
| | ... | ... | ... |
| | BIC3 | DATA | PARITY |
| | BIC3 | DATA | PARITY |
| | BIC4 | PARITY | PARITY |

5,887,028

DIGITAL RECEIVER

BACKGROUND OF THE INVENTION

1. Field of the Invention

The present invention relates to a digital receiver such as a FM multiplex broadcast receiver used for Frequency Modulation (FM) multiplex broadcasting, and more particularly to a digital receiver for receiving a digital modulated signal which is modulated in a digital form using a digital modulation section, for demodulating the digital modulated signal to a data signal by a demodulation section, and for performing desired processes on the data signal.

2. Description of the Prior Art

FIG. 40 is a configuration diagram showing a configuration of a conventional Frequency Modulation (FM) multiplex broadcast receiver as a digital receiver for receiving a digital modulated signal used for FM broadcasting and for displaying the received data.

In FIG. 40, reference numbers 1 and 2 designate antennas for receiving electromagnetic waves propagating in space, reference number 3 denotes a diversity section for selecting one of the antennas based on a control signal (sig7a) transferred from comparator 7, a reference number 4 denotes a tuner section for selecting a desired carrier frequency, for amplifying the selected frequency, and for converting the amplified frequency into an Intermediate Frequency (IF). Reference number 5 designates a Phase Locked Loop (PLL) section for controlling the channel frequencies transmitted from broadcast stations received in the tuner section 4, reference number 6 denotes a Frequency Modulation (FM) detection section for converting the FM signal (sig4a) which has been converted with the Intermediate Frequency (IF) by the tuner section 4 into a base band signal (sig6a). The FM detection section 6 generates a stop signal (sig6b) to stop a scanning for a desired broadcast frequency during an automatic broadcast frequency selection operation and a received electric field intensity signal, namely a S meter signal (sig6b), which is a smoothed output of the intermediate frequency signal, and transmits the S meter signal (sig6b). The receive section in the conventional digital receiver shown in FIG. 40 includes the components 1 to 6 described above.

Reference number 8 denotes an analogue to digital (A/D) conversion device for the voltage value of the S meter signal (sig6b) to a digital signal in a digital form to transmit it to a control section 11. Reference number 7 designates a comparator for comparing the voltage of the S meter signal (sig6b) with a reference voltage VR1 and for transmitting a control signal (sig7a) as the comparison result of the comparison operation to the diversity section 3.

Reference number 9 denotes a digital demodulation section for selecting a multiplex transmission signal which is modulated in a digital form from the base band signal (sig6a) by the FM detection section 6, for digitally demodulating the multiplex transmission signal, and for generating a data signal (sig9a) and a synchronous clock signal (sig9b), reference number 10 designates an error correction section for performing an error correction operation based on an error correction flag in the multiplex transmission signal, and generating a data signal (sig10a) obtained after the error correction operation, and auxiliary information (sig10b) such as a synchronous establishment signal, a receive rate and the like. Reference number 11 designates the control section for performing tuning control and a data processing of received data from the error correction section 10, and for processing an operational signal as a control signal from an operation section 13 which is indicated by an operator. Reference number 12 designates a display section for displaying information based on data from the control section 11, and the reference number 13 is the operation section for receiving required data such as a tuning frequency which is selected by an operator and generating and transmitting the control data based on the selected tuning frequency and the like to the control section 11.

FIG. 41 is a drawing showing an example of an internal circuit of the digital demodulation section 9 in the conventional digital receiver shown in FIG. 40.

In the demodulation section 9 shown in FIG. 41, reference number 16 is a Band Pass Filter section for selecting the multiplex transmission signal which is modulated in a digital form in a base band signal transmitted from the FM detection section 6, reference number 17 is a binary quantization device for converting the digital modulated signal into a binary signal, reference number 18 is a delay device for delaying the binary signal (sig17) by the time period of 1 bit in order to perform a delay detection operation and generating a delayed signal (sig18), reference number 19 is an exclusive OR operation device for performing an exclusive OR operation between the binary signal (sig17) and the delayed signal (sig18), reference number 20 denotes a Low Pass Filter (LPF) for eliminating a high frequency component in the output of the exclusive OR operation device. Reference number 21 designates a data judgement device for judging of a state of the output signal from the LPF 20, and for converting this output signal into a digital wave-form and for transferring a judgement signal (sig9a) as the result of the judgement by the data judgement device 21 which is the data signal (sig9a) which is demodulated.

Reference number 23 designates a binary code quantization phase comparator for detecting a phase difference between the digital detection signal and the synchronous clock signal (sig9b) at a change point of the digital detection signal in value, and for generating a leading phase pulse (sig23a) and a delay phase pulse (sig23b). Reference number 24 denotes a sequential filter, which includes counter circuits capable of executing a digital integration operation, for performing an integration count operation to count output from the binary code quantization phase comparator 23 in order to eliminate an influence of a noise such as jitter, and for generating and transmitting a delay phase control signal (sig24a) and a leading phase control signal (sig24b). Reference number 25 denotes a fixed frequency oscillator, a reference number 26 designates a pulse addition/elimination device for adding a pulse to the output from the fixed frequency oscillator 25 when receiving the delay phase control signal (sig24a) from the sequential filter 24, and for eliminating the pulse when receiving the leading phase control signal (sig24b) from the sequential filter 24. A reference number 27 denotes a divider for dividing the output transmitted from the pulse addition/elimination device 26 into the synchronous clock signal (sig9b). Thus, a synchronous clock reproduction device 22 includes the components designated by the reference number 23–37 described above.

FIG. 42 is an example of an internal circuit of the diversity section 3 in the conventional digital receiver device shown in FIG. 40. In the diversity section 3 shown in FIG. 42, reference number 302 designates a selection device for selecting one of the output signal from the fixed frequency oscillator 301 and a ground signal based on the control signal (sig7a) from the comparator 7 and transmitting the selected one, reference number 303 designates a flip flop circuit for inverting a logical value of the current output signal from the flip flop circuit 303 when receiving a rising edge of the output signal from the selection device 302. Reference number 304 denotes a selection device for selecting one of the antennas 1 and 2 based on the output signal as a control signal from the flip flop circuit 303. Thus, the diversity section 3 includes the components designated by the reference numbers 301 to 304 described above.

Next, the operation of the diversity section 3 described above will now be explained.

Firstly, the diversity section 3 selects one of the antennas 1 and 2 based on the control signal from the comparator 7 which is also controlled based on the S meter signal (sig6b) from the FM detection section 6 and transmits a high frequency signal (sig3) which has received by the selected antenna. Because the selection device 302 in the diversity section 3 selects and transmits an output signal (sig3) from the fixed frequency oscillator 301 to the tuner section 4 when the output signal (sig7a) from the comparator 7 is a positive logical value where the voltage value of the S meter signal having the feature shown in FIG. 44 is not more than an antenna switch voltage level, the antennas 1 and 2 are switched alternately when the output signal (sig303) from the flip flop 303 is periodically changed to the positive logical value and a negative logical value. This antenna switching operation described above is continued until the control signal (sig7a) is changed to the negative logical value as the output signal from the comparator 7 until the voltage value of the S meter signal (sig6b) is more than the antenna switching level voltage and after the selection device 302 selects and transmits the ground signal, and after the output signal from the flip flop 303 is fixed in order to selects one of the antennas 1 and 2 continuously.

FIG. 43 shows an example of changing the value of the S meter signal (sig6a) and the antenna switch operation.

The tuner section 4 tunes the high frequency signal (sig3) from the diversity section 3 with a desired frequency based on the tuning voltage transmitted form the PLL section 5 and converts the desired high frequency signal in the high frequency signal (sig3) to the Intermediate Frequency signal.

The FM detection section 6 receives the Intermediate frequency signal from the tuner section 4 and performs an FM detection operation of the Intermediate frequency (IF) signal received and converts it in to a baseband signal (sig6b), and transmits the baseband signal (sig6b), the S meter signal which is obtained by rectification of the Intermediate Frequency (IF) signal, and the stop signal, indicating that the strength of the received electric magnetic field is more than a desired strength.

FIG. 43 shows an output characteristic of the stop signal to the received electric magnetic field in the conventional digital receiver shown in FIG. 40.

FIG. 44 shows an output characteristic of the S meter signal to the received electric magnetic field in the conventional digital receiver shown in FIG. 40.

The digital demodulation section 9 selects a multiplex transmission signal which is modulated in a digital form in the baseband signal (sig6a) transmitted from the FM detection section 6 and generates a digital demodulated signal (sig9a) and a synchronous clock signal (sig9b) which will be described later and transmits them.

An audio processing section 14 selects an audio signal in the baseband signal (sig6a) transmitted from the FM detection section 6 and amplifies an audio stereo signal obtained by demodulating the audio signal in stereo form and transmits the audio stereo signal to the speaker in order to drive the speaker 15.

The error correction section 10 receives the digital demodulated signal (sig9a) transmitted from the digital demodulation section 9 and performs the error correction operation for the digital demodulated signal (sig9a) by using the error correction flag in the digital demodulated signal (sig9a) and generates a data signal (sig10a) and the auxiliary information (sig10b) such as the synchronous establishing signal and the receive rate and transmits them to the control section 11.

The control section 11 receives the data signal (sig10a) from the error correction section 10 and displays the data signal (sig10a) on the display section 12 and performs several control operation such as the tuning control operation and the audio control operation.

Next, the tuning operation of the control section 11 in the conventional digital receiver shown in FIG. 40 will be explained. The tuning operation of the control section 11 relates to features of a digital receiver according to the present invention.

In the tuning control operation, the data (sig11b) indicating a tuning frequency is transmitted from the control section 11 to the PLL section 5 by using the PLL control signal (sig11b). Then the PLL section 5 generates the tuning voltage based on the data (sig11) indicating the tuning frequency. Then the tuner section 4 tunes the high frequency signal (sig3) from the diversity section 3 based on the tuning voltage.

A fully automatic selection operation for broadcast stations sequentially changes data of the tuning frequency and scans the tuning frequency and stops the scanning operation when the strength of the received electromagnetic field is more than the predetermined value by using the stop signal (sig6c) transmitted from the FM detection section 6.

Prior to explanation of the digital demodulation operation executed by the digital demodulation section 9, we will explain the basic theory about the delay detection method which is used in the conventional digital receiver shown in FIG. 40.

In general, a modulated signal is defined the following equation $$s(t)=\cos [2\pi f\, t+\Phi(t)],$$

where f is a carrier frequency of a digital modulated signal, and $\Phi(t)$ is a digital modulated component.

When the modulated signal is multiplied by a signal which is delayed by the time period of a bit and then the high frequency component in the result of the multiplication is eliminated, the sig20 is $$\text{sig20}=\cos [2\pi f\, t+\Phi(t)-\Phi(t-T)].$$

Because the term "$2\pi f\, t$" becomes $9.5\pi$ in a FM multiplex broadcasting, the above equation becomes $$\text{sig20}=\sin [\Phi(t)-\Phi(t-T)].$$

Thus, only modulated component $\Phi$ (t) in the modulated signal can be selected.

This digital modulation method used for the FM multiplex broadcasting is called the L-MSK modulation method.

This modulation method is one of the frequency modulation methods. In this modulation method, as shown in FIG. 45, the positive logical state is 80 KHz and the negative logical state is 72 KHz.

Next, the operation of the digital demodulation section 9 will be explained.

Because the baseband signal of the FM multiplex broadcasting has a spectrum structure as shown in FIG. 46, a multiplex transmission signal which is modulated in a digital form by the band-pass filter 16 is selected from the baseband signal (sig6a) transmitted from the FM detection section 6. Next, the digital modulated signal is converted into a digital signal by the binary code quantization device 17 in order to delay the digital modulated signal by the time period "T" of a bit by using the delay device including shift registers.

The exclusive OR logical output (sig19) between the digital modulated signal (sig17) which has been converted in a binary form and the signal (sig18) which is delayed by the time period "T" of a bit executed by the delay device 18 is transmitted to the data judgement device 21 through the LPF 20. Thereby the detection output signal in which a high frequency component is eliminated is obtained, as shown in FIG. 47.

The detection output signal (sig20) is judged by the data judgement device 21 in synchronization with the synchronous clock signal transmitted from the synchronous clock reproduction section 22 and the data judgement device generates the data signal (sig9a) based on the result of the data judgement operation.

The synchronous clock reproduction section 22 compares the detection output signal (sig20) with the synchronous clock signal at the rising edge or the falling edge of the detection output signal (sig20). Then, the section 22 generates the leading phase signal (sig23a) when the phase of the synchronous clock signal is ahead of the phase of the detection output signal, and generates the delay phase signal (sig23b) when the phase of the synchronous clock signal is delayed.

The sequential filter 24 in the synchronous clock reproduction section 22 includes counter circuits each of which has a function of the digital integration operation in order to decrease the influence of the noises such as jitter. Here the configuration and the operation of a typical N before M counter circuit will be explained.

The N before M counter circuit generates the delay phase control signal (sig24a) when the total number of the leading phase signals is N (where N is a positive number) and generates the leading phase control signal (sig24b) when the total number of the delay phase signals is N (where N is a positive number), until the total sum of the numbers of the leading phase signals and the delay phase signals reaches M (where M is a positive number). In addition, the N before M counter circuit is reset when the total number of the leading phase signals and the delay phase signal reaches M (where M is a positive number).

The pulse addition/elimination device 26 transmits the output from the oscillator 25 not including a pulse when the device 26 receives the delay control signal (sig24a) from the sequential filter 24. On the other hand, the pulse addition/ elimination device 26 transmits the output from the oscillator 25 including a pulse when the device 26 receives the leading control signal (sig24b) from the sequential filter 24.

The divider 27 divides the signal from the pulse addition/ elimination device 26 and generates the synchronous clock signal (sig9b). The oscillation frequency from the oscillator 25 is selected as to become a frequency that is k times of the frequency of the synchronous clock signal, and the divided rate of the divider 27 is selected as to become the 1/k of the oscillation frequency from the oscillator 25 (where k is a positive integer).

Japanese Laid-Open Patent Applications Nos. 6-276113, 4-47729, and 4-47730 discuss conventional digital receivers, such as the conventional FM multiplex broadcast receivers described above.

Since the conventional FM multiplex broadcast receiver has the configuration described above, there is no method to detect a data receiving state of the receiver other than the method wherein the data receiving state is detected by receiving the synchronous establishing signal (sig10b) to inform the establishment of the data synchronous operation for the data transmitted from the error correction section 10, or by using the data error rate obtained by the error detection operation or the error correction operation, or by using the S meter value.

There are a block synchronous establishing signal and a frame synchronous establishing signal in the synchronous establishing signal. In the use of the block synchronous establishing signal, there is a problem that there is a great time delay which is counted from the receiving of a electromagnetic wave transmitted from a broadcast station to the detection of the synchronous establishing signal because this block synchronous establishing signal is obtained based on a sequential detection of the synchronous bit by several times. Accordingly, it is difficult to use the block synchronous establishing signal as a control signal for devices such as the diversity section 3 shown in FIG. 40 where a rapid response is required.

FIG. 48 shows a data format structure used for the FM multiplex broadcasting. In the case of the FM multiplex broadcasting, since a block is made up of 272 bits, a time delay of several hundred [m sec] is caused in order to detect the establishment of the block synchronous in some case. In addition, because 16 bits in a block is used for the establishment of the block synchronous operation, there is no reliability that the synchronous bits (16 bits) is equal to the other part of the data format in receiving state such as a receiving time, as shown in FIG. 48.

Further, because the frame synchronous establishment signal is generated after receiving of the synchronous bits having a predetermined pattern, it takes more time for detecting the establishment of the frame synchronous rather than that of the block synchronous. In addition, because the receiving rate is calculated based on the number of blocks which have been uncorrected in the error correction operation, it take more times to detect the establishment of the receiving rate rather than that of the frame synchronous establishment signal.

Although, the relationship between a voltage value of the S meter signal and the receiving rate, namely the error rate can be clearly shown by using the S meter signal (sig6b), it is difficult to detect a deterioration of the data receiving state which is caused by a phase difference of multi-path even if the DU rate is increased. Accordingly, in some cases, the data receiving state cannot be detected by using the S meter signal (sig6b).

In addition, all of FM broadcast stations do not always transmit a multiplexed broadcast. Further, all of actual broadcast time periods in a FM multiplex broadcast station do not transmit the multiplexed broadcast. Accordingly, it can not be detected whether or not the multiplexed broadcasting is now ON by using the S meter signal (sig6b) or the stop signal (sig6c). In this case, when automatically selects a multiplex broadcasting, it must be detect the absence of the multiplex broadcasting by using the synchronous establishment signal and the receiving rate after selecting it based on the S meter signal (sig6b) or the stop signal (sig6c). Further, in this case, it must be check the absence of the multiplex broadcasting for a broadcast station which transmits no multiplexed broadcast. Because it takes more times in the case described above, there is a problem.

In addition, there is information to display after accumulating received data in a memory in the conventional FM multiplexed broadcast described above. Therefore, in some cases the received data can not be displayed before the completion of data accumulation even if the data receiving state is good.

Because the conventional FM multiplex broadcast receiver has the configuration described above, it is inconvenient in the conventional receiver that an operator cannot immediately know whether received data will be displayed after the completion of the data accumulation in a good data receiving state or there is no data to display in a poor data receiving state.

Moreover, because the sequential filter 24 for reducing the influence of noises such as jitter by performing an integral count operation of the output from the binary code quantization phase comparator is used in the conventional clock synchronous reproduction section 22, it is difficult to respond to a sharp phase change which is caused in the diversity section 3 by switching the antennas 1 and 2. This is also a problem.

SUMMARY OF THE INVENTION

The present invention is invented to avoid the drawbacks of such conventional digital receiver such as the FM multiplexed broadcast receiver having the structure described above.

It is an object of the present invention to provide, with consideration of the above drawbacks, a digital receiver having a simple circuit configuration which can perform a higher detection of the quality of received data.

It is another object of the present invention to provide a digital receiver having a stable synchronous clock reproduction device in operation.

It is another object of the present invention to provide a digital receiver having a diversity device which is suitable for a data receiving of a data transmission such as a FM multiplexed broadcasting.

It is another object of the present invention to provide a digital receiver which shows information regarding a state whether or not the digital receiver can receive data transmission to an operator.

It is another object of the present invention to provide a digital receiver which is capable of tuning a frequency by which transmission data can be received.

It is another object of the present invention to provide a digital receiver which is capable of storing a frequency by which transmission data can be received.

It is another object of the present invention to provide a digital receiver which is capable of optionally switching output signal from a receiving quality detection device in a digital demodulation section, a S meter signal, or a stop signal.

It is another object of the present invention to provide a digital receiver which is capable of storing values of a frequency and a strength of the received electric field of the frequency by which transmission data can be received.

It is another object of the present invention to provide a digital receiver which is capable of optionally selecting a function of tuning of a broadcast station that transmits a multiplex broadcast and a function of tuning of a broadcast station that transmits a regular broadcast.

It is another object of the present invention to provide a digital receiver which is capable of arbitrarily selecting a function of automatical selection of broadcast stations which transmit multiplex broadcasts and a function of automatical selection of broadcast stations that transmit regular broadcasts.

It is another object of the present invention to provide a digital receiver which is capable of optionally selecting a function of storing of a frequency of a broadcast station which transmits a multiplex broadcast and a function of storing of a frequency of a broadcast station which transmits a regular broadcast.

It is another object of the present invention to provide a digital receiver whose reliability of a received data quality detection is improved and increased.

It is another object of the present invention to provide a digital receiver including a received data quality detection device having a simple structure.

In accordance with one aspect of the present invention, a digital receiver comprises: a receiving section for receiving a digital modulated signal which has been modulated in digital form; a digital demodulation section for judging a logical state of a detection output signal which is obtained by performing a digital detection operation for said received digital modulated signal, for demodulating said received digital modulated signal, and for generating a data signal, said digital demodulation section comprising: binary conversion means for converting said data signal into a binary signal; and a receiving quality detection device for detecting a receiving quality of said data signal based on a wave-form of said binary signal.

Therefore, because the receiving quality detection section incorporated in the digital receiver estimates the quality of the data signal based on the wave-form of the binary signal, the estimation for the receiving quality of the received signal can be performed.

In accordance with a further aspect of the embodiment described above, said receiving quality detection device in the digital receiver comprises: pulse generation means for generating a pulse having a time width which being obtained by subtracting a positive pulse width of said wave-form of said binary signal from a first time width, a pulse having a time width which being obtained by subtracting a negative pulse width of said wave-form of said binary signal from a second time width, and a pulse having a time width which being obtained by subtracting the time widths of said pulses from a third time width, wherein said digital receiver estimates the receiving quality of said data signal based on said pulse widths of said pulses generated by said pulse generation means.

Accordingly, the digital receiver has the receiving quality detection device for estimating the receiving quality of received data based on the pulse width of the error signal obtained for comparing the error signal, which is obtained for comparing the wave-form of the binary code signal of a received digital modulated signal with the first and second pulse wave-forms, and the wave-form of a predetermined third pulse wave-form. Thereby, the estimation for the receiving quality of the received signal can be performed.

In accordance with a further aspect of the present invention, said receiving quality detection device comprises: wave-form shift means for shifting the wave-form of said binary signal of said received digital modulated signal in phase; a data judgement device for judging a state of said detection output signal based on a synchronous clock signal; and logical exclusive OR means for performing a logical exclusive OR operation between the wave-form of a wave-form of output from said data judgement device and a wave-form of output from said wave-form shift means, wherein said digital receiver estimates the receiving quality of said data signal based on said pulse width of output signal from said logical exclusive OR means.

Therefore, because the digital receiver in another preferred embodiment of the present invention includes the receiving quality detection device for estimating the receiving quality of received data based on the pulse width of error signal obtained by comparing the binary wave-form of the detection output signal and the digital demodulated wave-form of a signal which is judged base don a synchronous clock signal, the estimation for the receiving quality of the received signal can be performed.

In accordance with another aspect of the present invention, a digital receiver comprising: a receiving section for receiving a digital modulated signal which has been modulated in digital form; a digital demodulation section for detecting, judging, and demodulating said received digital modulated signal, and for generating a data signal, comprising: binary conversion means for converting said received digital modulated signal into a binary signal; 2 bit delay detection section for delaying said received digital modulated signal by 2 bit time period; and error correction section for correcting an error code in said received digital modulated signal based on output from said 2 bit delay detection section, wherein said digital receiver estimates the receiving quality of said data signal based on a number of pulses from said error correction section within a predetermined time period.

Accordingly, because the digital receiver has the receiving quality detection device for estimating the receiving quality of received data based on the number of error correction pulses in the error correction means using the 2 bit delay detection operation, the estimation for the receiving quality of the received signal can be performed.

In accordance with another aspect of the present invention, a digital receiver comprising: a receiving section for receiving a digital modulated signal which has been modulated in digital form; a digital demodulation section for detecting, judging, and demodulating said received digital modulated signal, and for generating a data signal, comprising: detection means for detecting said received digital modulated signal; trigger generation means for generating a trigger signal based on said detection output signal; a plurality of oscillators, each oscillator generating a fixed frequency; and a synchronous clock reproduction device for generating a synchronous clock reproduction signal comprising: switch means for selecting one of said plurality of oscillators based on a high level and a low level of said synchronous clock reproduction signal while said trigger signal being received; and a divider for dividing a frequency period of said synchronous clock reproduction signal based on one of said plurality of oscillators selected by said switch means.

Accordingly, because the digital receiver has the synchronous clock reproduction device for switching oscillators based on a trigger signal obtained by the wave-form of a detection output signal and a synchronous clock signal, a rapid and accurate synchronous clock can be obtained.

In accordance with another aspect of the present invention, a digital receiver comprising: a receiving section for receiving a digital modulated signal which has been modulated in digital form; a digital demodulation section for detecting, judging, and demodulating said received digital modulated signal, and for generating a data signal, comprising: first and second detection means for detecting said received digital modulated signal and for generating detection output signals; first and second trigger generation means for generating a first and second trigger signals based on wave-forms of said detection output signals; and a synchronous clock reproduction device for generating a synchronous clock reproduction signal comprising: switch means for selecting one of said plurality of oscillators based on a high level and a low level of said synchronous clock reproduction signal while said first and second trigger signal being received at the same time; and a divider for dividing a frequency period of said synchronous clock reproduction signal based on one of said plurality of oscillators selected by said switch means.

Accordingly, because the digital has the synchronous clock reproduction device for switching oscillators based on the result of a logical AND operation of a trigger signals, obtained by the detection output wave-forms of first and second detection means, and the synchronous clock signal, a rapid and accurate synchronous clock can be obtained and it can prevent an erroneous synchronous operation.

In accordance with a further aspect of the embodiment described above, said digital demodulation section further comprises: a binary conversion means for converting said received digital modulated signal into a binary signal; and a receiving quality detection device for detecting a quality of said data signal based on a wave-form of said binary signal, and said synchronous clock reproduction device further comprises a stop circuit for stopping a synchronous scanning operation for said data signal based on the output signal from said receiving quality detection device. Accordingly, because the digital receiver has the stop circuit for stopping the synchronous scanning operation of the synchronous clock reproduction device based on the output signal from the receiving quality detection device, an erroneous synchronous operation can be prevented.

In accordance with another aspect of the present invention, a digital receiver comprising: a receiving section for receiving a digital modulated signal which has been modulated in digital form; a digital demodulation section for detecting, judging, and demodulating said received digital modulated signal, and for generating a data signal, comprising: first and second detection means for detecting said received digital modulated signal and for generating detection output signals; first and second trigger generation means for generating a first and second trigger signals based on wave-forms of said detection output signals, wherein said digital receiver perform predetermined processes while said first and second trigger means generate output signals at the same time.

Accordingly, the digital receiver has the first and second trigger generation means for generating trigger signals based on the detection output wave-form from the first and second detection means. the receiving quality detection device estimates the receiving quality of the received data while the output signals from the first and second trigger generation means are generated at the same time. Thereby, the estimation for the receiving quality of the received signal can be performed.

In accordance with another aspect of the present invention, a digital receiver comprising: a receiving section for receiving a digital modulated signal which has been modulated in digital form; a digital demodulation section for detecting, judging, and demodulating said received digital modulated signal, and for generating a data signal, comprising: a receiving quality detection device for detecting a quality of said data signal; and diversity means for selecting and synthesizing received outputs from a plurality of antennas based on an output signal transmitted from said receiving quality detection device.

Accordingly, because the digital receiver has the diversity circuit for switching and synthesizing received output signals from antennas based on the output signal from the receiving quality detection device, it can control the diversity control operation with high accuracy.

In accordance with another aspect of the present invention, a digital receiver comprising: a receiving section for receiving a digital modulated signal which has been modulated in digital form; a digital demodulation section for detecting, judging, and demodulating said received digital modulated signal, and for generating a data signal, comprising a receiving quality detection device for detecting a quality of said data signal; and display means for displaying a receiving state of said data signal based on an output signal from said receiving quality detection device.

Accordingly, because the digital receiver has the display section for displaying the receiving state of the received signal based on the output signal from the receiving quality detection device, an operator can know the receiving state of the received signal.

In accordance with another aspect of the present invention, a digital receiver comprising: a receiving section for receiving a digital modulated signal which has been modulated in digital form; a digital demodulation section for detecting, judging, and demodulating said received digital modulated signal, and for generating a data signal, comprising a receiving quality detection device for detecting a quality of said data signal; and a control section for selecting a receiving frequency based on an output signal transmitted from said receiving quality detection device.

Accordingly, a broadcast frequency which can be received is automatically selected based on the output signal from the receiving quality detection device in the digital receiver, the automatic selecting operation for FM broadcast stations which can be received is rapidly performed without selecting of FM broadcast station which cannot be received.

In accordance with another aspect of the present invention, a digital receiver comprising: a receiving section for receiving a digital modulated signal which has been modulated in digital form; a digital demodulation section for detecting, judging, and demodulating said received digital modulated signal, and for generating a data signal, comprising a receiving quality detection device for detecting a quality of said data signal; and a control section for selecting a receiving frequency based on an output signal transmitted from said receiving quality detection device and for storing the selected receiving frequency into memory means.

Accordingly, because the digital receiver can store the frequency which can be received into a memory and not store frequency which cannot be received, the automatic memory storing operation for storing only the frequency which may be received, namely automatic memory storing operation (auto-memory operation) can be performed immediately.

In accordance with a further aspect of the embodiment described above, said control section stores the selected receiving frequency and an intensity of electric field of the selected receiving frequency based on the output signal transmitted from said receiving quality detection device.

Accordingly, the digital receiver stores a frequency which can be received based on the output signal from the receiving quality detection device and the intensity of the receiving electric field of this frequency. In a relay tuning operation for scanning another frequency when the receiving state of the current frequency becomes poor, it can be performed to search the frequency which can be received and the electric field strength of this frequency. In addition, because the frequency which can be received is stored in the memory, the frequency for the tuning operation can be selected by using the stored frequency even if the receiving state of the current frequency becomes poor. Therefore a rapid relay tuning operation for the frequency which will be received can be performed smoothly.

In accordance with a further aspect of the embodiment described above, said control section has a function for optionally switching between a function for readout of the frequency which is stored in the memory means based on the output signal from said receiving quality detection device and a function for readout of the frequency which is stored in the memory means based on the intensity of said receiving electric field.

Accordingly, the digital receiver has the function for selecting at will one of the frequencies stored in a memory based on the receiving quality detection device and the frequency stored in the memory based on the strength of the receiving electric field. Thereby, an operator can select either the regular FM broadcast or the multiplex broadcast based on his request. The frequency, which is transmitting information which the operator wants, can be optionally selected.

In accordance with a further aspect of the present invention, said control section has a function for optionally switching between a function for selecting a receiving frequency based on the output signal from said receiving quality detection device and a function for selecting a receiving frequency based on the intensity of said receiving electric field.

Accordingly, the digital receiver has the function for optionally switching one of the automatic broadcast frequency selection functions based on the output signal from the receiving quality detection device and based on the intensity of the receiving electric field of the received signal. Thereby, the automatic broadcast selection function is selected based on the intensity signal of the receiving electric field of the received signal when an operator wants to select the regular FM broadcast and the automatic broadcast selection function is selected based on the output signal from the receiving quality detection device when an operator wants to select the multiplexed broadcasting. The frequency which is transmitting information which the operator wants can be optionally selected.

In accordance with a further aspect of the embodiment described above, said control section has a function for optionally switching between a function for storing a receiving frequency into the memory means based on the output signal from said receiving quality detection device and a function for selecting a receiving frequency into the memory means based on the intensity of said receiving electric field.

Accordingly, because the digital receiver has the function for optionally switching one of the automatic broadcast frequency selection functions based on the output signal from the receiving quality detection device and the automatic broadcast frequency selection function based on the intensity of the receiving electric field of the received signal, the frequency which is transmitting information which the operator wants can be automatically stored.

In accordance with another aspect of the present invention, a digital receiver comprising: a receiving section for receiving a digital modulated signal which has been modulated in digital form; a digital demodulation section for detecting, judging, and demodulating said received digital modulated signal, and for generating a data signal, comprising: a binary conversion means for converting said received digital modulated signal into a binary signal; and a receiving quality detection device for detecting a quality of said data signal based on a wave-form of said binary signal, a Frequency Modulation (FM) detection section for generating a stop signal used for stopping a scanning operation of a receiving electric field strength signal and an frequency which are outputs from a smoothed signal of an intermediate frequency signal; switching means for switching between the output signal from said receiving quality detection device and the receiving electric field strength signal or the stop signal; and a control section for controlling the switching operation of said switching means.

Accordingly, because the digital receiver includes the switch circuit for switching the output signal from the receiving quality detection device and the receiving electric field intensity signal or the stop signal, the device and circuit of the present invention can be incorporated into a digital receiver without adding an input port.

In accordance with a further aspect of the embodiment described above, said control section performs predetermined processes based on the output signal from said receiving quality detection device and receiving electric field strength signal and based on the output signal from said receiving quality detection device and receiving electric field strength signal or said stop signal.

Accordingly, because the digital receiver performs predetermined processes based on the output signal from the receiving quality detection device and the receiving electric field intensity signal or the stop signal, the estimation for the receiving quality of the received signal can be performed with high accuracy.

In accordance with a further aspect of the embodiment described above, said digital demodulation section further comprises: a smoothing circuit for smoothing the output signal from said receiving quality detection device; and an amplifier device for amplifying the smoothed signal from said smoothing circuit, wherein said digital receiver performs predetermined processes based on the smoothed signal from said smoothing circuit and based on the amplified signal from said amplifier device.

Accordingly, the digital receiver has a smoothing circuit for smoothing the output signal from the receiving quality detection device. Thereby, the quality of the received signal can be explained by a voltage value, like the case of the receiving electric field intensity signal and the stop signal. Therefore the system control operation based on the quality of received signal can be easily performed.

In accordance with a further aspect of the embodiment described above, said digital receiver further comprises: a plurality of said receiving quality detection devices, wherein said digital receiver synthesizes output signals from the plurality of said receiving quality detection devices and performing predetermined operations based on the result of the synthesizing operation.

Accordingly, because said digital receiver has the configuration in which predetermined processes are performed based on the synthesizing output signal among the output signals from the plurality of the receiving quality detection devices, the estimation for the receiving quality of the received signal can be performed with high accuracy.

In accordance with a further aspect of the embodiment described above, said digital receiver further comprises: a plurality of comparators for comparing output signals from the plurality of said receiving quality detection devices with a plurality of reference voltages; and logical OR means for performing a logical OR operation between comparing results transmitted from the plurality of said comparators, wherein output from said logical OR means is transmitted to said diversity section and said control section.

Accordingly, the digital receiver has the comparators for comparing the plurality of output signal from the plurality of receiving quality detection devices with the plurality of reference voltages. In addition, the logical OR operation is performed by the logical OR device among the comparison signals from the plurality of comparators and the result of the logical OR operation is transmitted to the control section in addition to the diversity section. Thereby a high accuracy control operation can be executed. Further, because the reference voltages are commonly used for plurality of systems and devices in the digital receiver, the circuit scale can be reduced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 48 is a configuration diagram showing a configuration of a data format used for a FM multiplex broadcasting.

DESCRIPTION OF THE PREFERRED EMBODIMENTS

With reference to the accompanying drawings, preferred embodiments of a digital receiver such as a Frequency Modulation (FM) multiplex broadcast receiver according to the present invention will be described in detail.

EMBODIMENT 1

Figure 1:
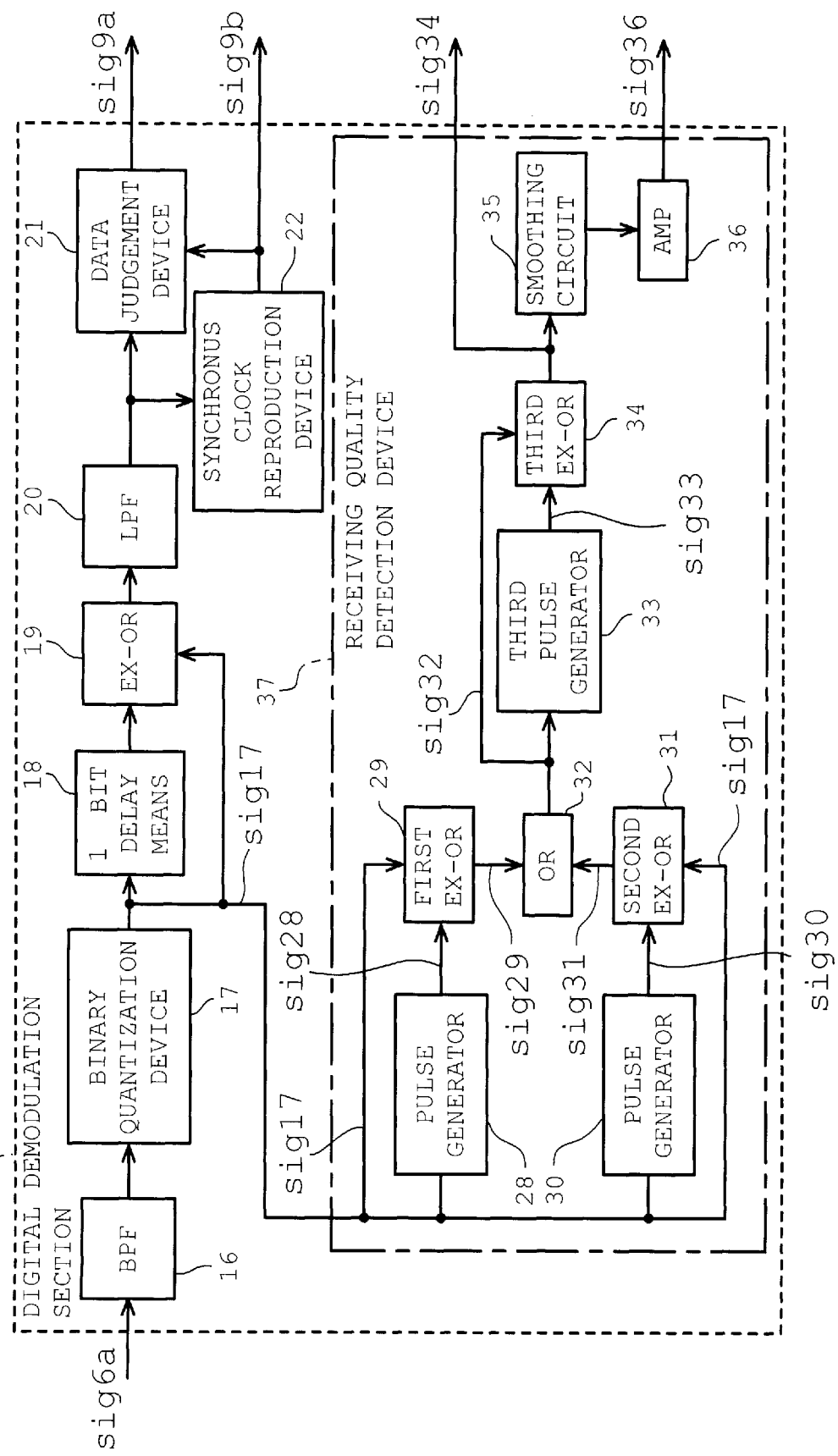
FIG. 1 is a diagram showing a configuration of a digital demodulation section in a digital receiver according to the present invention.

FIG. 1 is a diagram showing a configuration of a digital demodulation section 100 in a digital receiver such as a FM multiplex broadcast receiver according to a preferred embodiment 1 of the present invention.

Figure 41:
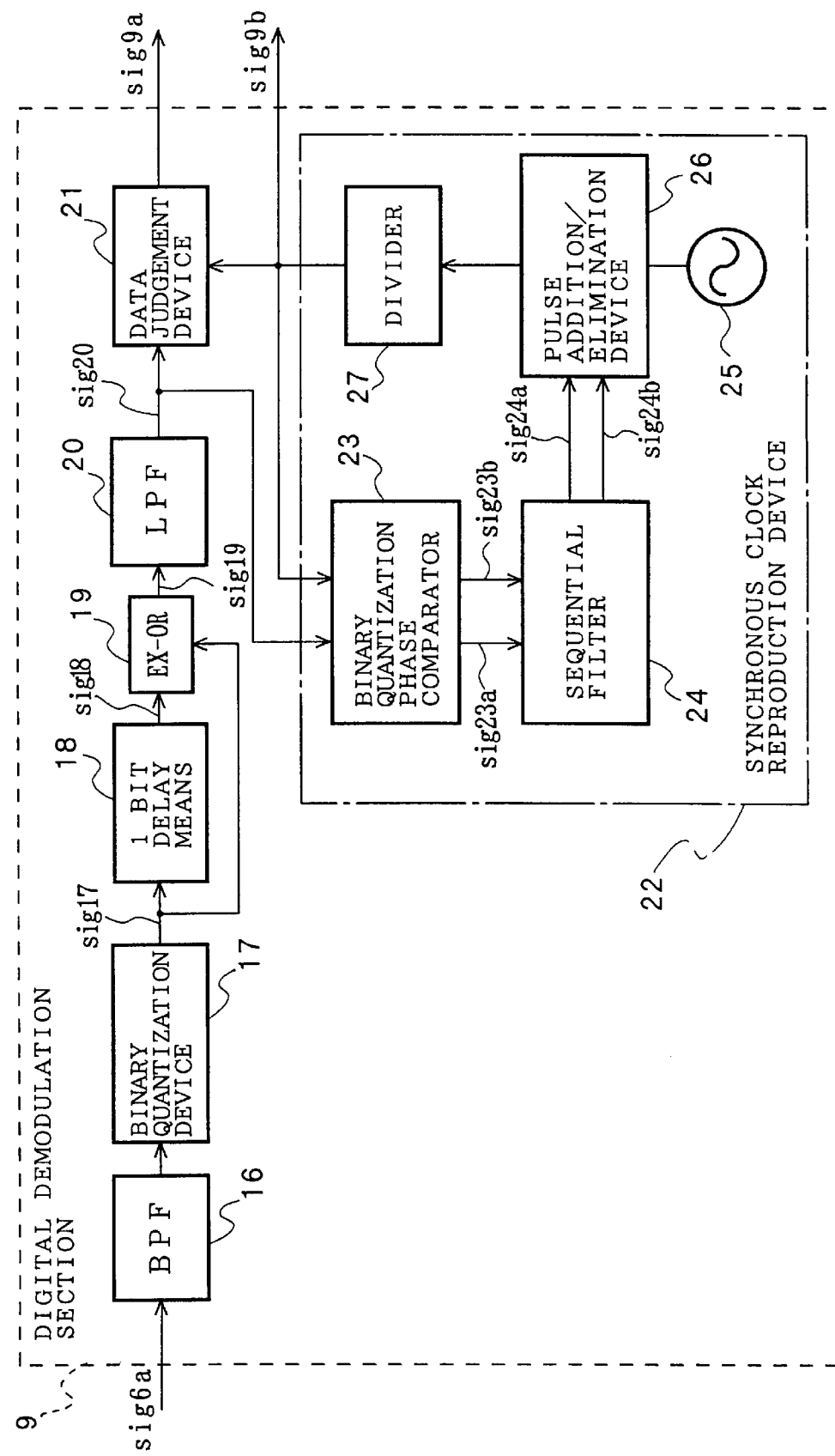
FIG. 41 is a block diagram showing a configuration of a digital demodulation section in the conventional FM multiplex broadcast receiver.
Figure 42:
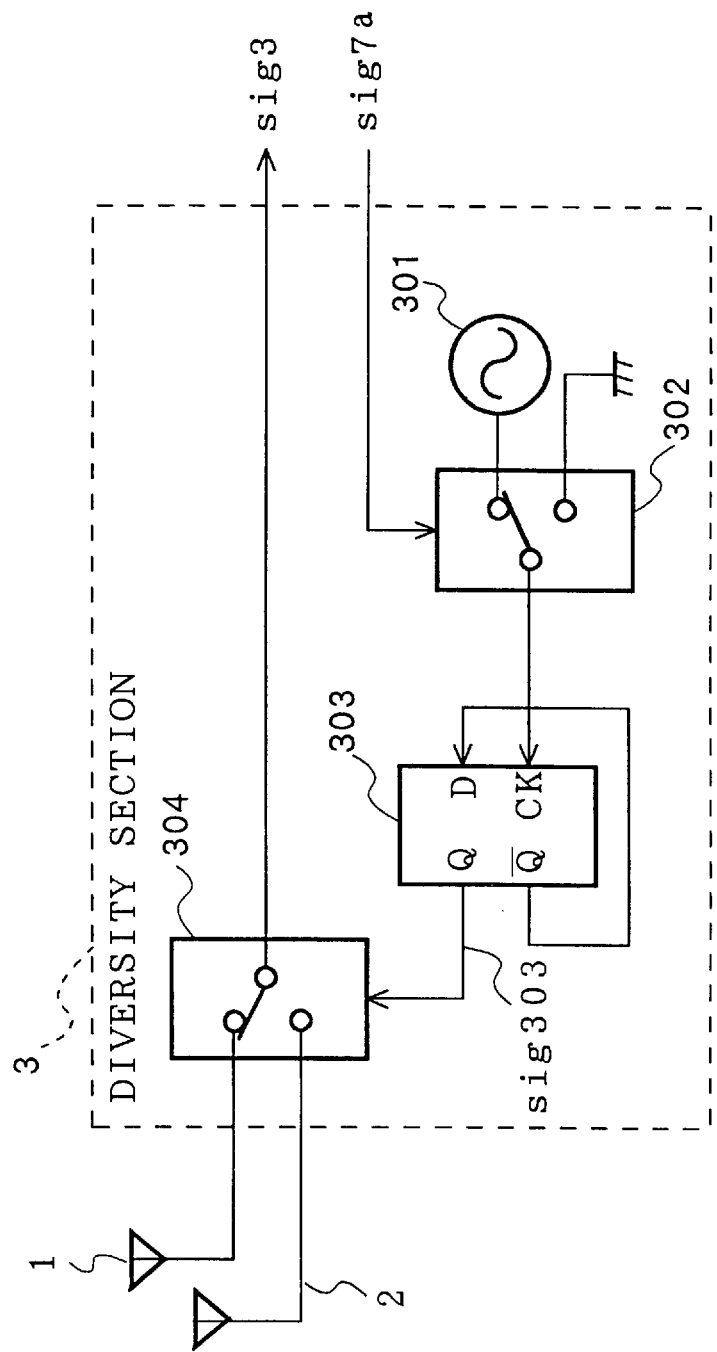
FIG. 42 is a block diagram showing a configuration of a diversity section in the conventional FM multiplex broadcast receiver shown in FIG. 40.
Figure 43:
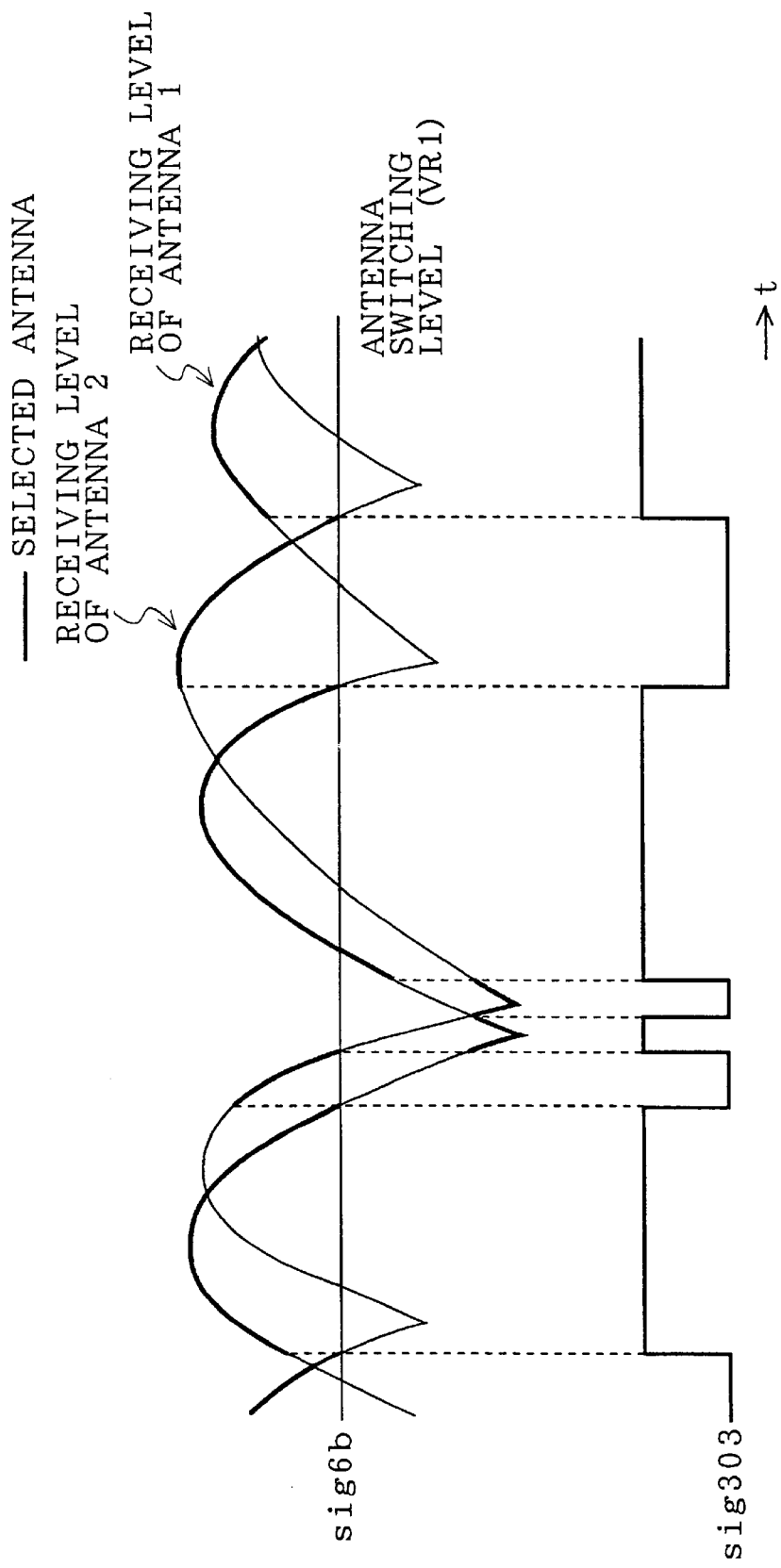
FIG. 43 is a wave-form diagram for explaining an operation of the diversity section in the conventional FM multiplex broadcast receiver shown in FIG. 40.
Figure 44:
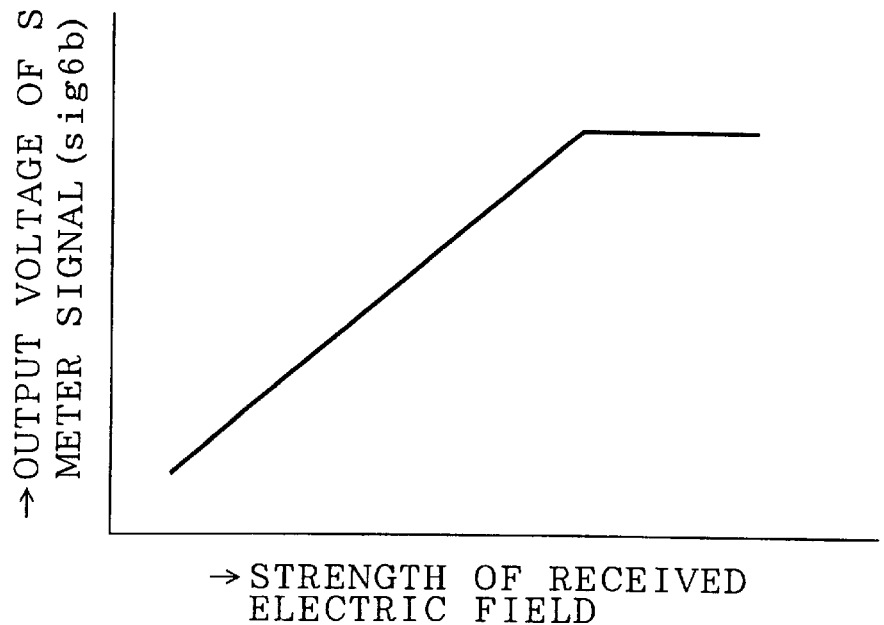
FIG. 44 is a diagram showing a characteristics of a S meter signal output in the conventional FM multiplex broadcast receiver shown in FIG. 40.
Figure 45:
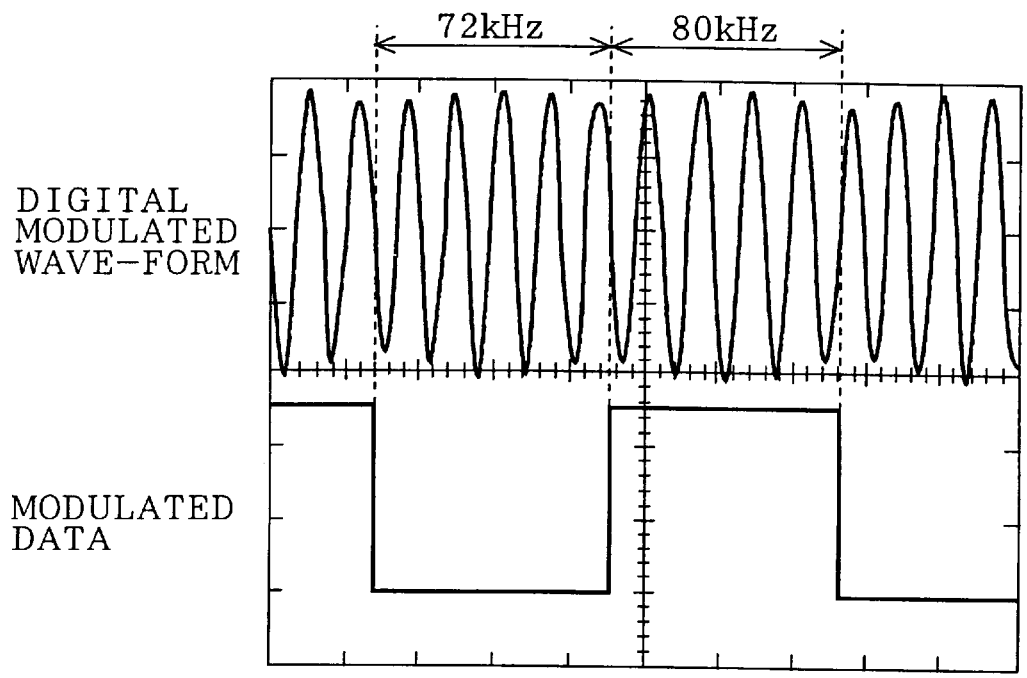
FIG. 45 is a wave-form diagram showing a digital modulation wave-form in a FM multiplex broadcasting.
Figure 46:
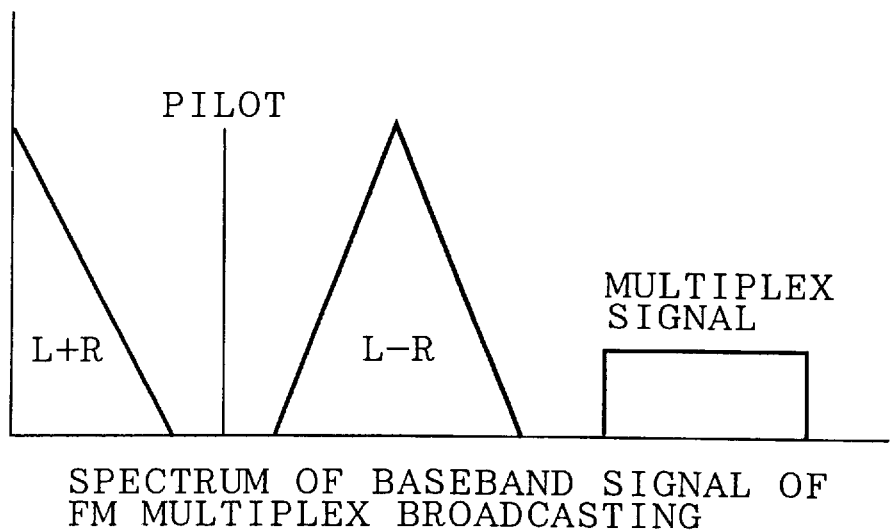
FIG. 46 is a diagram showing a spectrum of a baseband signal of a FM multiplex broadcasting.
Figure 47:
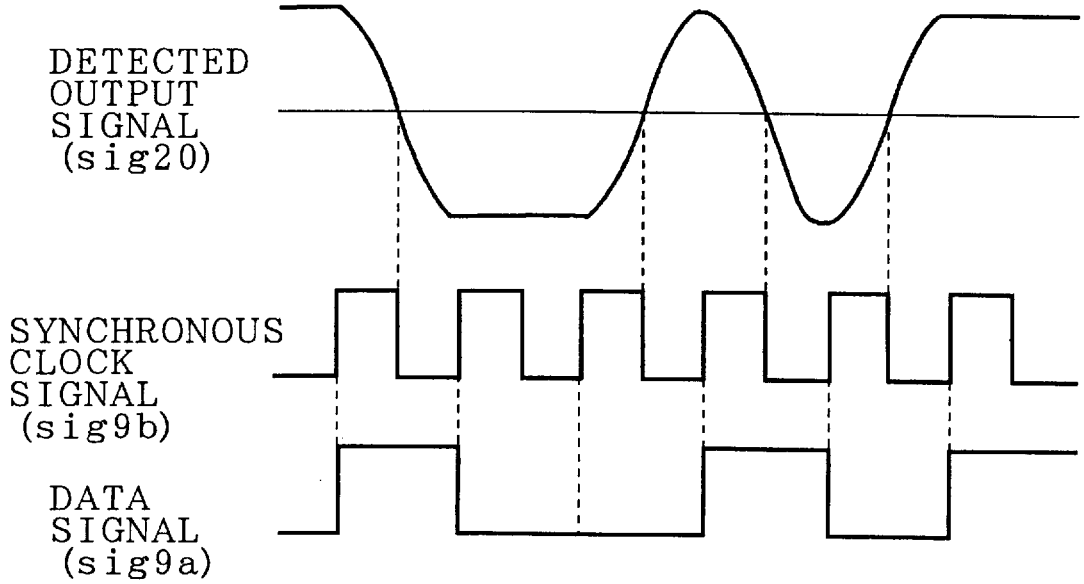
FIG. 47 is a wave-form diagram for explaining an operation of a digital demodulation section in the conventional FM multiplex broadcast receiver shown in FIG. 40.

In FIG. 1, some components in the digital demodulation section of the embodiment 1 according to the present invention which are the same as the digital demodulation section as shown in FIG. 41 in configuration and function are referenced with the same reference numbers as the conventional digital demodulation section shown in FIG. 41 and an explanation of them is omitted.

In the digital demodulation section shown in FIG. 1, reference number 28 designates a first pulse generation device for receiving a binary digital modulation wave-form (sig17) transmitted from the binary quantization device 17, for detecting a rising edge of this binary digital modulation wave-form, and for generating a positive pulse (sig28). Reference number 29 is a first logical exclusive OR device for performing a logical exclusive OR operation between a binary digital modulation wave-form (sig17) generated by the binary quantization device 17 and a pulse wave-form (sig28) generated by the pulse generator 28, and for transmitting the result (sig19) of the logical exclusive OR operation. Reference number 30 denotes a second pulse generator for receiving a binary digital modulation wave-form (sig17) transmitted from the binary quantization device 17, and for detecting a rising edge of this binary code digital modulation wave-form, and for generating a negative pulse (sig30). Reference number 31 denotes a second logical exclusive OR (EX-OR) device for performing a logical exclusive OR operation between the binary digital modulation wave-form (sig17) transmitted from the binary quantization device 17 and the pulse wave-form (sig30) generated by the second pulse generator 30 and for generating the result of the logical exclusive OR operation. Reference number 32 designates a logical OR device for performing a logical OR operation between both of the results of the logical exclusive OR operation executed by the logical exclusive OR devices 29 and 32, and for generating the result of the logical OR operation. Reference number 33 denotes a third pulse generator for detecting a rising edge of the output wave-form transmitted from the logical OR device 32 and for generating a positive pulse (sig33). Reference number 34 designates a logical exclusive OR device for performing a logical exclusive OR operation between the output wave-form from the logical OR device 32 and the pulse wave-form from the third pulse generator 33 and for generating the result of the logical exclusive OR operation. Reference number 35 designates a smoothing circuit for smoothing the output signal (sig34) from the third logical exclusive OR device 34 and for generating a smoothed signal. Reference number 36 is an amplifier for amplifying the output signal from the smoothing circuit 35 and for generating the amplified signal (sig36). The receiving quality detection device 37 in the digital demodulation section 100 comprises the configuration elements 28 to 36 described above.

A digital modulation wave-form used in a FM multiplex broadcasting is based on a frequency modulation method. The positive logical state of the digital modulation wave-form is modulated by using a 80 kHz and the negative logical state is modulated by using a 72 kHz.

Thus, when a digital modulated signal is received, the binary quantization device 17 generates either a rectangular output waveform (sig17) of 80 kHz or a rectangular output wave-form (sig17) of 72 kHz.

The digital demodulation section 100 of embodiment 1 estimates a receiving quality by detecting a difference between the rectangular output wave-form (sig17) and the wave-form of 80 kHz or the wave-form of 72 kHz.

Figure 2:
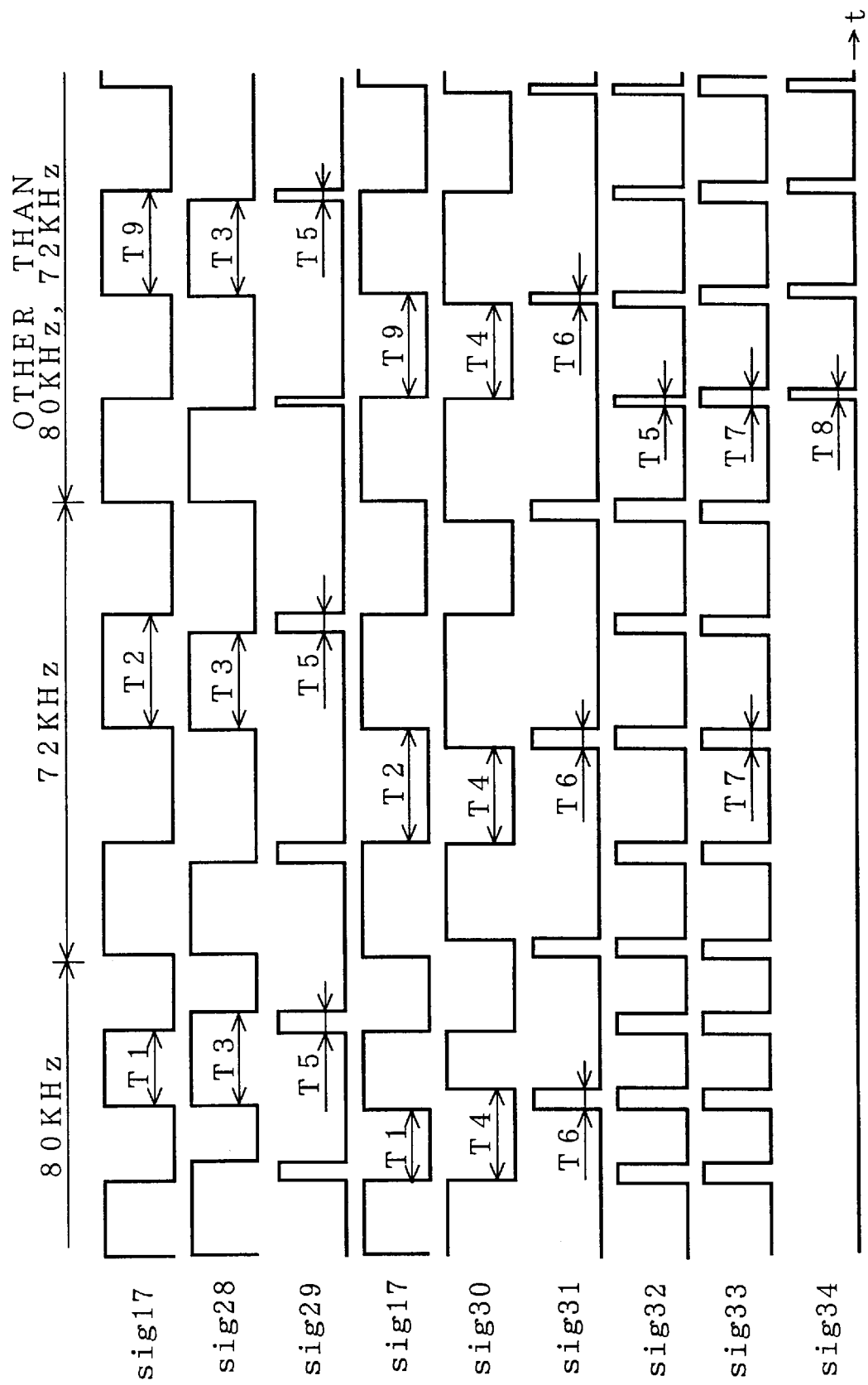
FIG. 2 is a diagram showing wave-forms of operations of a receiving quality detection section in the digital demodulation section shown in FIG. 1.

Because the output wave-form of the binary quantization device 17 is either the rectangular wave-form of 80 kHz or 72 kHz described above, as shown in FIG. 2, when the pulse width of the rectangular wave-form of 80 kHz is T, the pulse width of the rectangular wave-form 72 kHz is T2, the pulse width of the output wave-form (sig28) from the first pulse generator 28 is T3, the pulse width of the output wave-form (sig30) from the second pulse generator 30 is T4, and the pulse widths T3 and T4 are selected as:

$T3=(T1+T2)/2,$ $T4=(T1+T2)/2,$ the output wave-forms (sig29 and sig31) from the first logical exclusive OR device 29 and the second logical exclusive OR device 31 become a wave-form as shown in FIG. 2.

When the pulse width of the output wave-form (sig29) from the first logical exclusive OR device 29 is T5, and the wave-form of 80 kHz is received, T5 is given by:

$T5=|T1-(T1+T2)/2|=|(T1-T2)/2|.$

In addition, when the wave-form of 72 kHz is received, T5 is given by:

$T5=|T2-(T1+T2)/2|=|(T2-T1)/2|.$

In this case, $|(T1-T2)/2|=|(T2-T1)/2|.$

Therefore, in both cases of the wave-form of 80 kHz and 72 kHz, the same pulse with of the output wave-form (sig29) from the first logical exclusive OR device 29 can be obtained.

Further, when the pulse width of output wave-form of the second logical exclusive OR device 31 is T6, just as the pulse width T5 described above, the pulse width T6 of the output wave-form (sig31) from the second logical exclusive OR device 31 becomes the same pulse width even if the wave-form of either the 80 kHz or the 72 kHz is received.

Because the output wave-form (sig29) from the first logical exclusive OR device 29 is obtained based on the positive pulse width of the output wave-form (sig17) from the binary quantization device 17 and the output wave-form (sig31) from the second logical exclusive OR device 31 is obtained based on the negative pulse width of the output wave-form (sig17) from the binary quantization device 17, the output form the logical OR device 32 has a pulse width which is based on both of the positive pulse width and the negative pulse width of the output wave-form (sig17) from the binary quantization device 17.

The pulse width of the output wave-form (sig33) from the third pulse generator 33 is T7, and the T7 is selected as:

$T7=|(T1-T2)/2|,$ when the wave-form of either 80 kHz or 72 kHz is received, the pulse width T8 of the wave-form (sig34) from the third logical exclusive OR device 34 is given by:

$T8=|T5-T7|=0$ or $T8=|T6-T7|=0.$

Thus, the output wave-form (sig34) from the third exclusive OR device 34 can be eliminated, as shown in FIG. 2.

When noises are overlapped into a received wave-form, a phase delay from the wave-form of 80 kHz or 72 kHz is caused. In this case, the pulse width of the output wave-form (sig17) from the binary quantization device 17 has a phase delay which is delayed from the pulse width T1 of the rectangular wave-form of 80 kHz or the pulse width T2 of the rectangular wave-form of 72 kHz.

Now, when the pulse width of the received signal which is converted in a binary code binarized by the binary quantization device 17 is T9, T5 is given by:

$T5=|T9-(T1+T2)/2|.$

Therefore the pulse width T8 of the wave-form (sig34) from the third logical exclusive OR device 34 which is obtained based on T5 is given by:

$T8=|T5-T7|=||T9-(T1+T2)/2-(T2-T1)/2|.$ (1) When T9≧(T1+T2)/2, T8 is given by:

$$T8 = |T9 - (T1 + T2)/2 - (T2 - T1)/2|$$
$$= |T9 - T2|$$

(2) When T9≧(T1+T2)/2, T8 is given by:

$$T8 = |(T1 + T2)/2 - T9 - (T2 - T1)/2|$$
$$= |T1 - T9|$$

Accordingly, based on the above discussion, the pulse width T8 of the wave-form (sig34) from the third logical exclusive OR device 34 is equal to the pulse width having a smaller error difference between the pulse width of the output wave-form (sig17) from the binary quantization device 17 and either the pulse width of the output wave-form of 80 kHz or the pulse width of 72 kHz. Therefore, the quality of the received signal can be estimated by using the pulse width T8.

In addition, a voltage value corresponding to the pulse width T8 can be generated as the output signal (sig35) from the smoothing circuit 35 by smoothing the output signal (sig34) from the third logical exclusive OR device 34.

Figure 3:
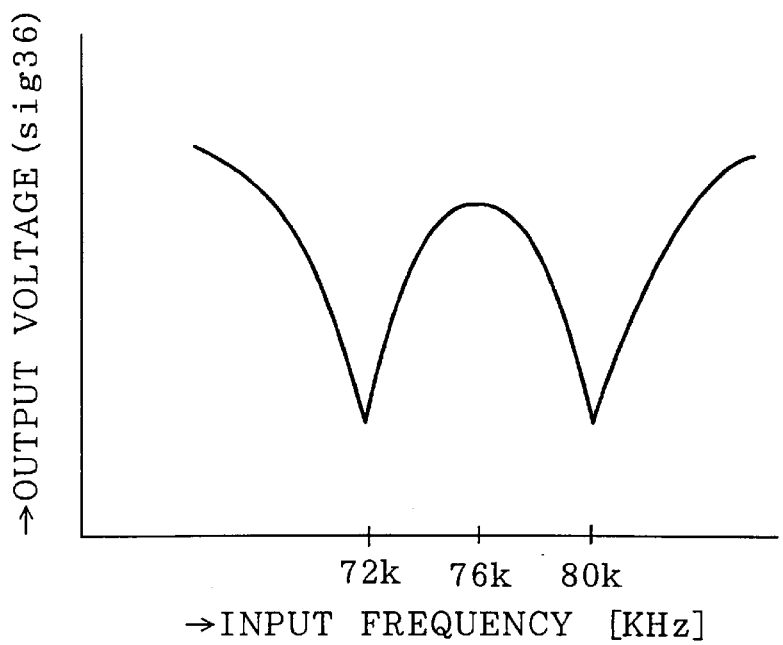
FIG. 3 is a diagram showing characteristics of an input frequency and an output signal in the case that the receiving quality detection device in the digital demodulation section shown in FIG. 1 receives a single frequency.

FIG. 3 is a diagram showing characteristics of voltage of the output signal (sig35) from the smoothing circuit 35 when the digital demodulation section 100 shown in FIG. 1 receives a sine wave of a single frequency. In this case, as shown in FIG. 3, the value of the output voltage (sig36) from the amplifier 36 has the lowest value when the input frequency is 80 kHz or 72 kHz.

Figure 4:
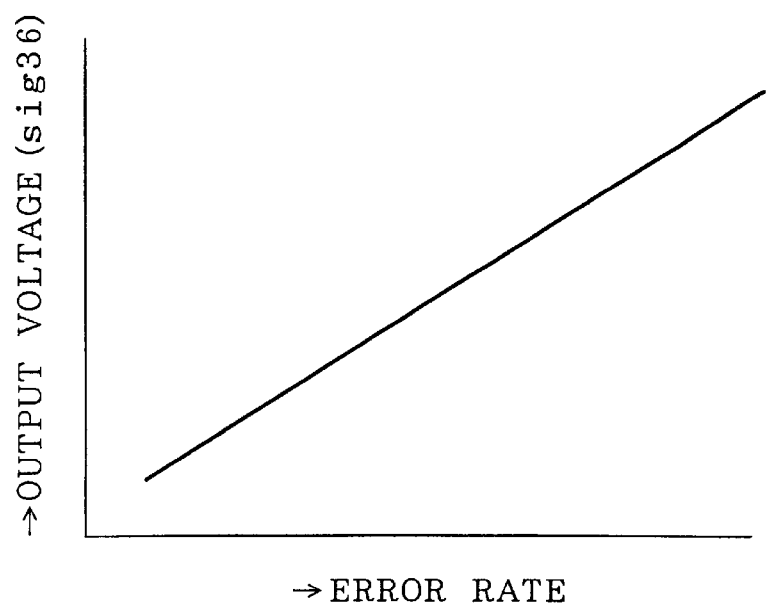
FIG. 4 is a diagram showing a characteristics of an error rate and an output signal when the receiving quality detection device in the digital demodulation section shown in FIG. 1 receives actual data.

FIG. 4 is a diagram showing the relationship between an error rate and the output signal (sig36) from the amplifier device 36 when actual data is received by the circuit having the configuration of the digital demodulated section shown in FIG. 1.

As clearly shown in FIG. 4, when the error rate is small, in other words the quality of the received signal is good, the output voltage (sig36) from the amplifier 36 becomes lower. On the other hand, when the error rate is high, in other words the quality of the received signal is poor, the output voltage (sig36) from the amplifier 36 becomes high.

Figure 5:
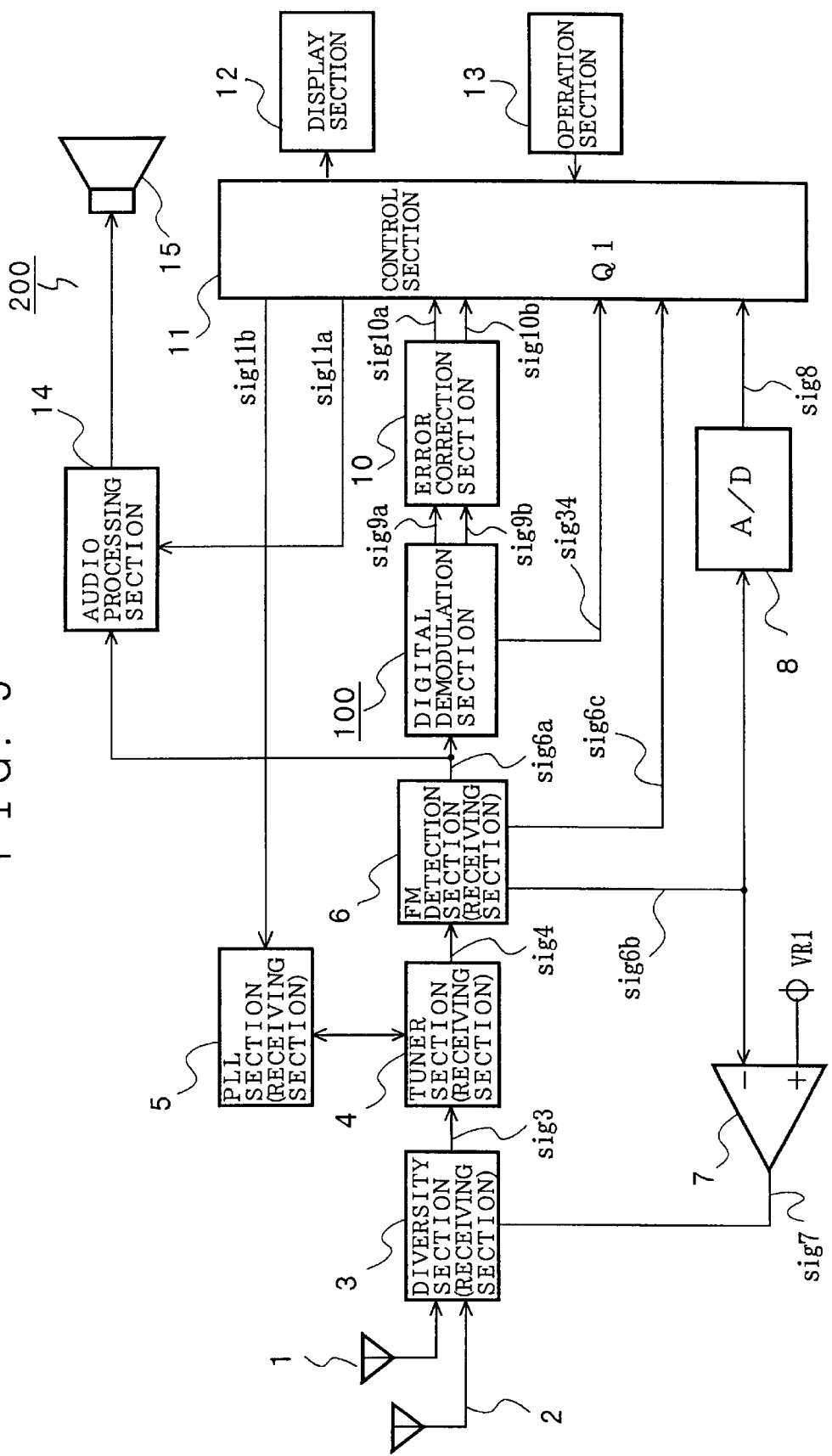
FIG. 5 is a block diagram showing a configuration of a digital receiver including the digital demodulation section shown in FIG. 1 of the preferred embodiment 1 according to the present invention.

FIG. 5 is a configuration diagram of a digital receiver 200 incorporating the digital demodulation section 100 of the embodiment 1 shown in FIG. 1.

Figure 40:
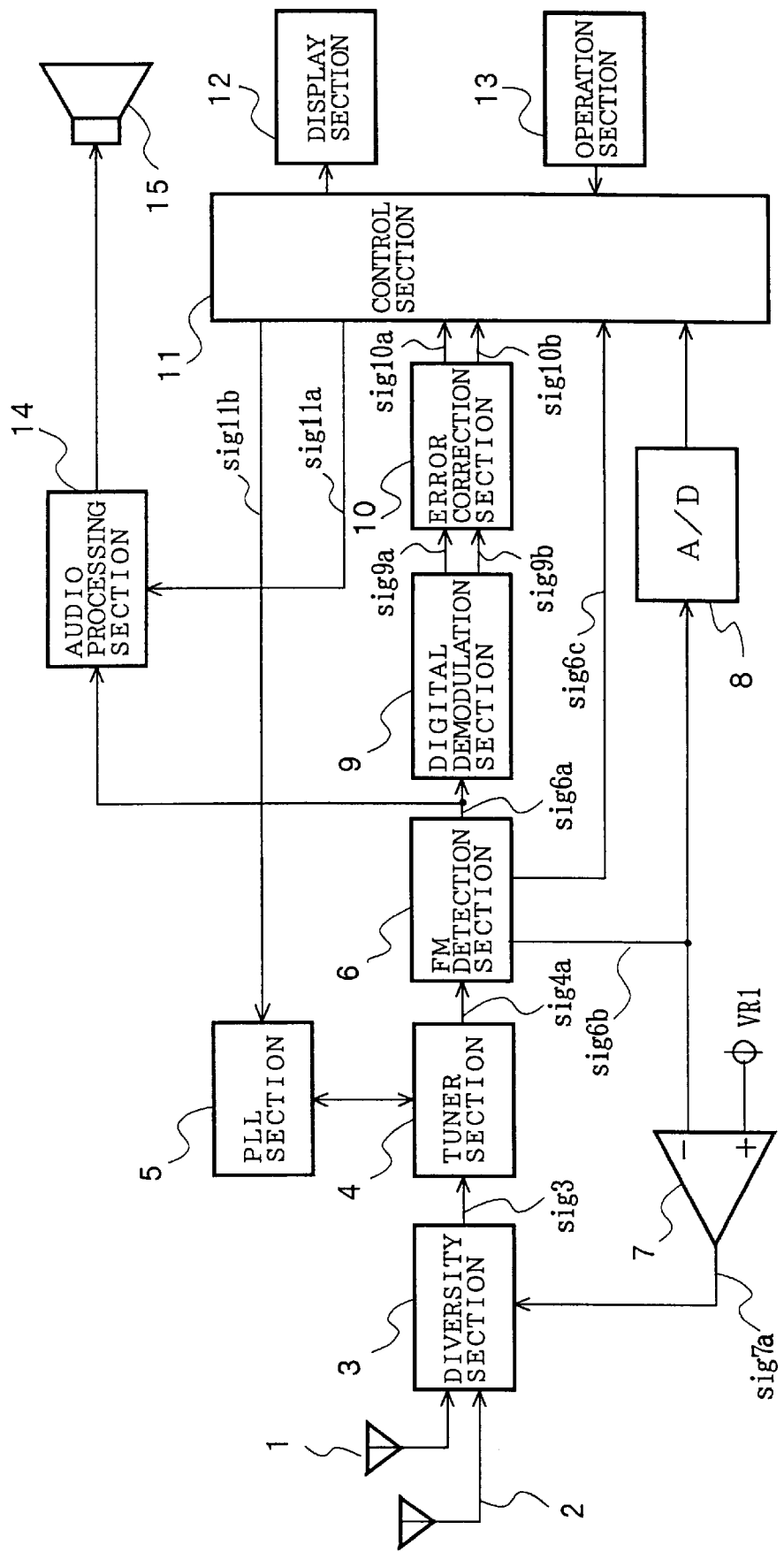
FIG. 40 is a block diagram showing a configuration of a conventional digital receiver as a conventional FM multiplex broadcast receiver.

In FIG. 5, the components in the digital receiver 200 according to the present invention which are same of components in the conventional digital receiver as shown in FIG. 40 in configuration and function are referenced with the same reference numbers as the conventional digital receiver shown in FIG. 40 and the explanation of them is omitted.

In the digital receiver 200 shown in FIG. 5, an input port Q1 of the control section 11 receives the output signal (sig34) from the receiving quality detection device 37 which has been described above.

Figure 6:
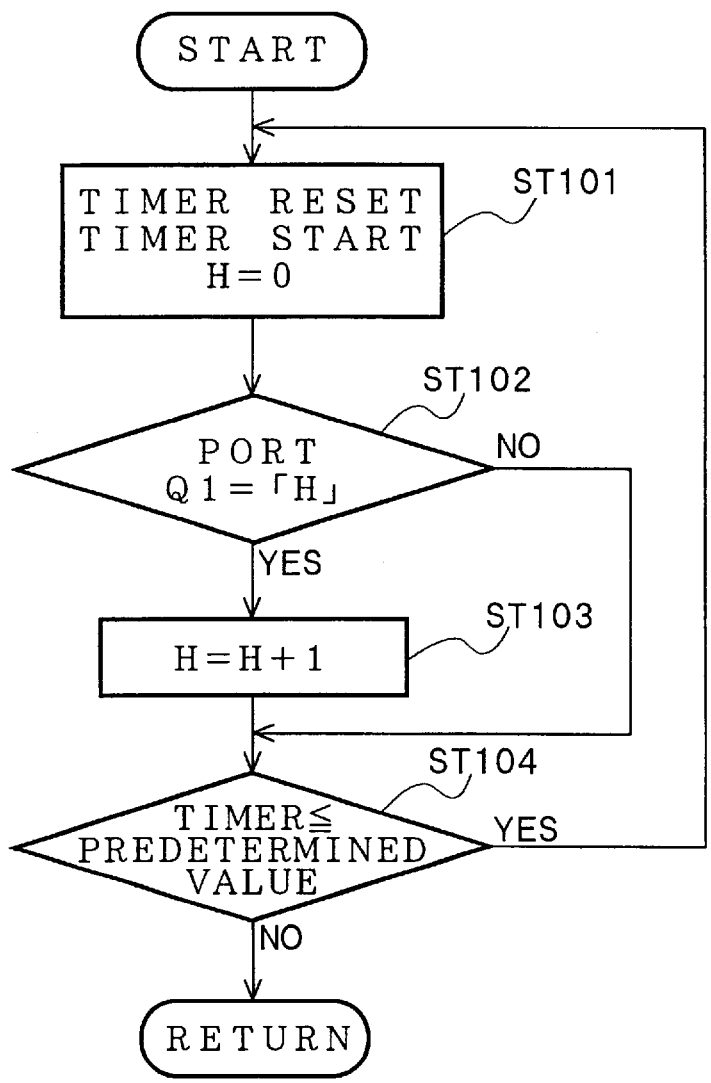
FIG. 6 is a flow chart showing operation of a control section in the digital receiver of the preferred embodiment 1 according to the present invention shown in FIG. 5.

FIG. 6 is a flow chart showing the operation flow of the control section 11 in the digital receiver 200 shown in FIG. 5.

Firstly, step ST101 resets a timer, starts the operation of the control section 11, and then sets zero "0" to a variable.

Step ST102 judges whether the output signal (sig34) is a positive logical value or a negative logical value.

Step ST103 updates the variable H by 1 only when the judgement at step ST102 is YES.

Step ST104 judges whether or not the value of the timer is greater than or equal to a predetermined value when the judgement at step ST102 is NO, and if the result of the judgement at step ST104 is YES, the operation flow is returned to the step ST101 as shown in FIG. 6. Then, this operation flow is repeated. In addition, when the judgement at step ST104 is NO, because the output signal of the positive logical value transmitted from the receiving quality detection device 37 within a predetermined time period is stored as the variable H, the operation flow goes to a following step where predetermined operations are executed based on the variable value H.

Figure 7:
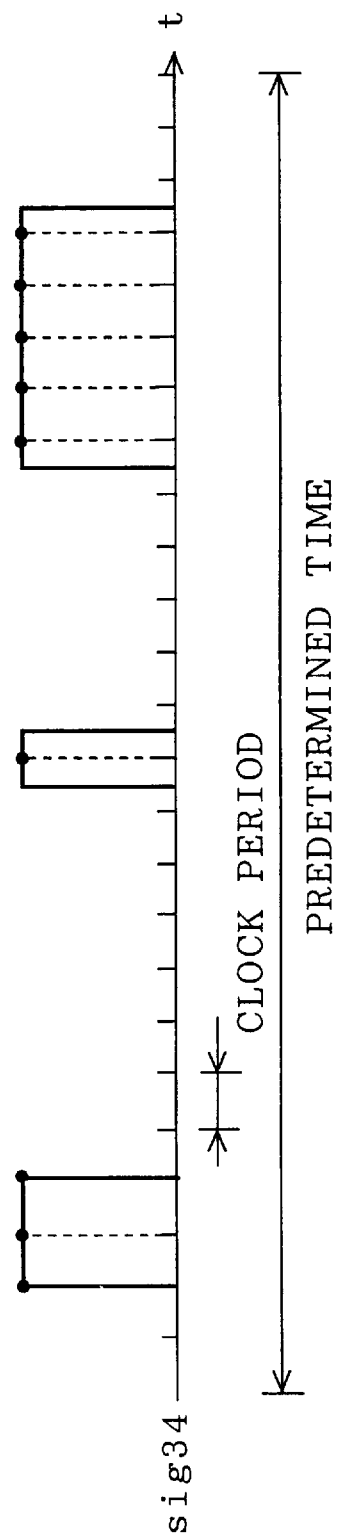
FIG. 7 is a wave-form diagram of an operation of the control section in the digital receiver of the preferred embodiment 1 according to the present invention shown in FIG. 5.

These operations will be explained with reference to the wave-forms shown in FIG. 7.

When the output signal (sig34) transmitted from the receiving quality detection device 37 is received by the port Q1 in the control section 11, the control section 11 judges whether the output signal (sig34) from the receiving quality detection device 37 is a positive logical value or a negative logical value within a time period that is shorter than the pulse width of this output signal (sig34) in time. Then, the total sum of the number of the pulse widths during the predetermined time period is calculated and stored as the variable H. After this operation, the judgement of the receiving quality of the received signal is judged based on the value of the variable H. In this case as shown in FIG. 7, the value of the variable H is 9.

EMBODIMENT 2

Figure 8:
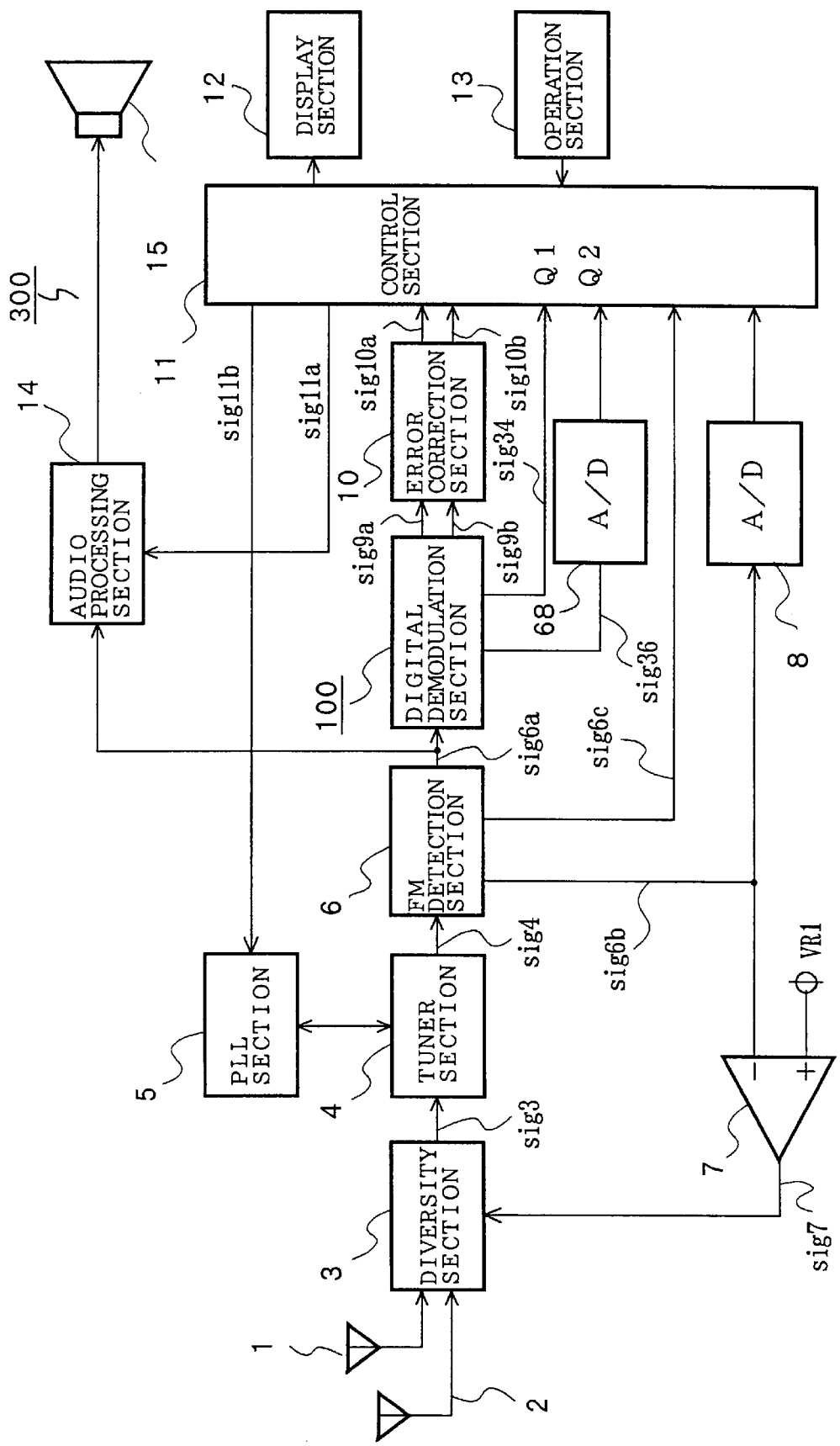
FIG. 8 is a block diagram showing a configuration of a digital receiver as a preferred embodiment 2 according to the present invention.

FIG. 8 is a configuration diagram showing a configuration of a digital receiver 300 of a second embodiment according to the present invention.

In the digital receiver 300 shown in FIG. 8, components which are the same components in the digital receiver 200 shown in FIG. 5 are designated by the same reference numbers and explanation thereof is omitted.

In the digital receiver 300 shown in FIG. 8, reference number 68 designates an Analogue to Digital (A/D) conversion device for receiving the smoothed output signal (sig36) from the receiving quality detection device 37 and for converting the smoothed output signal (sig36) into a converted signal and for transmitting it to the port Q2 in the control section 11. Because the smoothed output signal (sig36) from the receiving quality detection device 37 has the output voltage characteristics as shown in FIG. 4, the control section 11 can execute predetermined operations such as the judgement operation for judging the quality of the data signal (sig10a) from the error correction section 10.

EMBODIMENT 3

Figure 9:
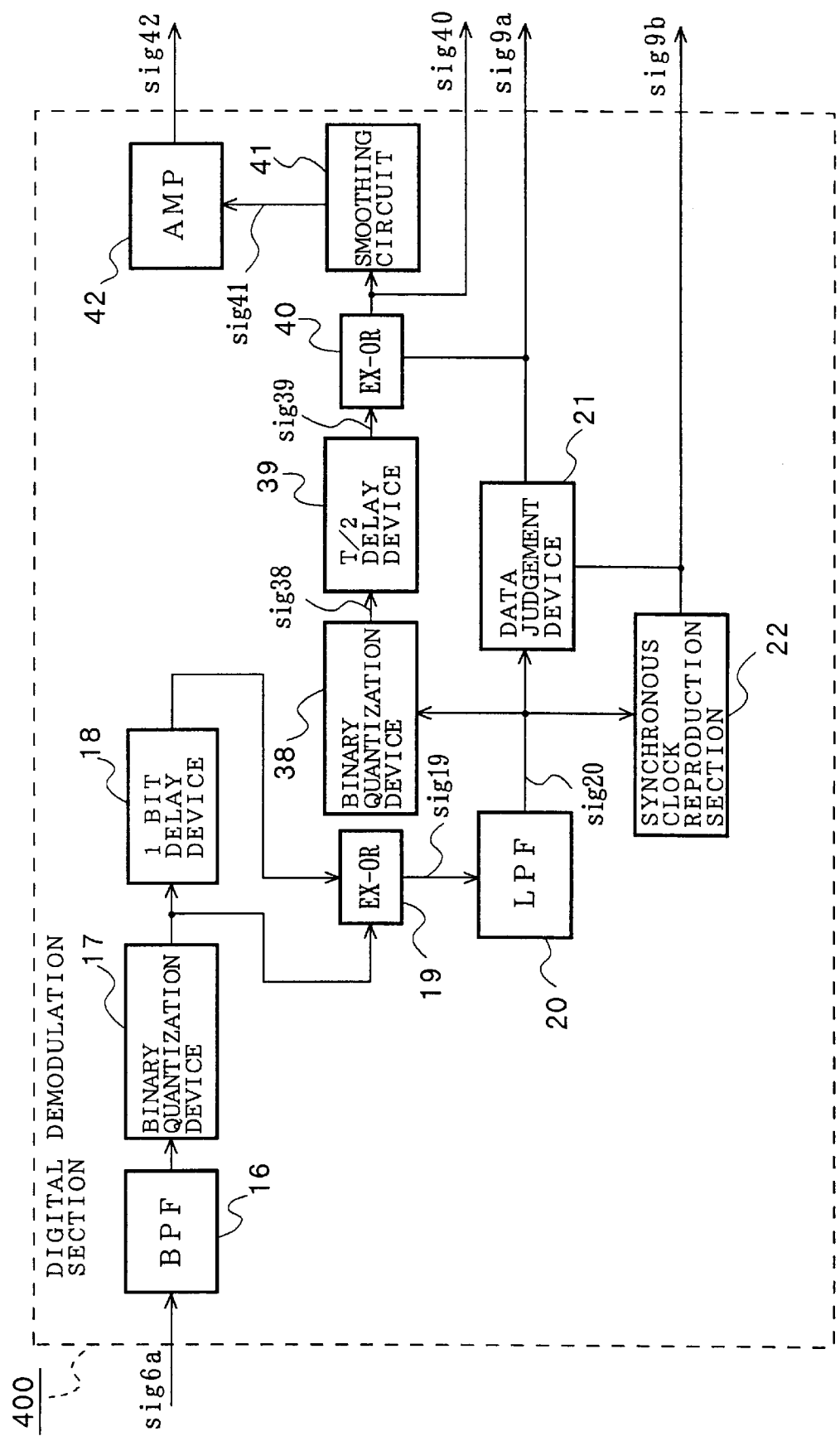
FIG. 9 is a block diagram showing a configuration of a digital demodulation section in a digital receiver as a preferred embodiment 3 according to the present invention.

FIG. 9 is a configuration diagram showing a configuration of a digital demodulation section 400 of a third embodiment according to the present invention.

In the digital receiver 400 shown in FIG. 9, components which are the same components in the digital demodulation section 100 shown in FIG. 1 are designated by the same reference numbers and explanation thereof is omitted.

In the digital demodulation section 400 shown in FIG. 9, reference number 38 designates a binary quantization device for converting the detected output signal (sig20) transmitted from the low pass filter 20 into a binary code, reference number 39 denotes a T/2 delay device as a wave-form shifter means for delaying the binarized detection output signal (sig38) by a T/2 time which is a half time (½ bit time) of the period the synchronous clock signal. Reference number 40 is an logical exclusive OR device for performing a logical exclusive OR operation between the output signal (sig39) from the delay device 39 and the output signal (sig9a) of the data judgement device 21 and for generating the result (sig40) of the logical exclusive OR operation. Reference number 41 is a smoothing circuit for smoothing the output signal (sig40) from the logical exclusive OR device 40 and for generating the smoothed output signal. Reference number 42 is an amplifier for amplifying the smoothed output signal from the smoothing circuit 42 and for transmitting the amplified signal (sig42).

Figure 10:
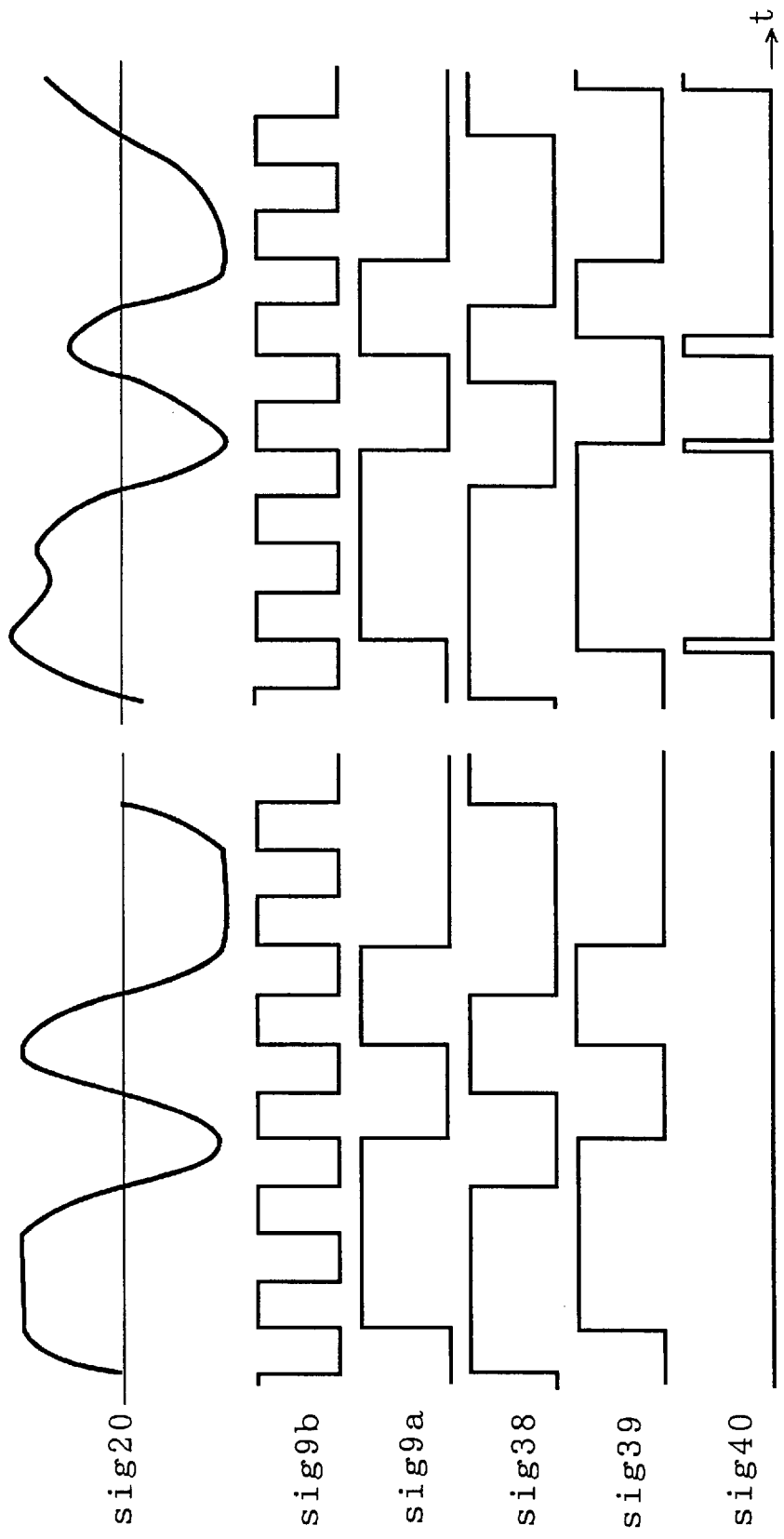
FIG. 10 is a wave-form diagram showing an operation of a receiving quality detection device in the digital demodulation section shown in FIG. 9.

Next, the operation of the digital demodulation section 400 shown in FIG. 9 will be explained using a wave-form example shown in FIG. 10.

The synchronous clock signal (sig20) can be obtained by synchronizing the change point of the detection output signal (sig20) with a falling edge of the synchronous pulse. Next, the data signal (sig9*a*) can be obtained by judging whether the detection output signal is the positive state or the negative state at a rising edge of the synchronous signal. In addition, a binary code signal (sig38) will be obtained by converting the detection output signal (sig20) into a binary code signal. Then, the output signal (sig39) from the T/2 delay device 39 is obtained by delaying the binary code signal (sig38) by T/2 time period. Finally, the output signal (sig40) from the logical exclusive OR device 40 will be obtained by executing the logical exclusive OR operation between the data signal (sig9*a*) and the output signal (sig39). As shown in a wave-form diagram represented in FIG. 10, there is no output signal (sig40) from the logical exclusive OR device 40 when the receiving state is good.

Next, the wave-form (sig20) of the detection output signal is deformed by overlapping noises into the received wave-form, the distance between the change points of the binary code wave-form is delayed from the 1 data time period T. The delay component of the wave-form is represented in the pulse width of the logical exclusive OR output signal (sig40) obtained by the exclusive OR operation between the data signal (sig9*a*) and the output signal (sig39) which is obtained by delaying the binary code signal (sig38) by the T/2 time interval.

The control section 11 counts the total sum of the pulse widths of the output signal (sig34) transmitted from the digital demodulation section 100 in the digital receiver 200 shown in FIG. 5 within a predetermined time period, and then the control section 11 also counts the total sum of the pulse widths of the logical exclusive OR output signal (sig34) transmitted from the digital demodulation section 100 in the digital receiver 200 shown in FIG. 5 within a predetermined time period. Thereby, the control section judges the quality of the received signal. In addition, by smoothing the exclusive OR output signal (sig40), the smoothing circuit 41 can generate a voltage value which corresponds to the component of the wave-form of the output signal (sig40) as an output signal. Then, the amplifier circuit 42 generates the amplified signal having a predetermined voltage value by amplifying the output signal from the smoothing circuit 41.

The relationship between the error rate and the voltage value of the output signal (sig42) from the amplifier circuit 42 when an actual data item is received by the digital demodulation section 400 having the configuration shown in FIG. 9 has the same characteristics of the case shown in FIG. 4.

The control section 11 receives this output voltage value, namely the converted value of the smoothed output signal (sig42) obtained by the A/D converter device 68 in order to detect the received data quality, the same method for judging the received data quality.

EMBODIMENT 4

Figure 11:
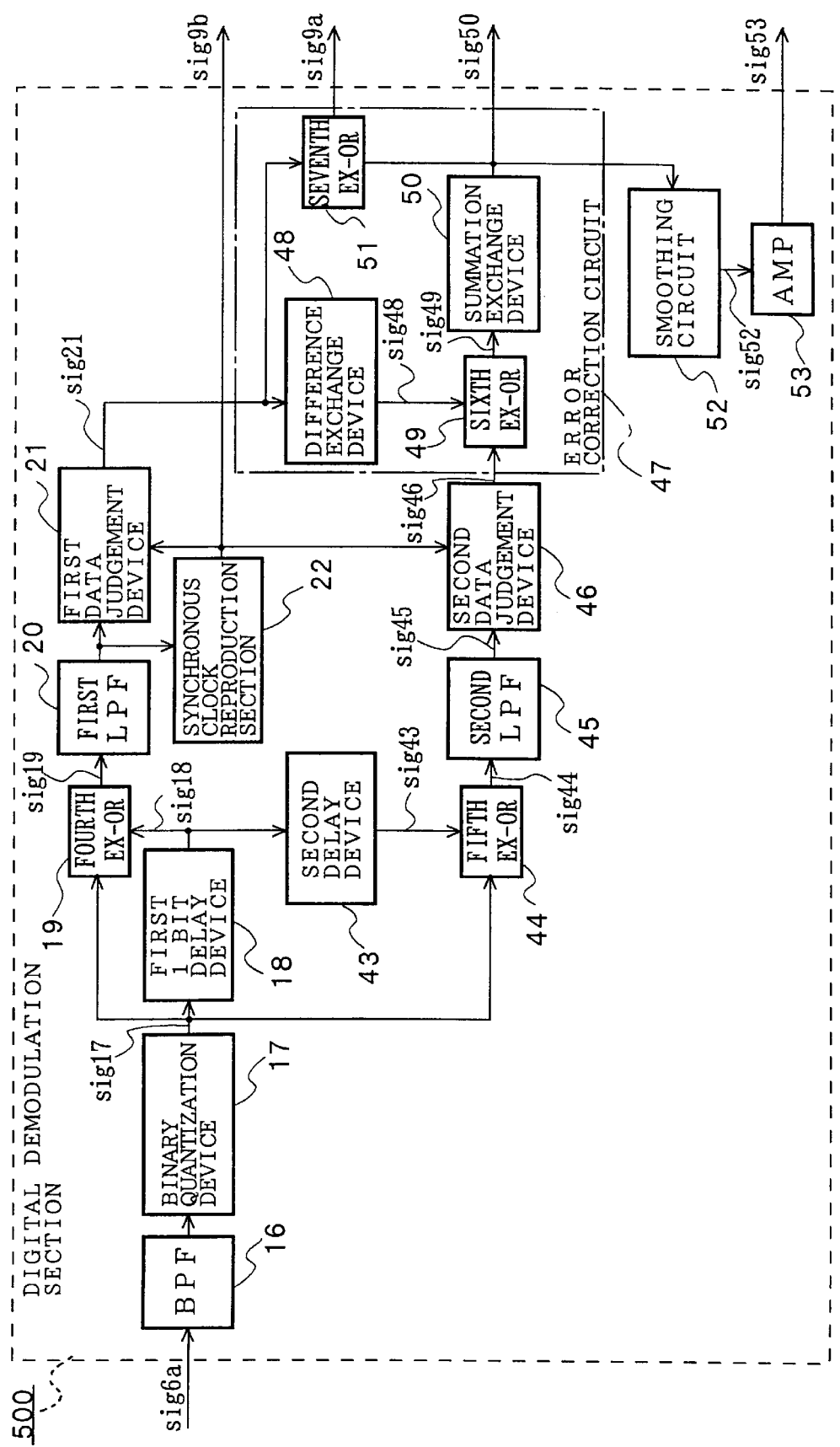
FIG. 11 is a block diagram showing a configuration of a digital demodulation section in a digital receiver as a preferred embodiment 4 according to the present invention.

FIG. 11 is a configuration diagram showing a configuration of a digital demodulation section 500 as embodiment 4 according to the present invention.

In the digital receiver 500 shown in FIG. 11 components which are the same components in the digital demodulation section 100 shown in FIG. 1 are designated by the same reference numbers and explanation thereof is omitted.

In the digital modulation section 500, reference number 19 designates a fourth logical exclusive OR device for performing a logical exclusive OR operation between the received signal (sig17) which has been converted into a binary code by the binary quantization device 17 and a delayed signal (sig18) which is obtained by delaying the received signal (sig17) by one bit time by the 1 bit delay device 18, and for transmitting the output signal (sig19) as the result of the logical exclusive OR operation.

Reference number 20 denotes a first Low Pass Filter (LPF) for eliminating a high frequency component from the output signal (sig19) transmitted from the fourth logical exclusive OR device 19.

Thus, in embodiment 4, a first detection section includes the fourth logical exclusive OR device 19 and the LPF 20.

Reference number 43 designates a second 1 bit delay device (2 bit delay detection section) for further delaying the delayed signal (sig18) from the first 1 bit delay device 18 by 1 bit time.

Reference number 44 denotes a fifth logical exclusive OR device for performing a logical exclusive OR operation between the received signal (sig17) which has been converted into a binary code by the binary quantization device 17 and the delayed signal (sig43) which is obtained by further delaying the delayed signal (sig18) by one bit time by the second 1 bit delay device 43, and for transmitting the output signal (sig44) as the result of the logical exclusive OR operation.

Reference number 45 denotes a second Low Pass Filter (LPF) for eliminating a high frequency component from the output signal (sig44) transmitted from the fifth logical exclusive OR device 44.

Thus, in the embodiment 4, a second detection section includes the fifth logical exclusive OR device 44 and the second LPF 45.

Reference number 46 designates a second data judgement device for judging a logical state of the output signal (sig45) transmitted from the second LPF 45 and for converting the received output signal (sig45) into a digital wave-form.

Reference number 47 denotes an error correction circuit (an error correction section) for correcting an error component in the digital demodulated signal (sig21) transmitted from the first data judgement device 21 based on the digital demodulated signal (sig46) from the second data judgement device 46, and for generating a digital demodulated signal (sig9*a*) which has been treated by the error correction operation and an error corrected pulse signal (sig50) for informing the error correction operation. In embodiment 4, the error correction device 47 performs the data correction operation based in the 2 bit delayed detection signal. Therefore the operation and the configuration of the error correction device 47 is different from that of the conventional error correction device 10 in the conventional digital receiver shown in FIG. 40.

Reference number 48 designates a difference exchange device for generating a differential component signal (sig48) of the digital demodulated signal (sig21) transmitted from the data judgement device 21 which has been treated by the 1 bit delay detection operation.

Reference number 49 designates a sixth logical exclusive OR device for performing a logical exclusive OR operation between the difference component signal (sig48) from the difference exchange device 48 and the digital demodulated signal (sig46) transmitted from the second data judgement device 46, and for transmitting the output signal (sig49) as the result of the logical exclusive OR operation.

Reference number 50 denotes a summation exchange device for generating a sum signal (sig50), namely the error corrected pulse signal (sig50), of the exclusive OR signal (sig49) as the result of the exclusive OR operation transmitted from the sixth logical exclusive OR device 49.

Reference number 51 designates a seventh logical exclusive OR device for performing a logical exclusive OR operation between the digital demodulated signal (sig48) obtained by the 1 bit delay detection operation transmitted from the difference exchange device 48 and the summation exchange output (sig50), namely, the error corrected pulse signal (sig50), and for transmitting the output signal (sig9a) of the result of the logical exclusive OR operation. This output signal (sig9a) from the seventh logical exclusive OR device 51 means the error corrected data obtained by the 2 bit delay detection operation described above.

The error correction circuit 47 in embodiment 4 includes the components designated by the reference numbers 48-51.

Reference number 52 designates a smoothing circuit for smoothing the error corrected pulse signal (sig50) from the error correction circuit 47 and for generating the smoothed error correction pulse signal (sig52).

Reference number 53 denotes an amplifier circuit for amplifying the output signal (sig52) from the smoothing circuit 52 and for transmitting the amplified signal (sig53).

Next, the operation of the digital demodulation section 500 having the configuration, as shown in FIG. 11, will be explained.

Because the 2 bit delay detection output is equivalent to the difference exchange output from the 1 bit delay detection output and the 2 bit delay detection output has a good transmission characteristics rather than the 1 bit delay detection output in general, the error correction operation can be executed when there is a difference between the 2 bit delay detection output and the difference exchanged output of the 1 bit delay detection output. In the digital demodulation section of embodiment 4 of the present invention, the quality of the received signal can be detected and estimated by counting the error corrected pulses. In addition, since the configuration and the operation of the 1 bit delay detection device 18 are same as that of the conventional 1 bit delay detection device, the explanation of them are omitted here.

Firstly, the fifth logical exclusive OR device receives the output signal (sig17) from the binary quantization device 17 and the output signal which has been delayed by 2 bit time executed by the delay devices 18 and 43, and the LPF 45 receives the output signal (sig44) from the fifth logical exclusive OR device 44 and transmits the signal (sig45) including no high frequency component which has been eliminated by the LPF 45. Then, the data judgement device 46 judges the output signal (sig45) in synchronism with the synchronous clock signal from the synchronous reproduction section 22, and transmits the digital demodulated signal (sig46) which has been treated by the 2 bit delay detection operation.

Figure 12:
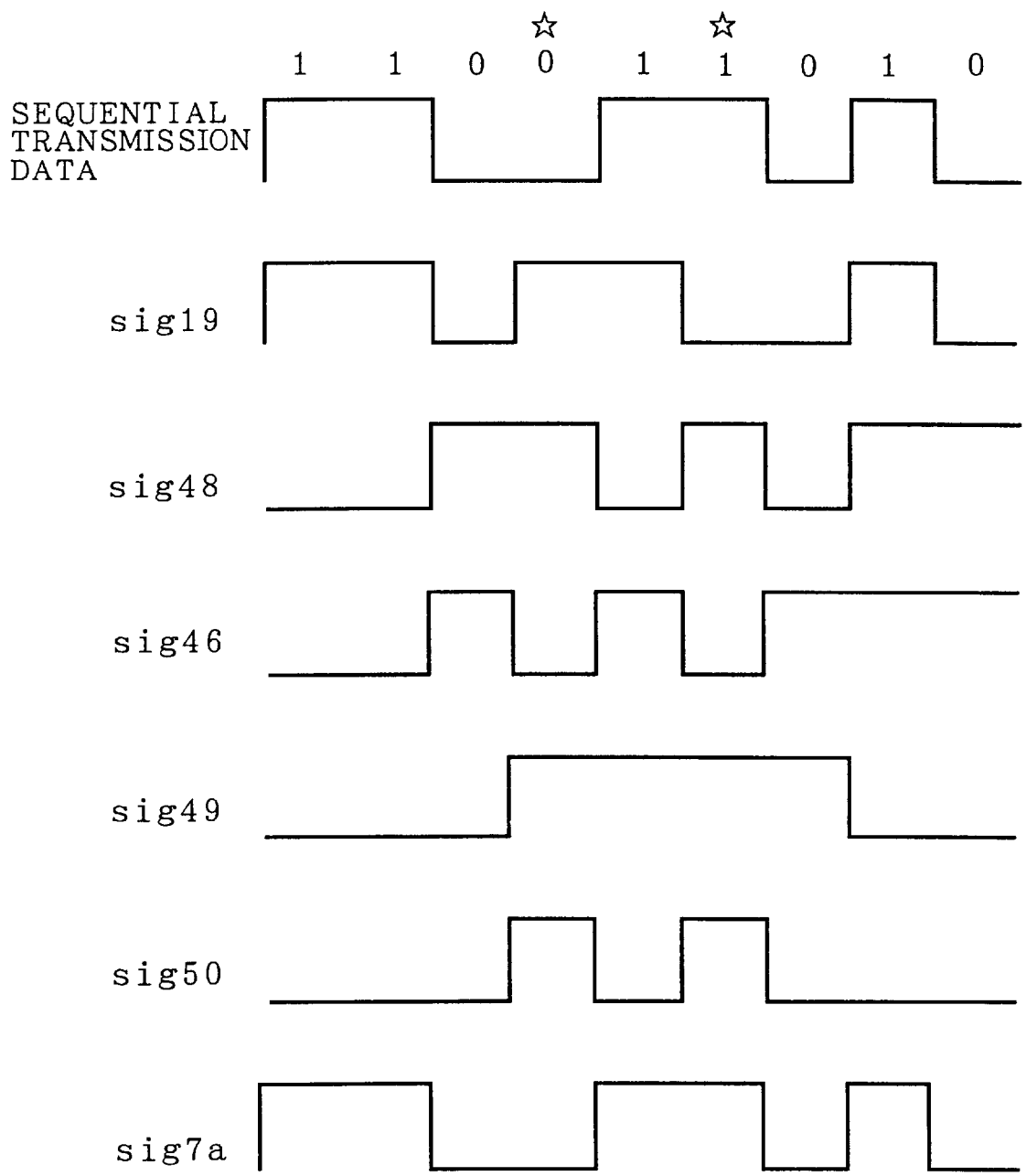
FIG. 12 is a wave-form diagram for explaining an operation of a 2 bit delay circuit in the digital demodulation section shown in FIG. 11.

Next, the operation of the error correction circuit 47 will be explained with reference to a data example shown in FIG. 12.

The digital demodulation section 500 receives the sequential transmission data and transmits the digital modulated signal (sig21) which has been treated by the 1 bit delay detection operation. In this case, the fourth bit and the sixth bit in the digital demodulated signal (sig21) are error bits which are represented by the reference character "☆" shown in FIG. 12. These error bits in the signal (sig21) will be corrected by the following operation.

Firstly, the differential exchanged output (sig48) of the digital demodulated output (sig21) is obtained. Then, the logical exclusive OR output signal (sig49) which is obtained by the logical exclusive OR operation between the differential exchanged signal (sig48) and the demodulated signal (sig46) is obtained.

Next, the summation exchanged output (sig50) of the logical exclusive OR output (sig49) is obtained. As shown in FIG. 12, there are positive logical outputs in the summation exchanged output (sig50). These positive logical outputs are corresponding to the error bit positions in the sequential transmission data. These positive logical outputs are the error pulse signals. When the receiving state becomes poor, the number of the error pulse signals is increased. Therefore the quality of the received signal can be estimated by counting the error pulse signal.

The control section 11 counts the number of the error pulse signals, namely the sum of the number of the pulse widths within a predetermined time period. In other words, the control section 11 counts the sum of the number of the pulse widths in the output signal (sig34) within a predetermined time period in the digital receiver 200, as shown in FIG. 5. Then, the control section 11 judges the quality of the received data by using the number of the error pulse signals.

The error correction operation can be performed by inverting an error bit which is treated by performing the logical exclusive OR operation between the digital demodulated signal (sig21) which has been obtained by the 1 bit delay detection operation and the error pulse signal (sig50). Using this method described above, the signal (sig9a) which has been corrected by the error correction operation.

In addition, the output signal (sig52) having a voltage value corresponding to the number of the pulse signals can be obtained as the output signal from the smoothing circuit 52 by smoothing the sum exchanged output signal (sig50) by the smoothing circuit 52.

In the digital demodulation section 500 having the configuration shown in FIG. 11, the characteristics of the relationship between the error rate when actual receiving data is received and the voltage of the output signal (sig53) of the amplifier circuit 53 has the same characteristics as shown in FIG. 4. The control section 11 receives the output signal transmitted from the A/D converter device 68 which converts the value of the output voltage (sig36) into the digital output signal. Then, the control section 11 judges the quality of the received data based on the output signal transmitted from the A/D converter device 68 using the same method for the quality of the received data which is performed by the digital demodulation device described above.

EMBODIMENT 5

Figure 13:
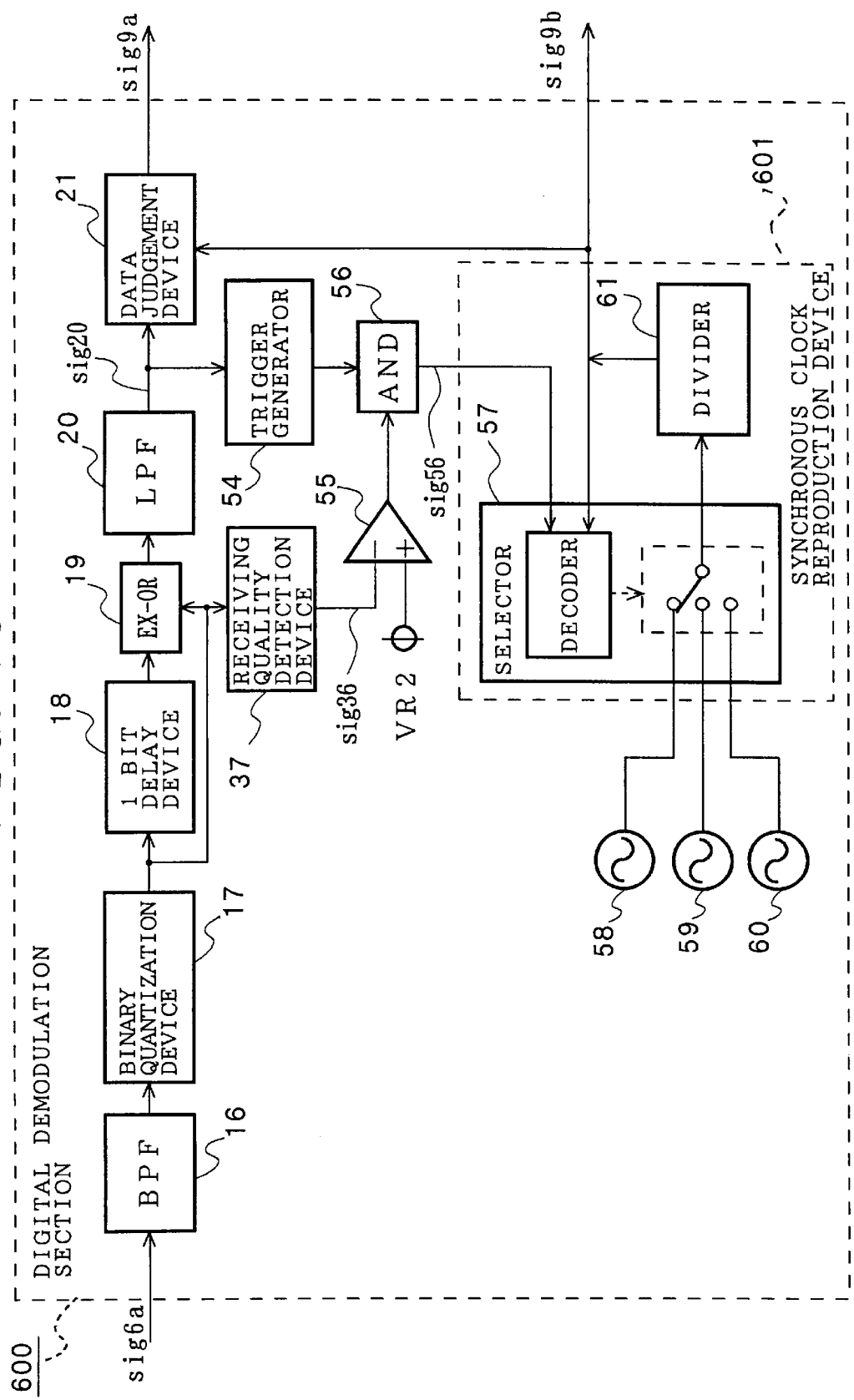
FIG. 13 is a block diagram showing a configuration of a digital demodulation section in a digital receiver as a preferred embodiment 5 according to the present invention.

FIG. 13 is a configuration diagram showing a configuration of a digital demodulation section 600 of embodiment 5 according to the present invention.

In the digital demodulation section shown in FIG. 13, components which are the same components in the digital demodulation section 100 shown in FIG. 1 are designated by the same reference numbers and explanation thereof is omitted.

In the digital demodulation section 600 shown in FIG. 13, reference number 54 designates a trigger generation device for detecting a zero cross of the detection output signal (sig20) transmitted from the LPF 20 for generating a trigger pulse, reference number 37 denotes a receiving quality detection device whose configuration is same of that in the digital demodulation section 100 shown in FIG. 11.

Reference number 55 designates a comparator for comparing the voltage value of the output signal (sig36) from the amplifier circuit 36 in the receiving quality detection device 37 with the reference voltage VR2, and for generating the signal of the negative state when the voltage of the output signal (sig36) from the receiving quality detection device 37 is greater than the voltage of the reference voltage VR2. Reference number 56 denotes a logical AND device for generating the result of a logical AND operation between the output signal from the comparator 55 and the output signal from the trigger generation device 54. Reference numbers 58, 59, and 60 denote oscillators.

Reference number 57 designates a selection device for selecting one of the output signals from the oscillators 58, 59, and 60 based on the output signal from the logical AND device 56 and the output signal from the divider 61 which will be described in detail later.

Reference number 61 denotes the divider for dividing the output signal from the selection device 57 and for generating the synchronous clock signal (sig9b).

Next, the operation of the digital demodulation section 600 having the configuration shown in FIG. 13 will be explained.

Figures 14, 15:
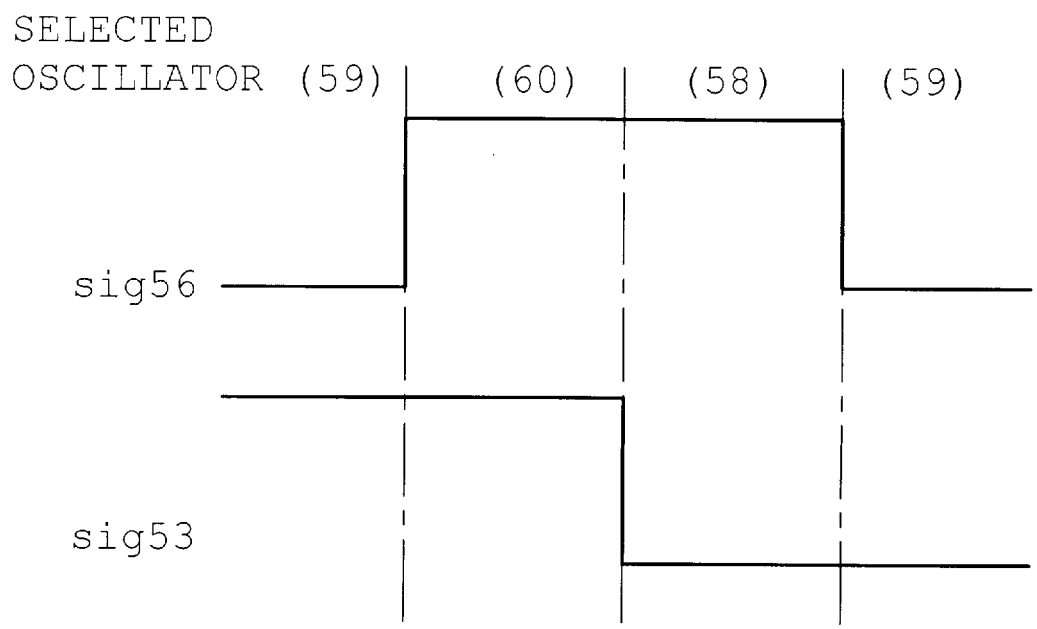
FIG. 14 is a diagram for explaining an operation of a selection device in the digital demodulation section shown in FIG. 13.
FIG. 15 is a wave-form diagram for explaining an operation of a synchronous clock reproduction section in the digital demodulation section shown in FIG. 13.

We define that the frequency of the synchronous clock is "f", a division rate of the divider is "k", the oscillation frequencies of the oscillators 58, 59, and 60 are f$a$=0, f$b$=k f, and f$c$=2 k f. When the oscillation frequency is selected according to the truth value shown in FIG. 14 based on the trigger signal (sig54) generated based on the zero cross time signal of the detection output signal (sig20) from the LPF 20 and the synchronous signal (sig9b) from the divider device 61, as clearly shown in FIG. 15, the oscillator 59 is selected when the trigger signal is not generated.

When the trigger signal is generated, namely when the trigger signal is in the positive logical state and when the synchronous signal is in the positive logical state, the oscillator 60 is selected. In addition, when the trigger signal is generated (when the trigger signal is in the positive logical state) and when the synchronous clock is in the negative logical state, the oscillator 58 is selected.

Figure 16:
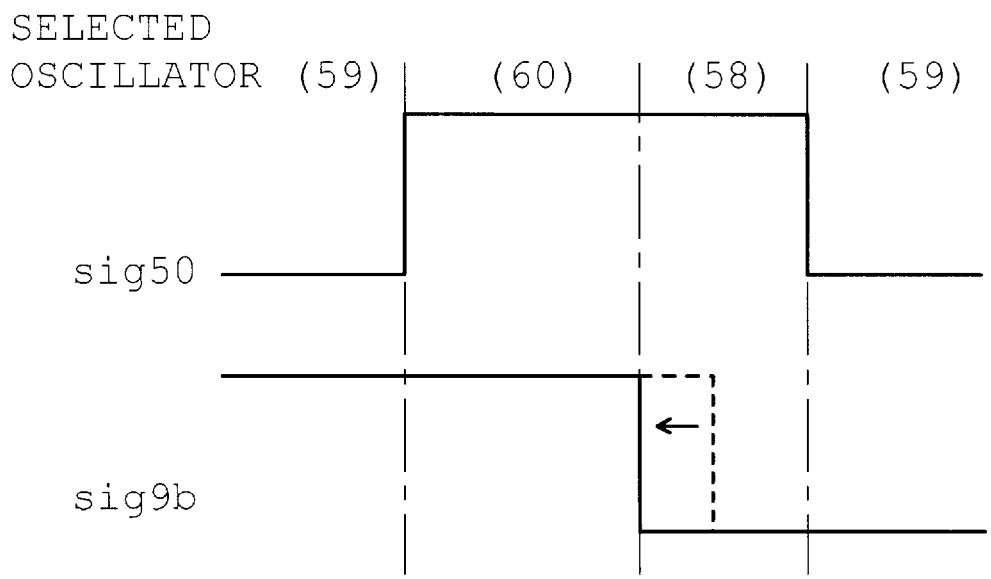
FIG. 16 is a wave-form diagram for explaining an operation of a synchronous clock reproduction section in the digital demodulation section shown in FIG. 13.

In this situation, when the trigger signal having a stable state under the good receiving condition is generated, the selection time periods of both of the oscillators 58 and 60 are equal, and the synchronous clock is established. On the other hand, when the receiving state becomes poor and no stable trigger signal is generated, for example the synchronous clock is delayed from the trigger signal in phase as shown by the dotted line in FIG. 16, the time period that the trigger signal and the synchronous clock signal are in the positive logical state is increased, the selected time of the oscillator 60 becomes long, the time period that the trigger signal is in the positive logical state and the synchronous clock signal is in the negative logical state becomes decreased, and the time period that the oscillator device 58 is selected is decreased. Therefore, the change timing that the synchronous clock signal is changed from the positive logical state to the negative logical state becomes short, the phase of the synchronous clock is short when comparing with the case that no trigger signal is generated. In other words, the wave-form is shifted to the wave-form of the synchronous clock signal designated by the solid line as shown in FIG. 16.

Figure 17:
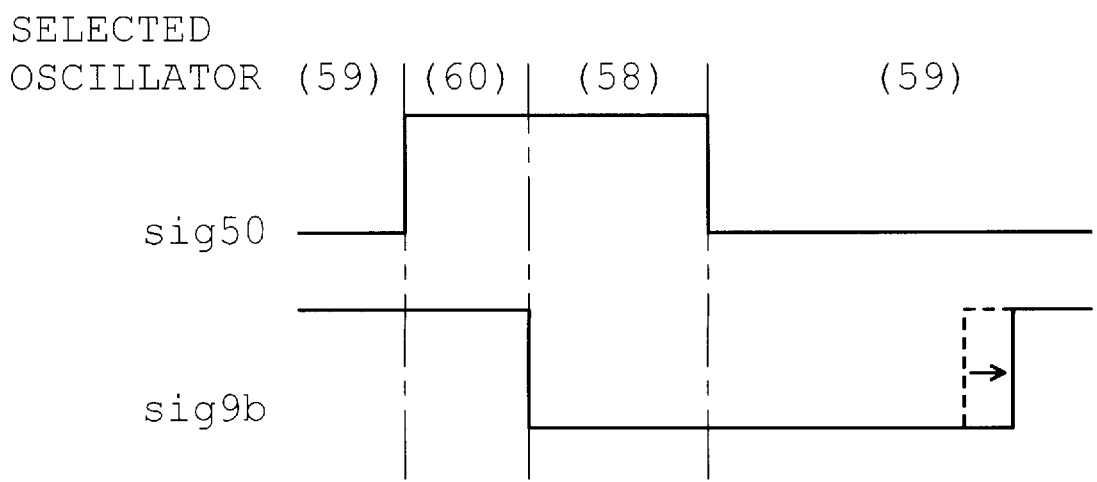
FIG. 17 is a wave-form diagram for explaining an operation of a synchronous clock reproduction section in the digital demodulation section shown in FIG. 13.

Conversely, when the phase of the synchronous clock signal is leaded to the phase of the trigger signal like the wave-form of the synchronous clock designated by the dotted line shown in FIG. 17, the time period that the trigger signal is in the positive logical state and the synchronous clock signal is in the positive logical state is decreased, and the selected time period that the oscillator device 60 is selected is decreased, the time period that the trigger signal is in the positive logical state and the synchronous clock signal is in the negative logical state is increased. Therefore the time period that the oscillator 58 is selected becomes long, and the timing that the synchronous clock signal is changed from the negative logical state to the positive logical state will lead. In this case, the phase of the synchronous clock signal is delayed when comparing to the case that no trigger signal is generated. In other words, the synchronous clock signal is shifted as designated by the solid line as shown in FIG. 17. Thus, in the digital demodulation section 600 of this embodiment 5, because the phase correction operation for the phase of the synchronous clock signal is performed every receiving the trigger signal, the establishment of the synchronous operation can be rapidly executed.

In addition, the comparator 55 performs the comparing operation between the output voltage of the receiving quality detection device 37 and the reference voltage VR2, then the comparator 55 generates the negative logical value when the output voltage from the receiving quality detection device 37 is greater than that of the reference voltage VR2. Then, the logical AND device 56 generates no output signal so long as the comparator 37 generates the negative logical value even if the trigger generation device 54 generates the trigger pulse signal. In this case, the phase correction operation can not performed by using the trigger pulse signal. Therefore the synchronous scanning operation can halt under the condition of poor receiving quality of the received signal the output signal (sig36).

Because it is difficult to say that any accurate trigger signal is generated under the condition of poor receiving quality, any false operation of the synchronous operation can be prevented by stopping the synchronous scanning operation by using the trigger signal under the condition that the receiving quality becomes poor rather than a desired receiving quality.

EMBODIMENT 6

Figure 18:
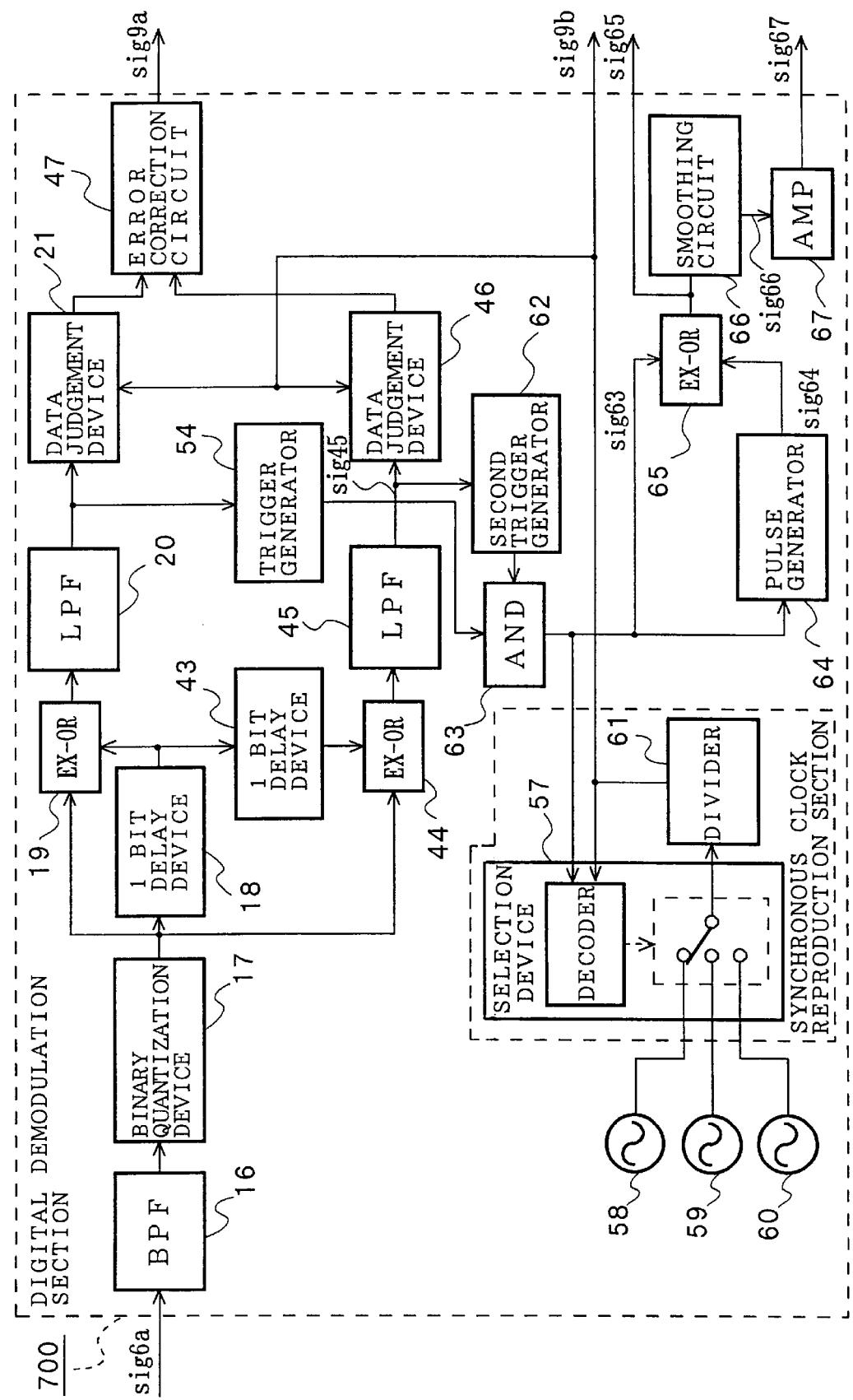
FIG. 18 is a block diagram showing a configuration of a digital demodulation section in a digital receiver as a preferred embodiment 6 according to the present invention.

FIG. 18 is a configuration diagram showing a configuration of a digital demodulation section 700 of embodiment 6 according to the present invention.

In the digital demodulation section shown in FIG. 18, components which are the same components in embodiments 1 to 5 described above are designated by the same reference numbers and explanation thereof is omitted.

In the digital demodulation section 700 having the configuration shown in FIG. 18, reference number 62 designates a second trigger generation device for detecting the zero cross time of the detection output signal (sig45) from the LPF 45 and for generating the trigger pulse signal. Reference number 63 denotes a logical AND device for performing the logical AND operation between the output signals from the first trigger generation device 54 and the second trigger generation device 62, and for generating the result of the logical AND operation. Reference number 64 denotes a pulse generation for detecting the rising edge of the output signal from the logical AND device 63 and for generating the positive pulse of the positive logical value.

Reference number 66 designates a smoothing circuit for smoothing the output signal from the logical exclusive OR device 65 and for generating the smoothed signal. Reference number 67 denotes an amplifier circuit for amplifying the output signal (sig66) from the smoothing circuit 66 and for generating the amplified signal (sig67).

Next, the operation of the digital demodulation section 700 shown in FIG. 13 will now be explained.

The trigger signals from the trigger generation device 54 and the second trigger generation device 62 are generated at the same time when the receiving state is good. On the other hand, the generation time of the trigger pulse signal from the trigger generation device 54 is different from the generation time of the trigger pulse signal from the second trigger generation device 62 when the receiving state is poor. In this case, the pulse width of the output wave-form transmitted from the logical AND device 63 becomes narrow according to the receiving state. Because the selection time for selecting one of the oscillators 58 and 60 by the selection device 57 becomes short, it is difficult to synchronize the trigger pulse signal, so that it is difficult to happen the generation of the error synchronous operation.

In addition, because the pulse width of the output signal from the logical AND device 63 is changed corresponding to the receiving state, the receiving quality can be detected by using this output signal.

Here, the pulse width of the output signal from the logical AND device 63 is T11. When the pulse width T12 of the wave form of the output signal from the pulse generation device 64 is selected as a pulse width which is equal to the pulse width of the output wave-form from the trigger generation devices 54 and 62, the pulse width T13 of the output signal (sig65) of the logical exclusive OR device 65 becomes:

$$T13 - |T12 - T11|.$$

Therefore, as clearly shown in the above equation, the receiving quality can be estimated by measuring the pulse width T13.

The control section counts the total sum of the pulse width of the output signal (sig65) within a predetermined time period, like the same manner that the control section 11 counts the total sum of the pulse width of the output signal (sig34) in the digital receiver 200 shown in FIG. 5 within the predetermined time period. In addition, the control section 11 judges the receiving quality of the received data by using the same manner used in the embodiment 200 shown in FIG. 5.

Further, the voltage value corresponding to the pulse width T13 can be obtained from the smoothing circuit 66 by smoothing the output signal (sig65) from the logical exclusive OR device 65.

In addition, the relationship between the error rate and the voltage value of the output signal (sig66) from the amplifier circuit 66 when using the actual data in the digital demodulation section 700 having the configuration shown in FIG. 18 has characteristics which are the same as that of the configuration shown in FIG. 4.

The control section 11 receives this output voltage as the A/D exchanged value which is generated by exchanging the output signal (sig36) and is transmitted from the A/D exchange device 68 in the digital receiver 200 as shown in FIG. 8. Then, by using the same manner for judging the receiving quality, the control section 11 can judge the receiving quality by using the A/D exchanged value of the output signal (sig37).

EMBODIMENT 7

Figure 19:
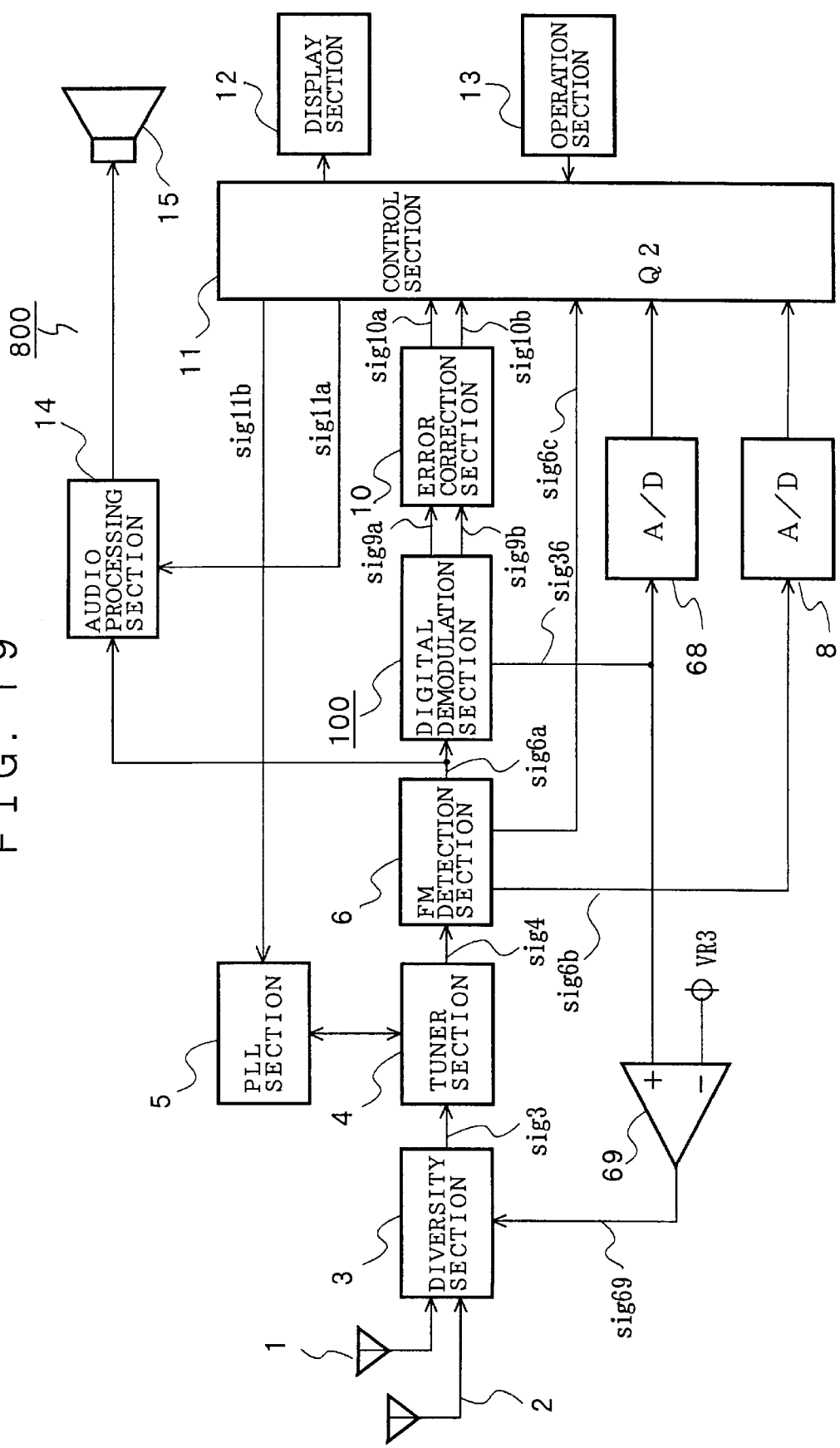
FIG. 19 is a block diagram showing a configuration of a digital receiver as a preferred embodiment 7 according to the present invention.

FIG. 19 is a configuration diagram showing a configuration of a digital receiver 800 of embodiment 7 according to the present invention.

In the digital receiver shown in FIG. 19, components which are the same components in the embodiments 1 to 6 described above are designated by the same reference numbers and explanation thereof is omitted.

In the digital receiver 800 having the configuration shown in FIG. 19, reference number 68 designates a Analogue to Digital (A/D) conversion device for converting the smoothed output (sig36) from the receiving quality detection device in the digital demodulation section into a digital signal in digital form, reference number 69 denotes a comparator for comparing the voltage of the smoothed output (sig36) with a reference voltage VR3 and for generating the comparison result.

In addition, the voltage value of the smoothed output (sig36) from the receiving quality detection device corresponds to the quality of the received signal. Therefore the A/D conversion device 68 and the comparator 69 of embodiment 7 can be used for processing the output signal (sig35) from the smoothing circuit 35 and the output signal (sig36) from the amplifier circuit 36 in embodiment 1, the output signal (sig41) from the smoothing circuit 41 and the output signal (sig42) from the amplifier circuit 42 in embodiment 4, the output signal (sig52) from the smoothing circuit 52 and the output signal (sig53) from the amplifier circuit 53 in embodiment 4, and the output signal (sig66) from the smoothing circuit 66 and the output signal (sig67) from the amplifier circuit 67 in embodiment 5.

Next, the operation of the digital receiver 800 of embodiment 7 shown in FIG. 19 will now be explained.

When the receiving quality is poor after the comparator 69 compares the smoothed output signal (sig36) with the reference voltage VR3, namely when the voltage value of the output signal from the receiving quality detection device is greater than that of the reference voltage VR3, the comparator 69 transmits the signal of the positive logical state to the diversity section 3. The diversity section 3 receives the signal of the positive logical state from the comparator 69 and enters the antenna switching state.

On the other hand, when the receiving quality is good after the comparator 69 compares the smoothed output signal (sig36) with the reference voltage VR3, namely when the voltage value of the output signal from the receiving quality detection device is smaller than that of the reference voltage VR3, the comparator 69 transmits the signal of the negative logical state to the diversity section 3. The diversity section 3 receives the signal of the negative logical state from the comparator 69 and do not enter the antenna switching state, namely fixes the antenna.

Thus, in the digital receiver 800 of the embodiment 7 as shown in FIG. 19, the diversity section 3 can be controlled by using the smoothed signal (sig36). In addition, the smoothed signal (sig36) is converted into the digital signal by the A/D conversion device 68 and transmitted to the control section 11. After receiving the digital signal from the A/D conversion device 68, the control section 11 performs the following operations based on the value of this digital signal.

Figure 20:
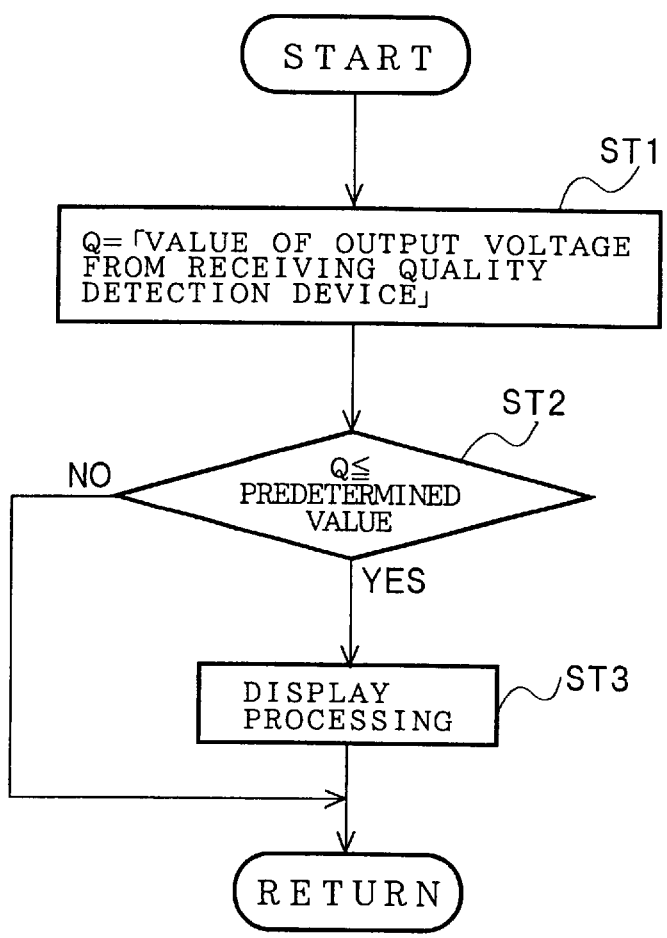
FIG. 20 is a flow chart showing an operation of a control section in the digital receiver of the embodiment 7 according to the present invention.

FIG. 20 is a flow chart showing the operation flow of the control section 11 in the digital receiver 800 of the embodiment 7 as shown in FIG. 20.

At first, the value of the output voltage from the receiving quality detection device is stored into as variable Q (step ST1). Next, when the variable Q is not more than a predetermined value (step ST2), the words "data receiving state" are displayed in display section 11 which means that the receiving state is good (ST3). On the other hand, when the variable Q is more than the predetermined value (step ST2), the data receiving state is not displayed in a display section 11. In both cases, the operation flow goes to the following steps.

Figure 21:
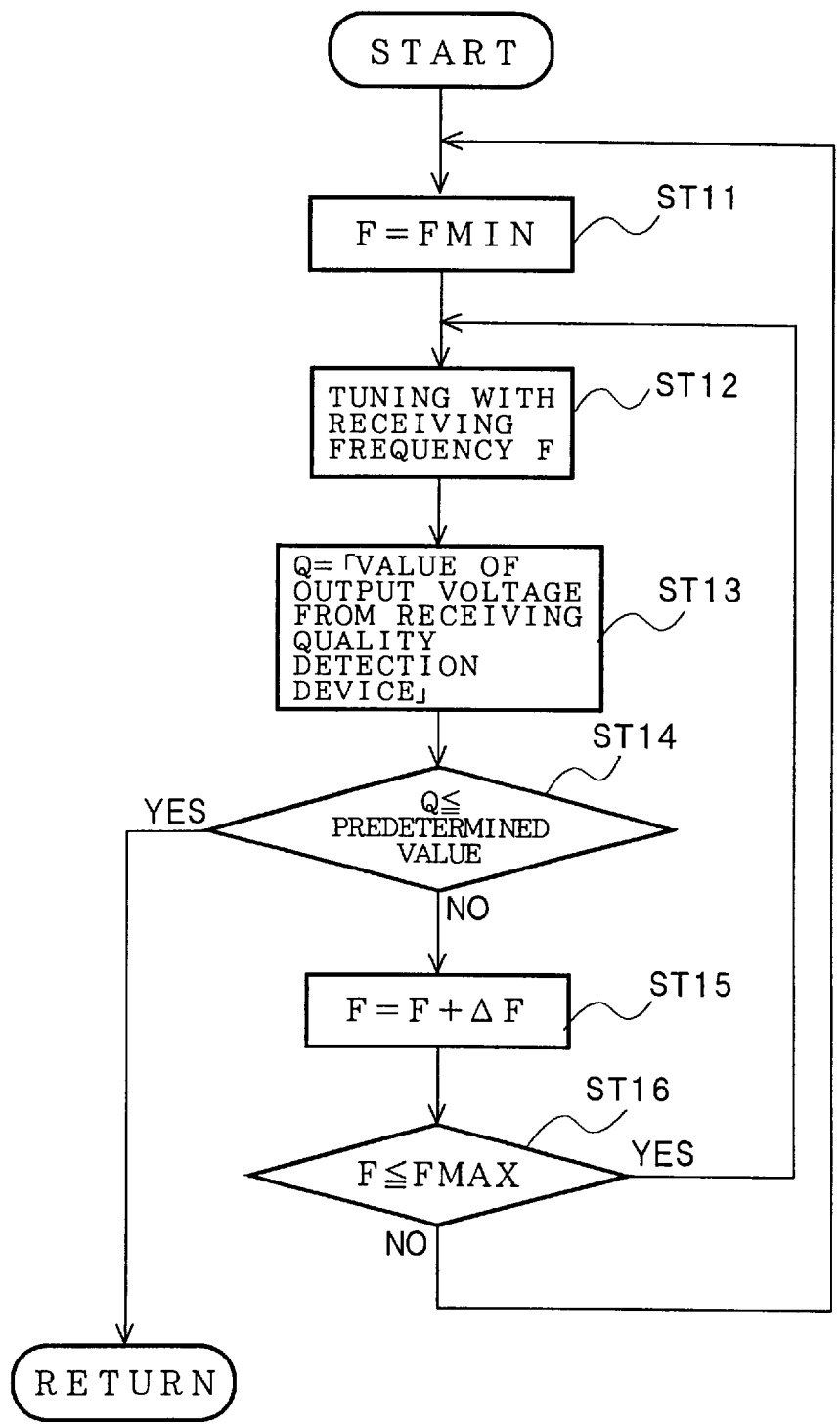
FIG. 21 is a flow chart showing an operation of a control section in the digital receiver of the embodiment 7 according to the present invention.

FIG. 21 is a flow chart showing another operation in the control section 11 in the digital receiver 800 of the embodiment 7 according to the present invention.

Firstly, the minimum frequency Fmin in the FM broadcast receiving frequency band is stored into a variable F (step ST11), and then the receiving frequency is tuned by the variable F (step ST12). The value of the output voltage from the receiving quality detection device is stored into a variable Q (step ST13), and when the variable Q is not more than a predetermined value (step ST14), the received frequency is tuned by the frequency stored in the variable F. On the other hand, when the variable Q is more than the predetermined value (step ST14), the value stored in the variable F is updated with a new value which is obtained by adding the variable F with the frequency interval F that indicates the adjacent FM broadcast frequencies (step ST15).

Next, when the updated value in the variable F is not more than the Fmax, the operation flow is returned to step ST12 and then the operations will be repeated by using the updated frequency value stored in the variable F, where Fmax means the greatest frequency in the FM broadcast band.

On the other hand, when the updated value in the variable F is more than the Fmax, because the frequency value stored in the variable F is over the maximum frequency of the FM broadcast band, the operation flow is returned to step ST11. In step ST11, the variable F is updated by the frequency Fmin. An operator can start these operations described above. These operations can also be commenced automatically.

Figure 22:
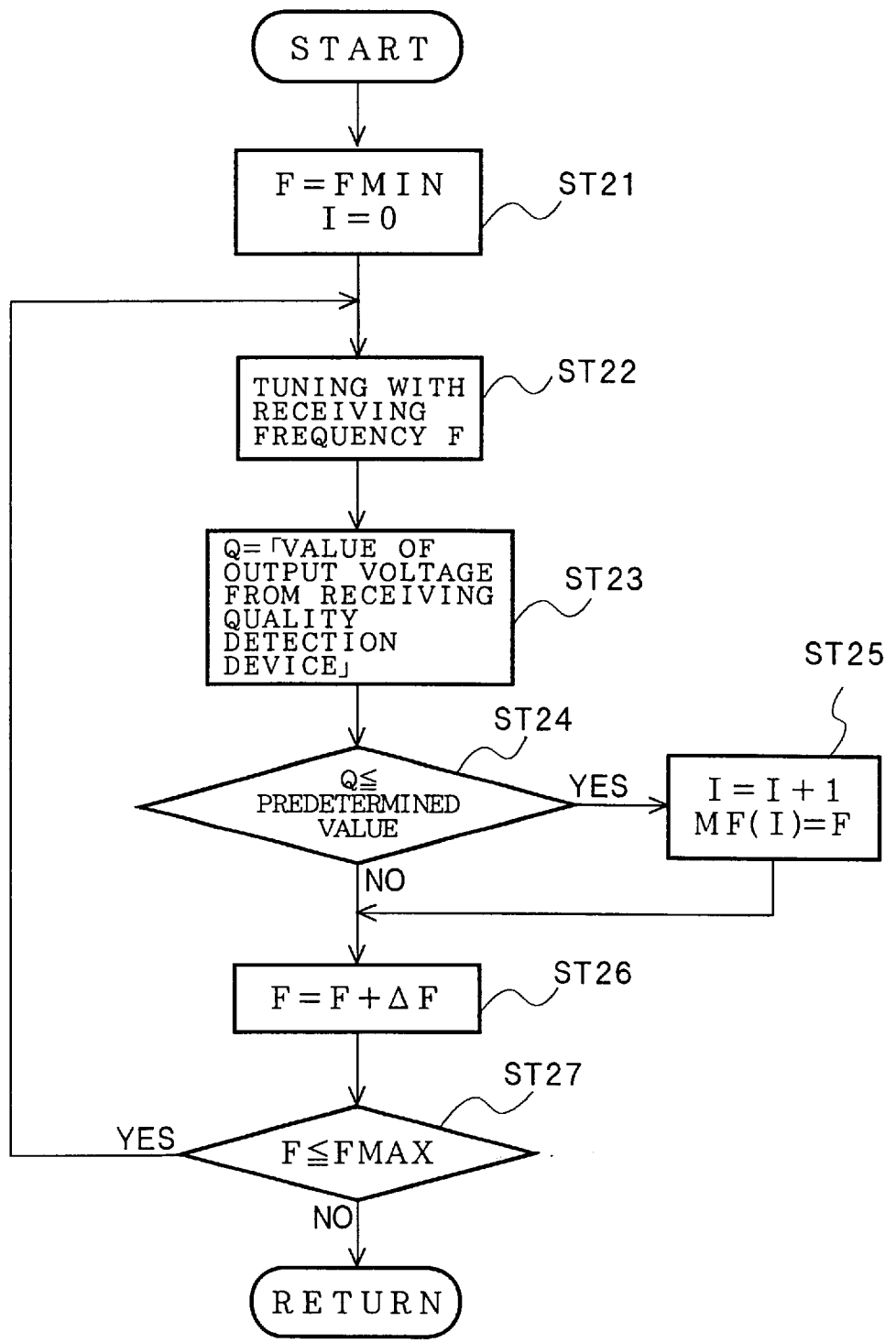
FIG. 22 is a flow chart showing an operation of a control section in the digital receiver of the embodiment 7 according to the present invention.

FIG. 22 is a flow chart showing another operation of the control section 11 in the digital receiver 800 of embodiment 7 shown in FIG. 19.

At first, the minimum frequency Fmin in the FM broadcast band is set into the variable F and value zero is set into a variable I (step ST21). Then, the receiving frequency is tuned by the frequency stored in the variable F (step ST22), the value of the output voltage is stored into a variable Q (step ST23).

When the value in the variable Q is not more than a predetermined value (step ST24), the variable I is updated by 1 and the value of the variable F is stored in a non-volatile memory storage MF(I) (step ST25).

In step ST26, the frequency value stored in the variable F is updated with a new value which is obtained by adding the variable F with the frequency interval F that indicates the adjacent FM broadcast frequencies.

Next, when the frequency value F is not more than Fmax, the operation flow is returned to step ST22 and then the operations described above are repeated.

On the other hand, when the value in the variable F is more than Fmax (step ST27), namely the scanning operation for scanning the FM broadcast band is completed, the operation flow will go to the next steps.

In addition, an operator can start these operations described above. These operations can also be commenced automatically.

Figure 23:
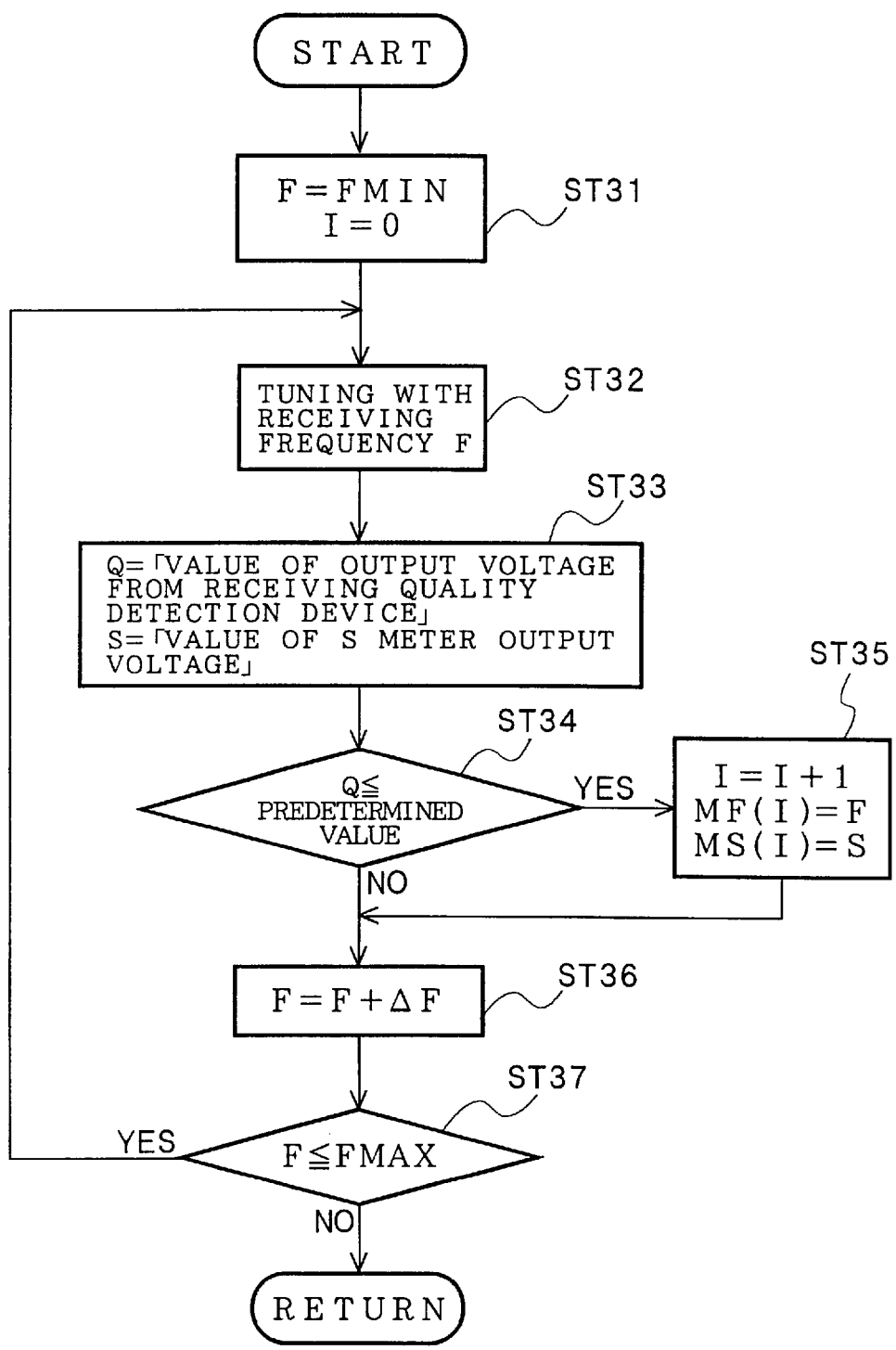
FIG. 23 is a flow chart showing an operation of a control section in the digital receiver of the embodiment 7 according to the present invention.

FIG. 23 is a flow chart showing another operation of the control section 11 in the digital receiver 800 of the embodiment 7 shown in FIG. 19.

Firstly, the minimum frequency Fmin is stored into the variable F and zero is set into the variable I (step ST31).

The tuning operation is executed by using the frequency stored as the variable F (step ST32), the output voltage value of the receiving quality detection device is stored as the variable Q and the output voltage value of the S meter is stored as the variable S.

Next, when the value stored as the variable Q is not more than a predetermined value (step ST34), the value of the variable I is updated by 1 and the value of the variable F is stored into the nonvolatile memory storage MF(I) and the value of the variable S is stored into the nonvolatile storage memory storage MS(I) (step ST35).

After step ST35 and when the value stored in the variable Q is more than a predetermined value (step ST34), the frequency value stored in the variable F is updated with a new value which is obtained by adding the variable F with the frequency interval F that indicates the adjacent FM broadcast frequencies (step ST36).

Next, when the frequency value F is not more than the Fmax, the operation flow is returned to step ST32 and then the operations described above are repeated.

On the other hand, when the value in the variable F is more than the Fmax (step ST37), namely the scanning operation for scanning the FM broadcast band is completed, the operation flow will go to the next steps.

In addition, an operator can start these operations described above. These operations can also be commenced automatically.

Figure 24:
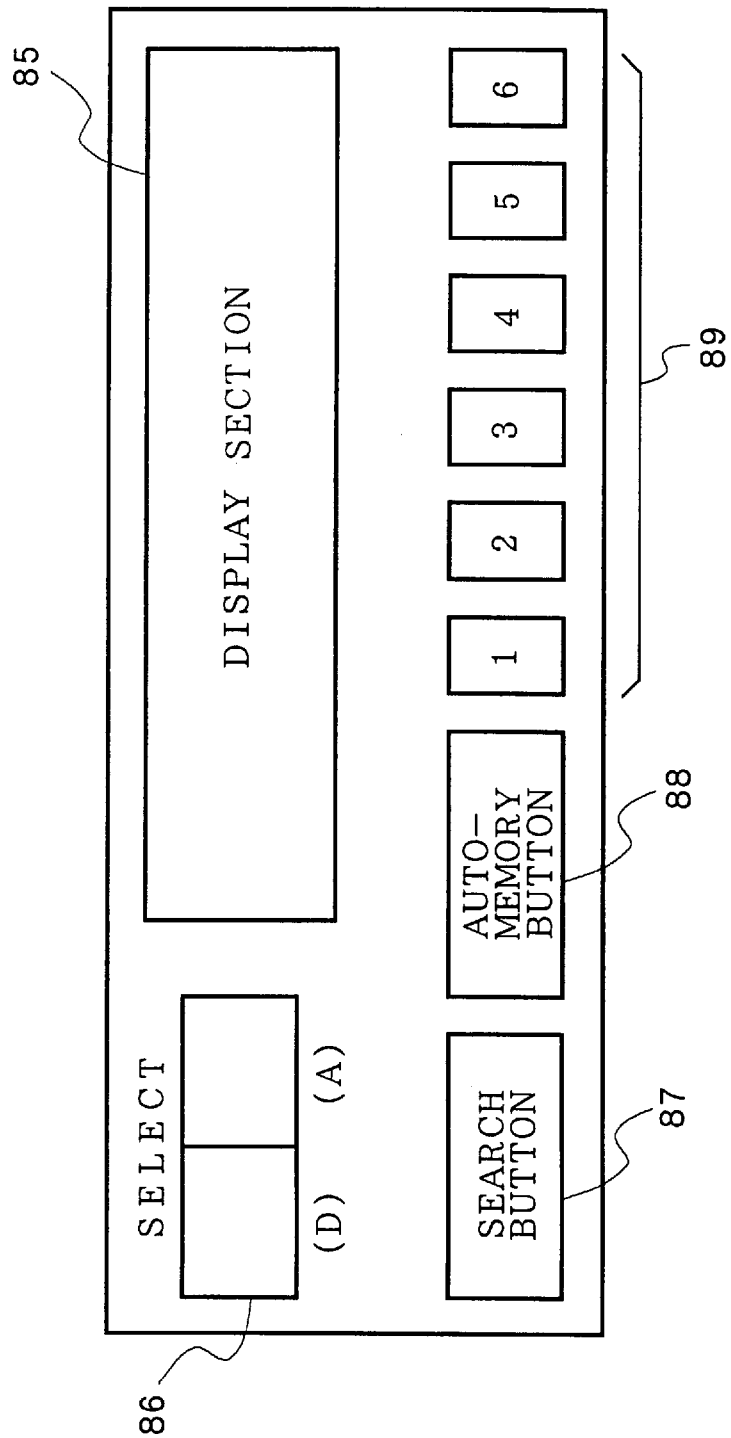
FIG. 24 is a diagram showing a configuration of an operation section and a display section in the digital receiver of the embodiment 7 according to the present invention.

FIG. 24 is an operation section 13 and the display section 12 which is incorporated in the digital receiver 800 of embodiment 7, as shown in FIG. 19.

Reference number 85 designates a display section for displaying various information, reference number 86 is a switch section for selecting one of the multiplex broadcasting and the regular broadcasting in the digital receiver. The multiplex broadcasting is selected when the D side in the switch section is selected. Conversely, the regular broadcasting is selected when the A side in the switch section is selected. Reference number 87 denotes a searching button for indicating the commencement of a frequency searching operation. Reference number 88 denotes an automatic memory button for starting the automatically operation and reference number 89 designates a button for selecting a broadcast station whose frequency has been stored into the memory.

Figure 25:
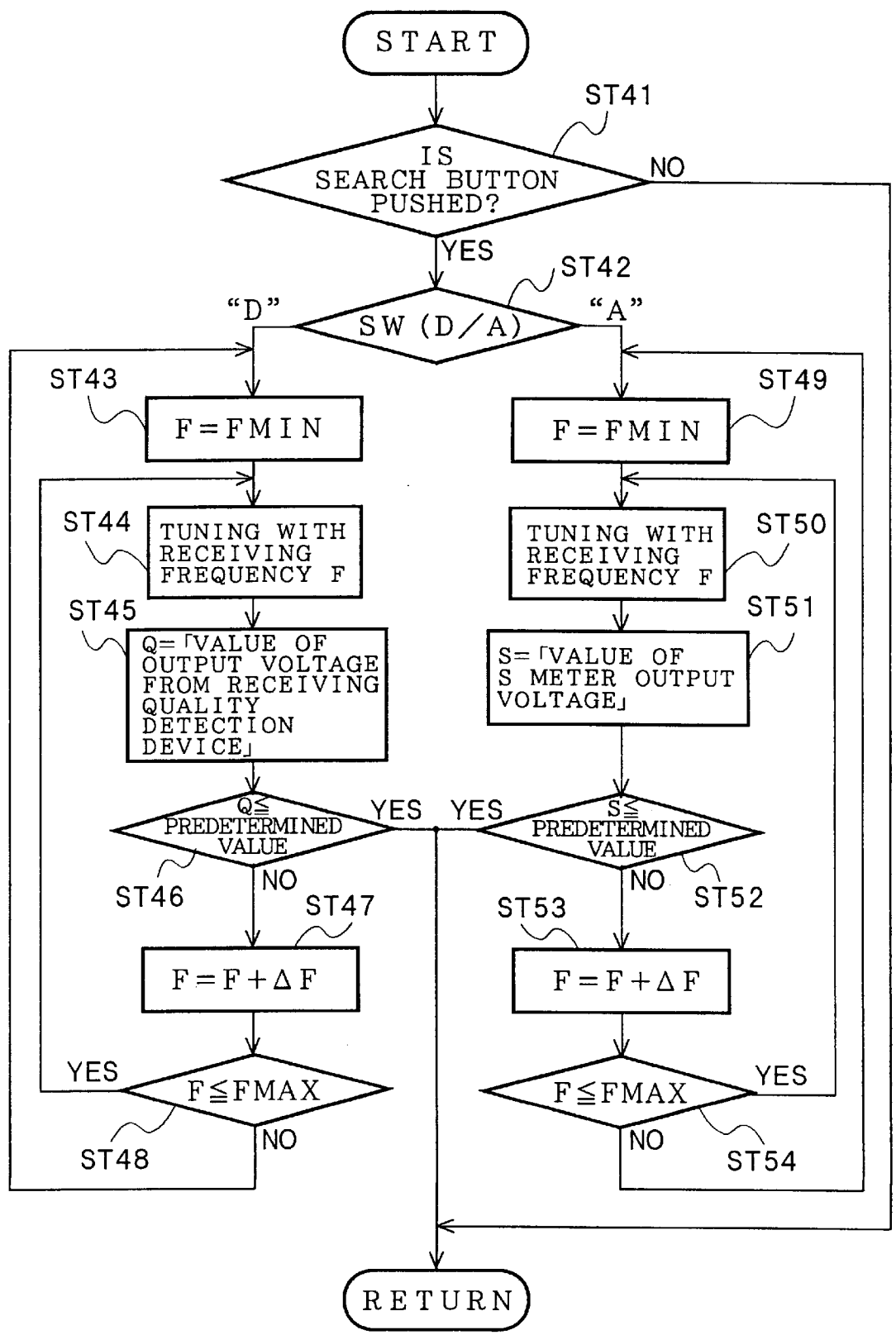
FIG. 25 is a flow chart showing an operation of a control section in the digital receiver of the embodiment 7 according to the present invention.

FIG. 25 is a flow chart showing another operational sequence of the control section 11 in the digital receiver 800 of embodiment 7 shown in FIG. 19.

The control section 11 judges whether or not the searching button 87 is pushed (step TS41). The control section 11 judges whether the switch D in the switch section 86 is pushed or the switch A is pushed when the searching button is pushed (step ST42). When the switch D is pushed, the minimum frequency in the FM broadcast frequency band is stored into the variable F (step ST43), and the received frequency is tuned by the frequency in the variable F (step ST44), and then an output voltage value of the receiving quality detection device is stored as the variable Q (step ST45). When the value in the variable Q is not more than a predetermined value (step ST46), the operation flow will go to the next step under the condition that the received frequency is tuned by the frequency in the variable F.

On the other hand, when the value of the variable Q is more than a predetermined value (step ST46), the frequency value stored as the variable F is updated with a new value which is obtained by adding the variable F with the frequency interval F that indicates the adjacent FM broadcast frequencies (step ST47). Then, when the frequency in the variable F is not more than the frequency Fmax, the operation flow is returned to step ST44, and the operations will be repeated by using the updated frequency value stored as the variable F.

On the other hand, when the frequency in the variable F is more than the frequency Fmax, the operation flow is returned to step ST43 because the frequency value in the variable F is over the FM broadcast frequency band. Next, the minimum frequency Fmin is set to the variable F, and then the operations described above are repeated.

The button A in the switch section 86 is pushed (step ST42), the minimum frequency Fmin is set into the variable F (step ST49), the received frequency is tuned by the frequency in the variable F (step ST50), the output voltage value of the S meter is set as the variable S (step ST51).

Next, when the value stored in the variable S is not more than a predetermined value (step ST52), the operation flow will go to next step under the condition that the received frequency is tuned by the frequency stored in the variable F.

On the other hand, when the value stored in the variable S is more than a predetermined value (step ST52), the frequency value in the variable F is updated with a new value which is obtained by adding the variable F with the frequency interval F that indicates the adjacent FM broadcast frequencies (step ST53).

Next, when the frequency value F is not more than the Fmax, the operation flow is returned to step ST50 (step ST54) and then the operations described above are repeated by using the updated frequency.

On the other hand, when the value in the variable F is more than the Fmax (step ST54), namely the scanning operation for scanning the FM broadcast band is completed, the operation flow is returned to the step ST49. Then the minimum frequency Fmin is set into the variable F and the operation steps described above are repeated.

Figure 26:
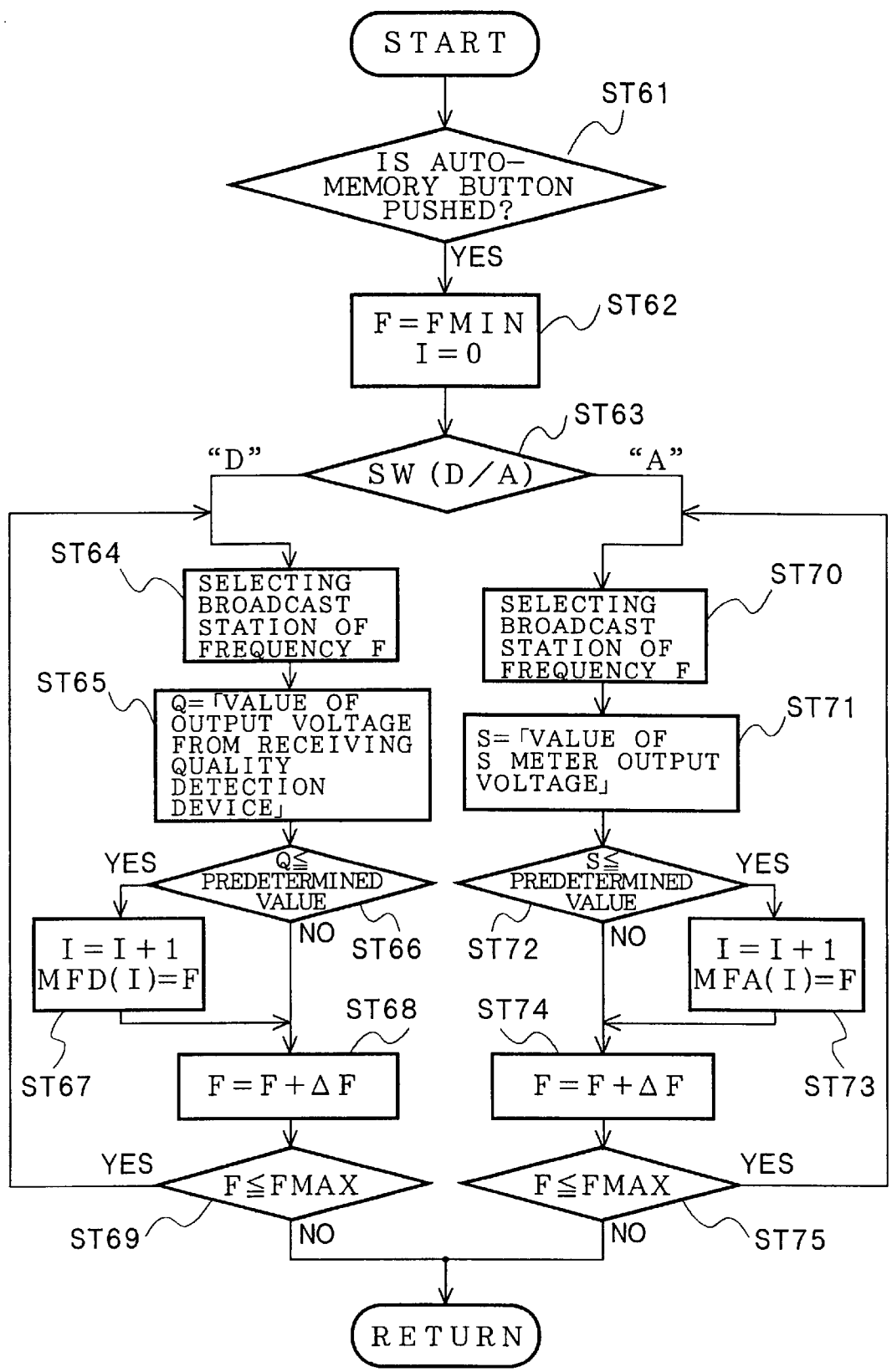
FIG. 26 is a flow chart showing an operation of a control section in the digital receiver of the embodiment 7 according to the present invention.

FIG. 26 is a flow chart showing another operation of the control section 11 in the digital receiver 800 of embodiment 7 shown in FIG. 19.

The control section 11 judges whether or not the automatic memory button 88 as shown in FIG. 24 is pushed (step ST61). When the button 88 is pushed (YES), the minimum frequency Fmin in the FM broadcast frequency band is set as the variable F and the zero is set as the variable I (step ST62). Next, the control section 11 judges whether the button D is pushed or the button A is pushed in the selection section 86 shown in FIG. 24 (step ST63). When the button D is pushed, the received frequency is tuned by the frequency stored variable F, the output voltage value from the receiving quality detection device is stored as the variable Q (step ST65). Next, when the value in the variable Q is not more than a predetermined value (step ST66), the variable I is updated by 1 and the value of the variable F is stored in a non-volatile memory storage MF(I) (step ST67).

In step ST68, the frequency value stored in the variable F is updated with a new value which is obtained by adding the variable F with the frequency interval F that indicates the adjacent FM broadcast frequencies (step ST68).

Next, when the frequency value F is not more than the Fmax, the operation flow is returned to step ST64 and then the operations described above are repeated by using the updated frequency stored in the variable F. Then, when the frequency in the variable F is not more than the frequency Fmax, namely in the case of YES, the operation flow is returned to step ST64, and the operations are repeated by using the updated frequency value stored in the variable F.

In addition, when the frequency in the variable F is more than the frequency Fmax, namely in the case of NO, in step ST69, namely the scanning operation for scanning the FM broadcast band is completed, the operation flow will go to the next steps.

When the button A is pushed or selected in step TS63, the received frequency is tuned by the frequency in the variable F (step ST70), the output voltage value of the S meter is set as the variable S (step ST71).

Next, when the value stored in the variable S is not more than a predetermined value (step ST72), the variable I is updated by 1 and the value of the variable F is stored in a non-volatile memory storage MFA(I) (step ST73).

Then, in step ST74, the frequency value as the variable F is updated with a new value which is obtained by adding the variable F with the frequency interval F that indicates the adjacent FM broadcast frequencies. When the frequency in the variable F is not more than the frequency Fmax, namely in the case of YES, the operation flow is returned to step ST70, and the operation flow is repeated using the updated frequency value stored in the variable F.

In addition, when the frequency in the variable F is more than the frequency Fmax, namely in the case of NO, in step ST69, namely the scanning operation for scanning the FM broadcast band is completed, the operation flow will go to the next steps.

Figure 27:
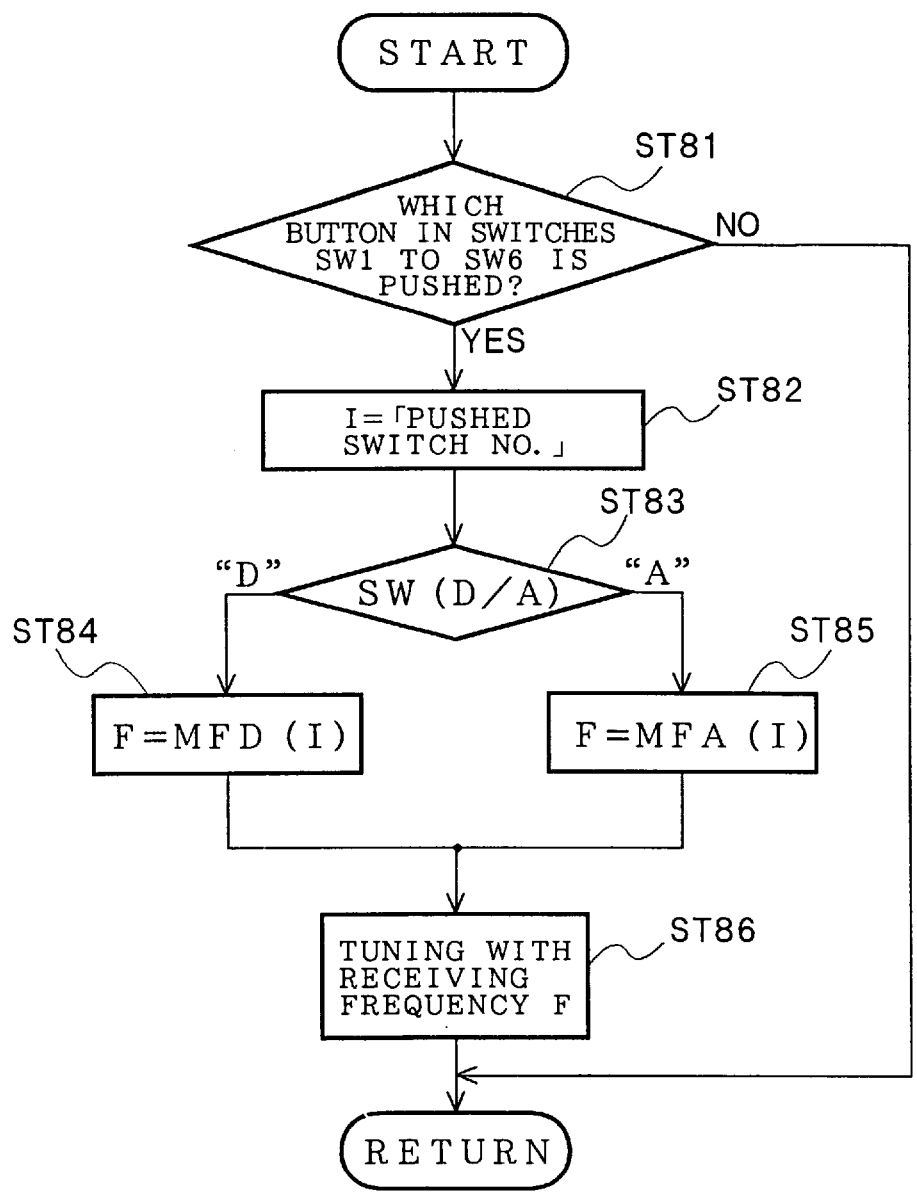
FIG. 27 is a flow chart showing an operation of a control section in the digital receiver of the embodiment 7 according to the present invention.

FIG. 27 is a flow chart showing another operation of the control section 11 in the digital receiver 800 of embodiment 7 as shown in FIG. 19.

Firstly, the control section 11 judges whether or not the buttons 1 to 6 designated by reference number 89 shown in FIG. 24 are pushed (step ST81). When one of the buttons 1 to 6 is pushed by an operator, the button number is stored as the variable I (step ST82). Next, the control section 11 judges whether the button A is pushed or the button D in the select section 86 is pushed (step ST84).

When the button D is pushed, the frequency stored in the non-volatile memory storage MFD(I) is stored as the variable F, the frequency of the variable F is tuned (step ST86), and the operation flow proceeds to the following steps.

On the other hand, when the button A is pushed in step ST83, the frequency stored in the non-volatile memory storage MFA(I) is stored as the variable F (step ST85), the received frequency is tuned by the frequency of the variable F (step ST86), and the operation flow proceeds to the following steps.

EMBODIMENT 8

Figure 28:
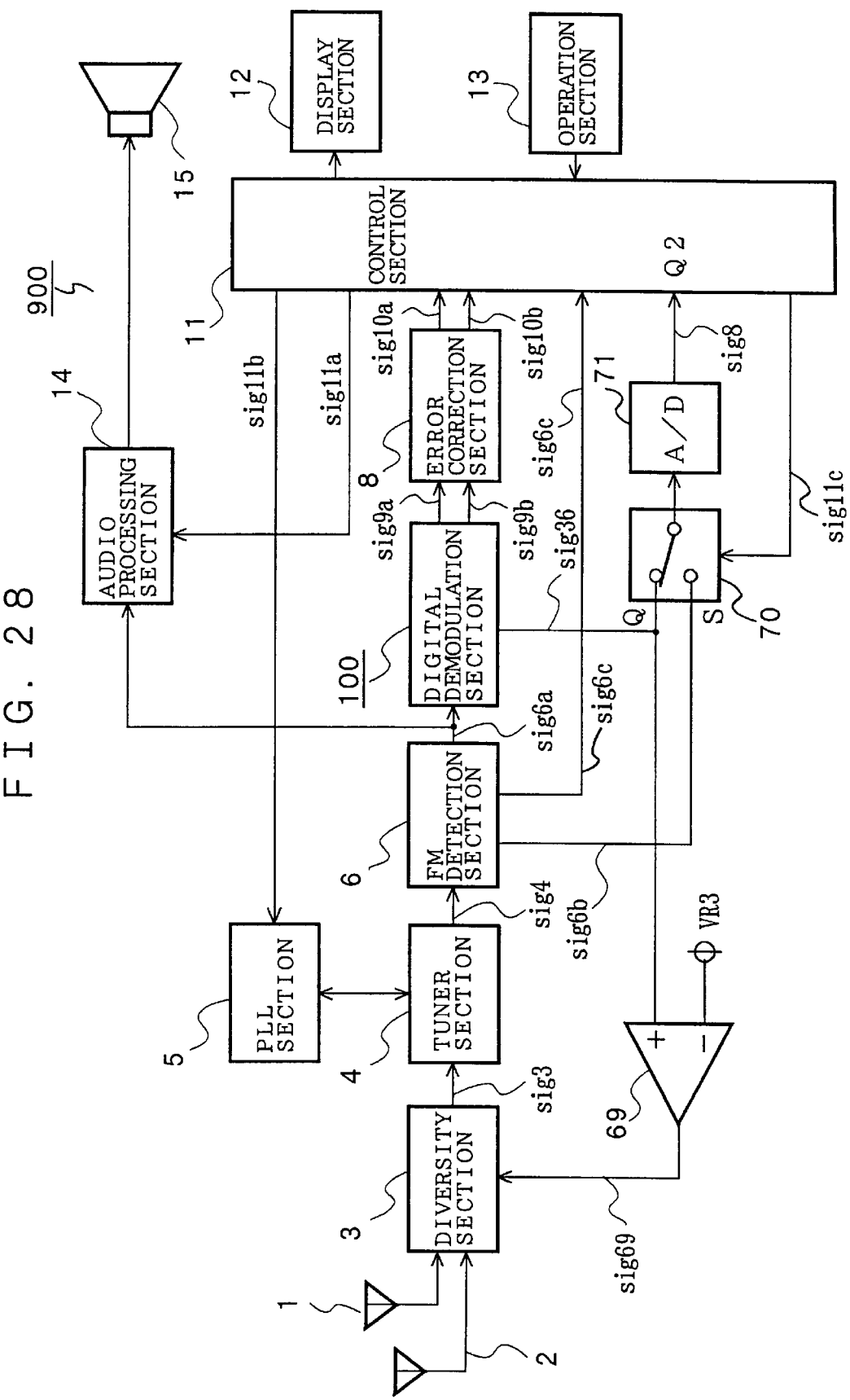
FIG. 28 is a block diagram showing a configuration of a digital receiver as a preferred embodiment 8 according to the present invention.

FIG. 28 is a configuration diagram showing a configuration of the digital receiver 900 of embodiment 8 according to the present invention.

In the digital receiver 900 shown in FIG. 28, components which are the same components in the embodiments 1 to 6 described above are designated by the same reference numbers and explanation thereof is omitted.

In the digital receiver 900 having the configuration shown in FIG. 28, reference number 70 designates a selection device for selecting the S meter signal (sig6b) transmitted from the FM detection section 6 and the received signal quality signal (for example sig36) transmitted from the digital demodulation section 7 based on the control signal (sig11c) transmitted from the control section 11.

Figure 29:
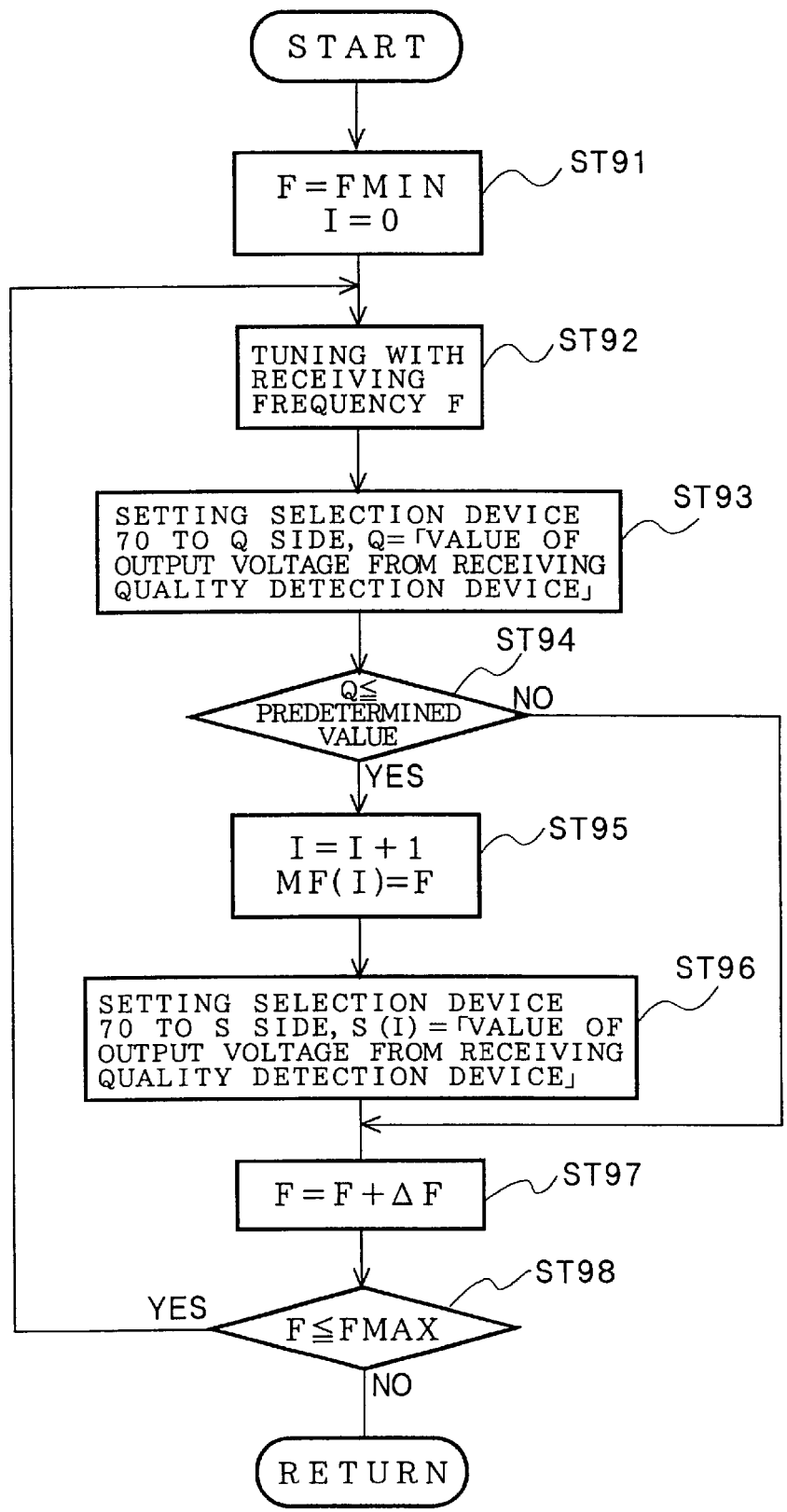
FIG. 29 is a flow chart showing an operation of a control section in the digital receiver of the embodiment 8 according to the present invention.

The operation of the digital receiver 900 of the embodiment 8 shown in FIG. 28 will be explained with reference to the flow chart shown in FIG. 29.

Firstly, the minimum frequency Fmin in the FM broadcast frequency band is stored as the variable F and zero is set as the variable I (step ST91).

The received frequency is tuned by the frequency F (step ST92). The control section 11 indicates to select the switch Q side to the selection device 70, and then the output voltage value from the receiving quality detection device is stored as the variable Q (step ST93). When the value of the variable Q is not more than a predetermined value (step ST94), the variable I is updated by 1 and the value of the variable F is stored in the non-volatile memory storage MF(I) (step ST95). The control section 11 indicates to select the switch S side to the selection device 70. Then, the S meter output voltage value is stored into the non-volatile memory storage S(I), as a memory arrangement, (step ST96).

Then, in step ST97, the frequency value in the variable F is updated with a new value which is obtained by adding the variable F with the frequency interval F that indicates the adjacent FM broadcast frequencies. Then the frequency in the variable F is not more than the frequency Fmax (Fmax is the maximum frequency in the FM broadcast frequency band) (step ST98), the operation flow is returned to step ST92, and the operations will be repeated by using the updated frequency value stored as the variable F.

On the other hand, in step ST98, when the frequency in the variable F is more than the frequency Fmax in step ST69, namely the scanning operation for scanning the FM broadcast band is completed, the operation flow will proceeds to the next steps.

EMBODIMENT 9

Figure 30:
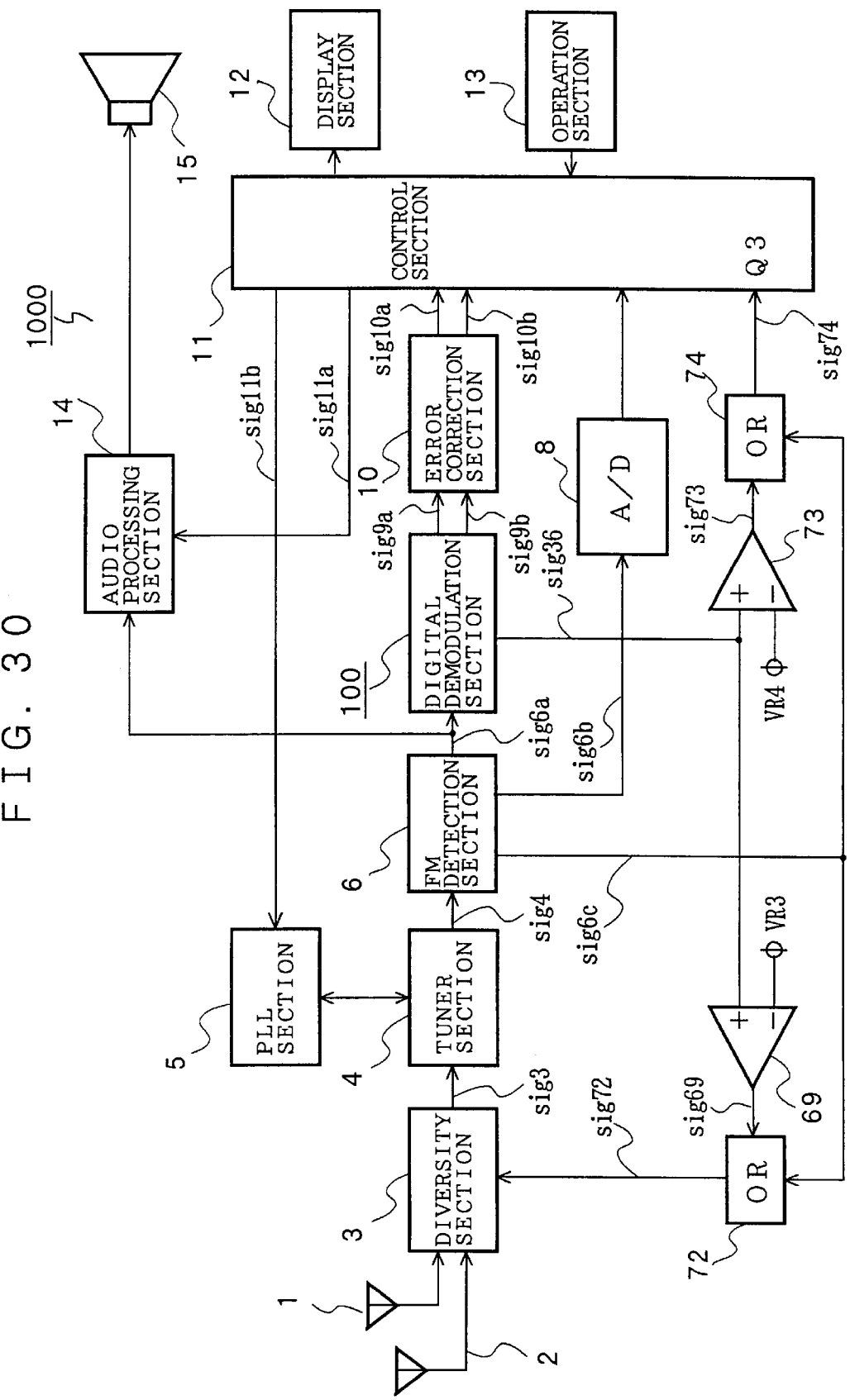
FIG. 30 is a block diagram showing a configuration of a digital receiver as a preferred embodiment 9 according to the present invention.

FIG. 30 is a configuration diagram showing a configuration of a digital receiver 1000 of embodiment 9 according to the present invention.

In the digital receiver 1000 shown in FIG. 30, components which are the same components in the embodiments 1 to 8 described above are designated by the same reference numbers and explanation thereof is omitted.

In the digital receiver 1000 having the configuration shown in FIG. 30, reference number 72 designates a logical AND device for performing a logical AND operation between the output from the comparator 69 and the stop signal (sig6c) as the output from the FM detection device 6 and for generating the result of the logical AND operation.

Reference number 73 denotes a comparator for comparing the smoothed output voltage value (sig9d) from the receiving quality detection device in the digital demodulation section 100 with the reference voltage VR4 and for generating the comparison result. Reference number 74 denotes a logical AND device for performing a logical AND operation between the output from the comparator 73 and the stop signal from the FM detection section 6 and for generating the result of the logical AND operation.

Next, the operation of the digital receiver 1000 having the configuration shown in FIG. 30 will now be explained.

Figure 31:
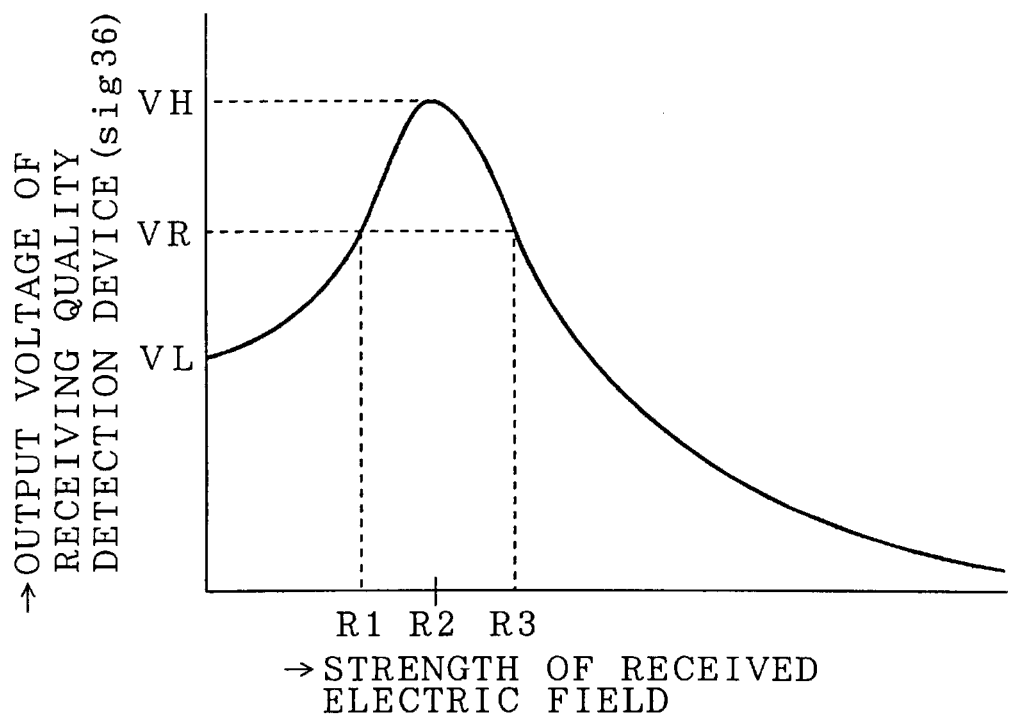
FIG. 31 is a diagram showing characteristics of the value of an output voltage of a receiving quality detection device corresponding to the strength of a received electric field in the digital demodulation section in the digital receiver shown in FIG. 30.
Figure 32:
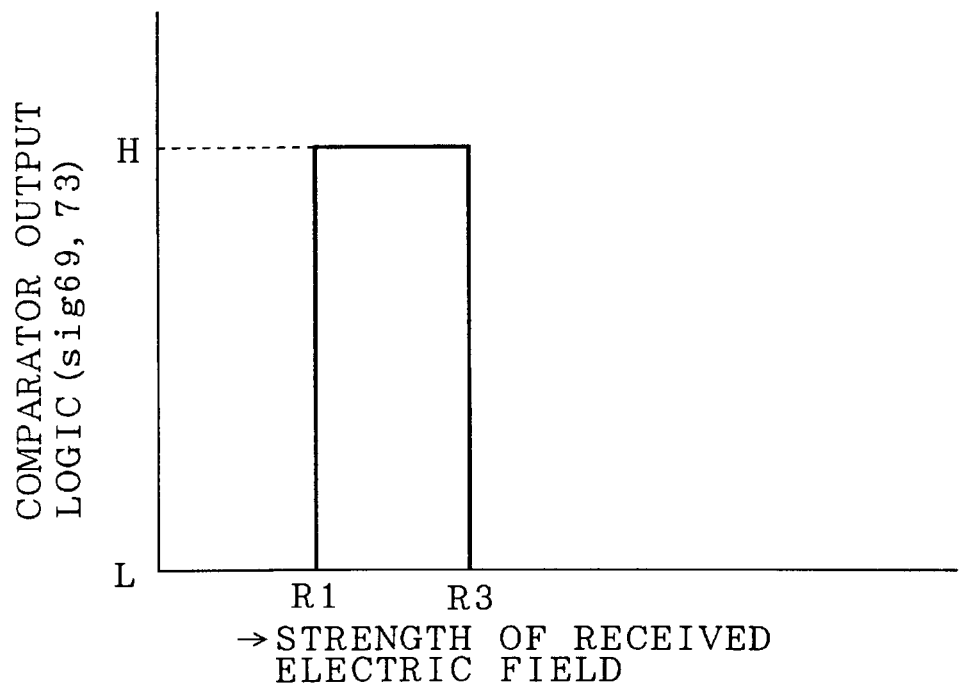
FIG. 32 is a diagram showing characteristics of an output logical value as a comparison result between the strength of a receiving electric field and an output voltage value from the receiving quality detection device executed by a comparator.

Because the smoothed output signal transmitted from the receiving quality detection device in the digital demodulation section 100 has the characteristics as shown in FIG. 31, and because the output signals from the comparators 69 and 73 have the characteristics as shown in FIG. 32 under the condition that it is required to select the comparing voltage VR3 from the comparator 63 and comparing voltage of the comparator 73 in the voltage range from VL to VH, there may be a case that it is difficult to perform a correct detection by using the smoothed signal from the receiving quality detection device when the strength of the electric field of the received signal is very weak.

Figure 33:
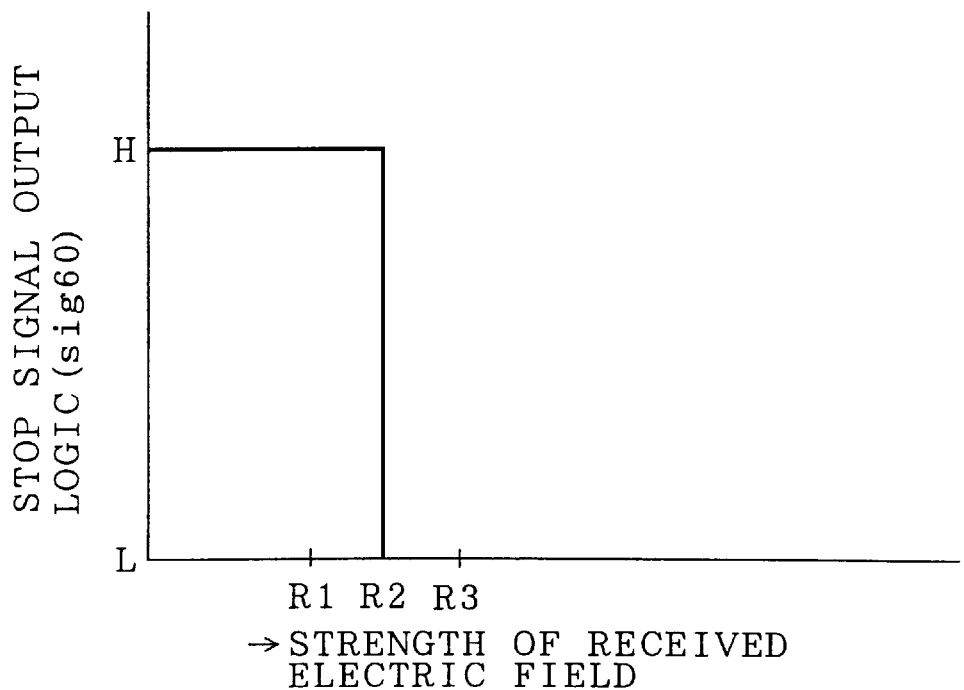
FIG. 33 is a diagram showing characteristics of a stop signal corresponding to the strength of a receiving electric field.
Figure 34:
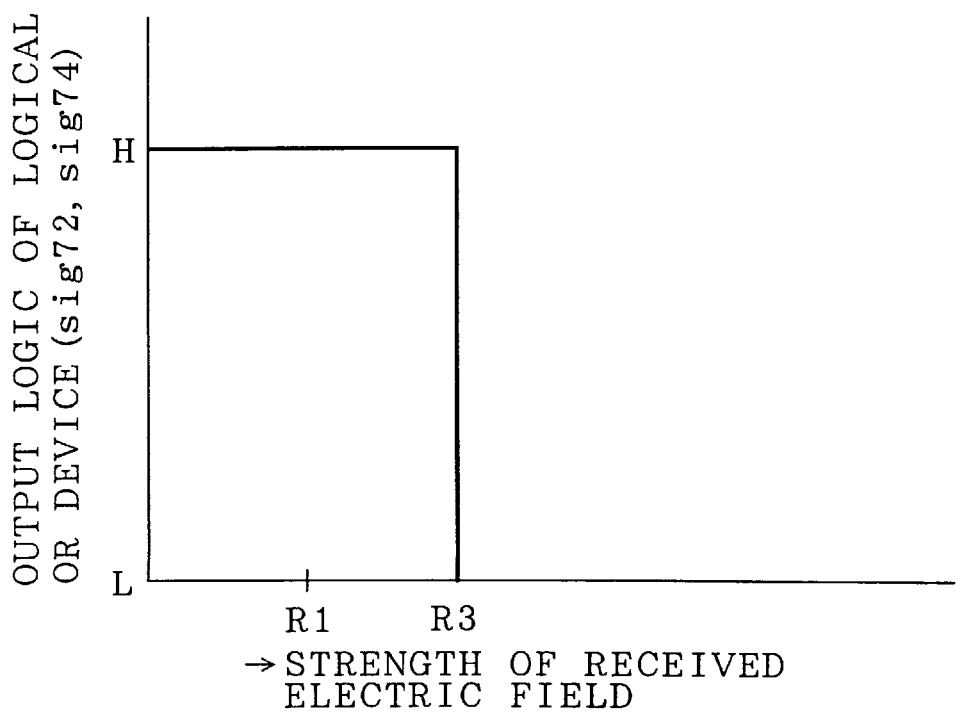
FIG. 34 is a diagram showing characteristics of the result of a logical AND operation between a stop signal and an output voltage value from a receiving quality detection device corresponding to a received electric field.

When the stop signal output transmitted from the FM detection section 6 has the characteristics shown in FIG. 33, the result of the logical OR operation between the outputs from the comparators 69 and 70 and the stop signal resembles the curve in FIG. 34. The correct detection operation can be performed even if the strength of the electric field of the received signal is very week when the diversity section 3 is controlled by using the output signal from the logical AND device 72 as the result of the logical AND operation.

In embodiment 9 of the present invention, the diversity section 3 is controlled by using the output signal (sig72) from the logical AND device 72 and the output signal (sig74) from the logical AND device 74 is transmitted to the port Q3 in the control section 11.

Figure 35:
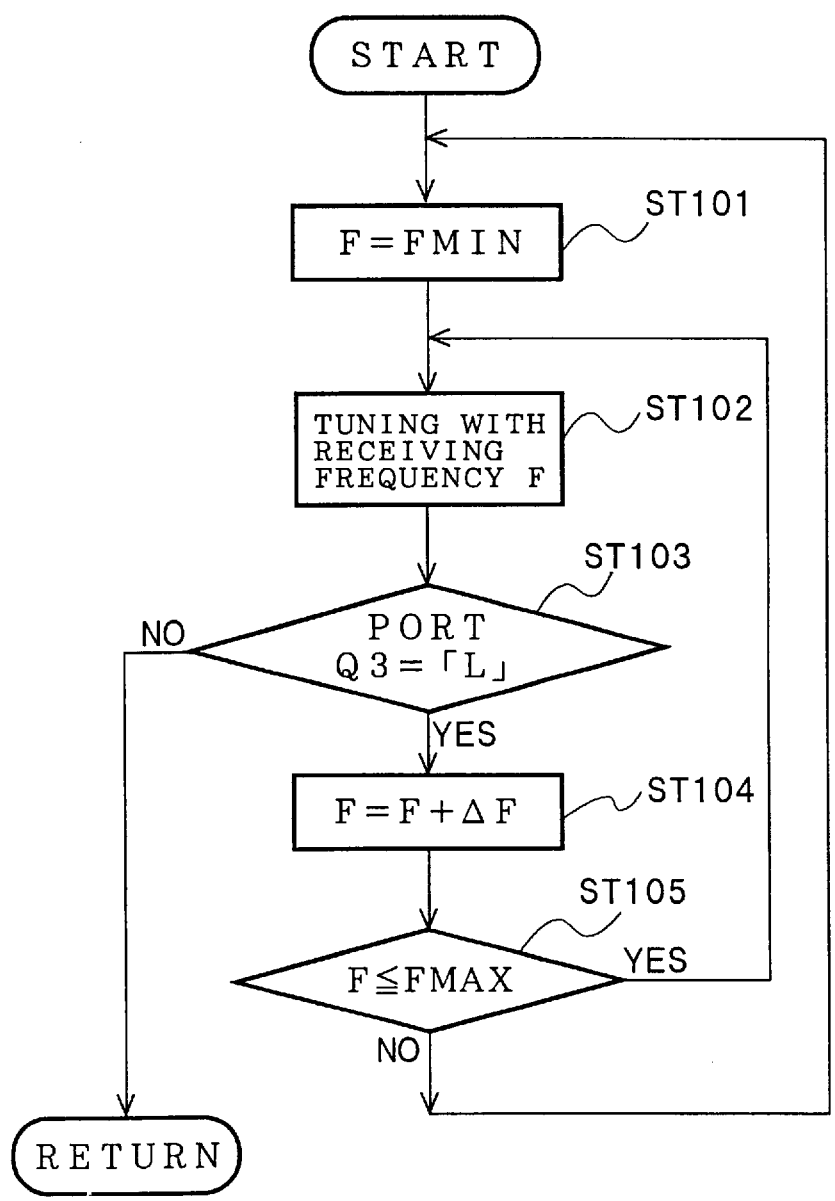
FIG. 35 is a flow chart showing an operation of a control section in a digital receiver as the embodiment 9 according to the present invention, as shown in FIG. 30.

Next, the operation of the digital receiver 1000 shown in FIG. 30 will be explained with reference to the flow chart shown in FIG. 35.

Firstly, the minimum frequency in the FM broadcast frequency band is stored as the variable F (step SET) and the received frequency is tuned by using the frequency in the variable F (step ST102).

When the port Q3 receives the output signal (sig74) having the positive logical state (step ST103), the operation flow will go to the next step. On the other hand, when the port Q3 receives the output signal (sig74) having the negative logical state (step ST103), the frequency value in the variable F is updated with a new value which is obtained by adding the variable F with the frequency interval F that indicates the adjacent FM broadcast frequencies (step ST104). When the frequency in the variable F is not more than the frequency Fmax (Fmax is the maximum frequency in the FM broadcast frequency band) (step ST105), the operation flow is returned to step ST102, and the operations will be repeated by using the updated frequency value stored in the variable F.

In addition, when the frequency in the variable F is more than the frequency Fmax, namely in the case of NO in step ST105, because the frequency value stored in the variable F is over the maximum frequency of the FM broadcast band, the operation flow is returned to the step ST101. In step ST101, the variable F is updated by the frequency Fmin. Next, the operation described above will be repeated. An operator can start these operations described above. These operations can also be commenced automatically.

EMBODIMENT 10

Figure 36:
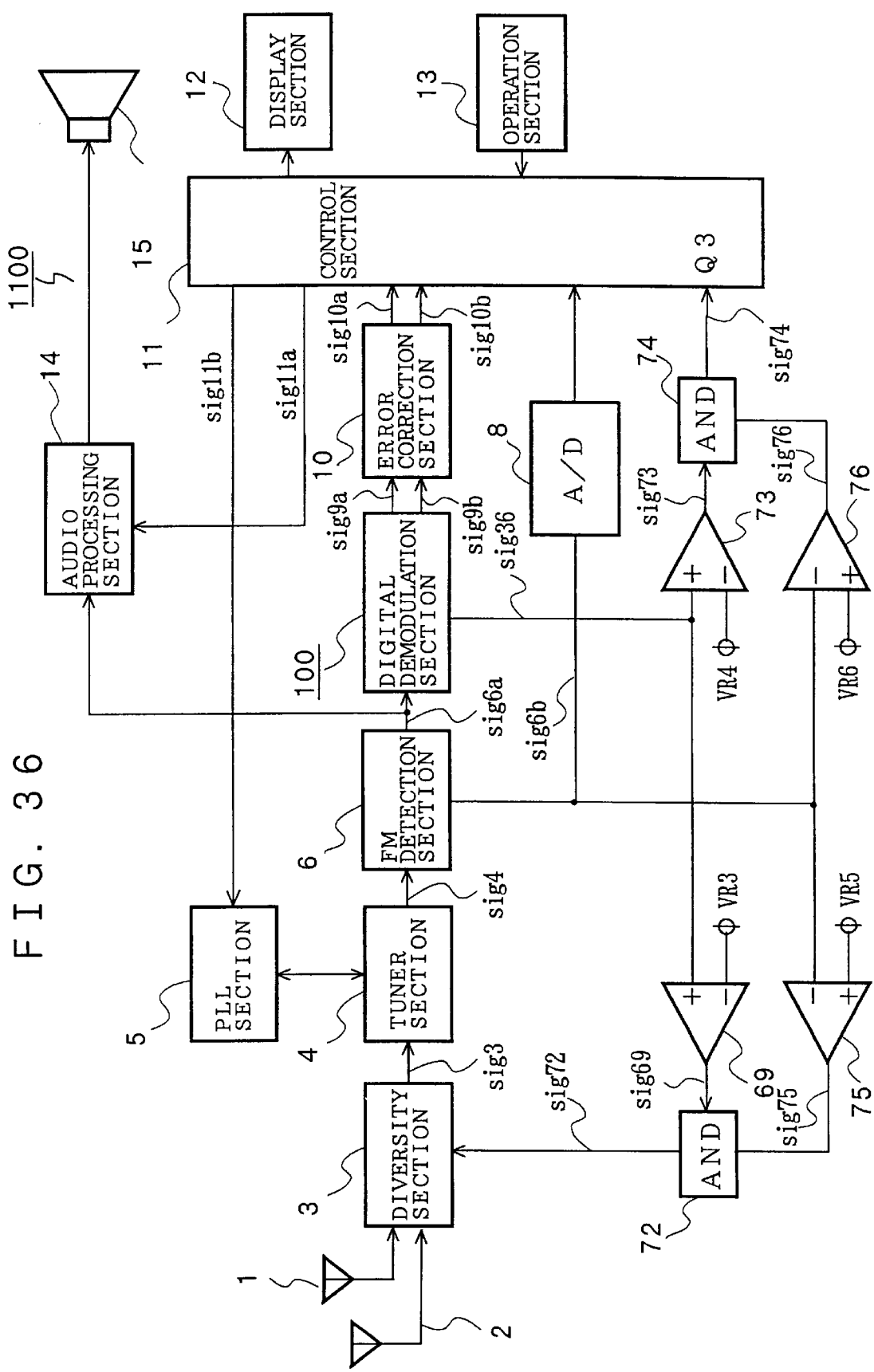
FIG. 36 is a block diagram showing a configuration of a digital receiver as a preferred embodiment 10 according to the present invention.

FIG. 36 is a configuration diagram showing a configuration of a digital receiver 1100 of embodiment 10 according to the present invention.

In the digital receiver 1100 shown in FIG. 36, components which are the same components in the embodiments 1 to 9 described above are designated by the same reference numbers and explanation thereof is omitted.

In the digital receiver 1100 having the configuration shown in FIG. 36, reference number 75 designates a comparator for comparing the S meter signal as the output from the FM detection section 6 with a reference voltage VR5 and for generating the comparison result and a reference number 76 denotes a comparator for comparing the S meter signal with a reference voltage VR6 and for generating the comparison result.

The operation of the digital receiver 1100 of the embodiment 10 shown in FIG. 36 will be explained.

The smoothed output from the receiving quality detection device in the digital demodulation section 100 has the characteristics shown in FIG. 31.

In a case that it is required to select the reference voltages VR3 and VR4 for the comparators 69 and 73 in the range from the Vl to VH, as shown in FIG. 31, the outputs from the comparators 69 and 73 have the characteristics shown in FIG. 32. Accordingly, there may be a case that it is difficult to perform a correct detection by using the smoothed signal from the receiving quality detection device when the strength of the electric field of the received signal is week.

When the compared output transmitted from the comparator 75 which compares the S meter signal (sig6b) with the reference voltage VR5 and the compared output transmitted from the comparator 76 which compares the S meter signal (sig6b) with the reference voltage VR6 have the characteristics shown in FIG. 33, the result output (sig72) of the logical AND operation between the output signals (sig69 and sig75) from the comparators 69 and 75 and between the output signals (sig73 and sig76) from the comparators 73 and 76 have the characteristics shown in FIG. 34, respectively. The correct detection operation can be performed even if the strength of the electric field of the received signal is very weak by using the logical AND output (sig72 and sig74) from the logical AND device 72 and the 74.

In the embodiment 10 shown in FIG. 36, the diversity section 3 is controlled by using the output signal transmitted from the logical AND device 72, and the output signal from the logical AND device 74 is transmitted to the port Q3 in the control section 11. Thus, as described above in detail, the digital receiver 1100 has the same function of the digital receiver 1000 of embodiment 9 as shown in FIG. 30.

EMBODIMENT 11

Figure 37:
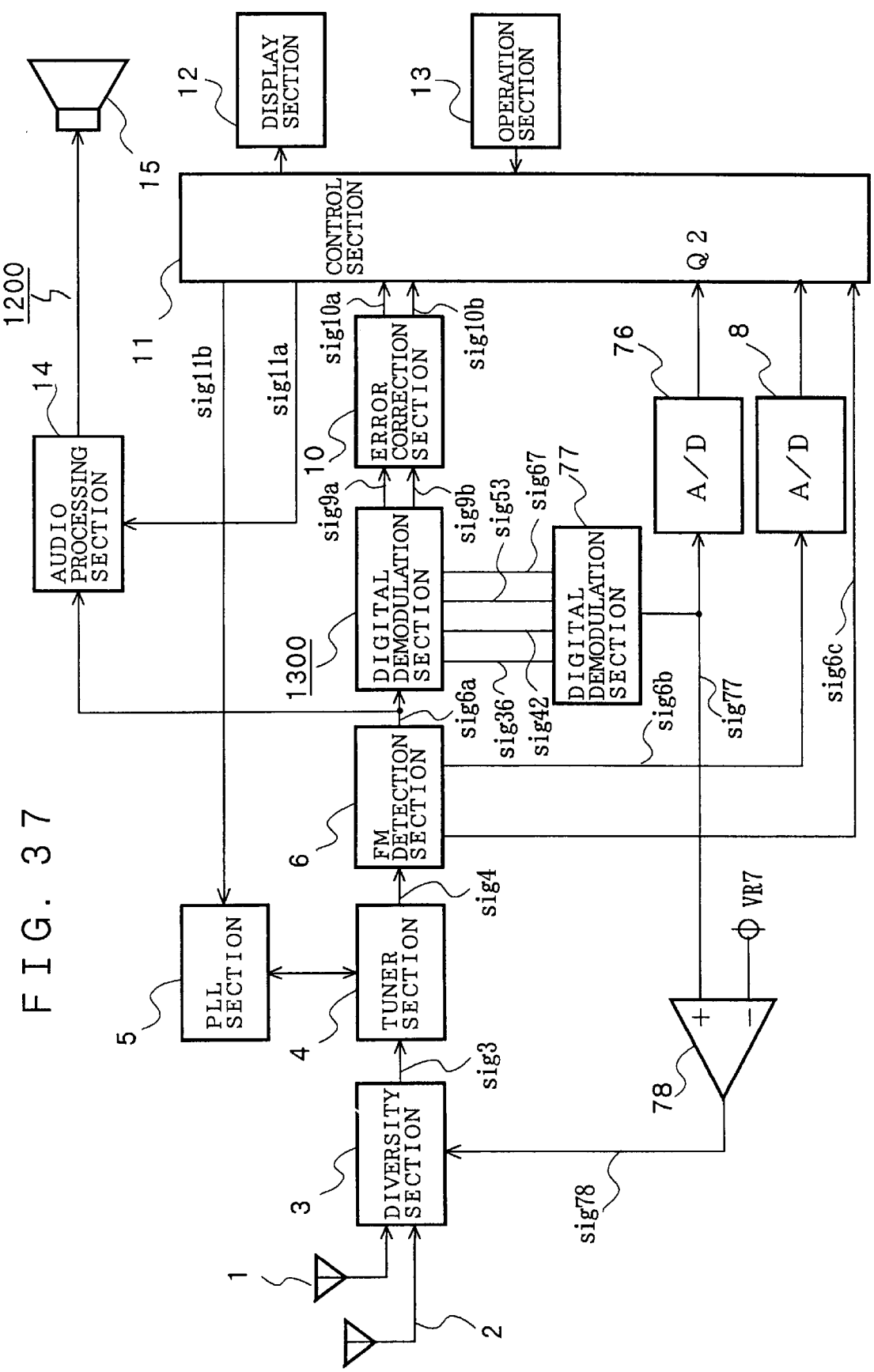
FIG. 37 is a block diagram showing a configuration of a digital receiver as a preferred embodiment 11 according to the present invention.

FIG. 37 is a configuration diagram showing a configuration of a digital receiver 1200 of an embodiment 11 according to the present invention.

In the digital receiver 1200 shown in FIG. 37, components which are the same components in the embodiments 1 to 10 described above are designated by the same reference numbers and explanation thereof is omitted.

Figure 38:
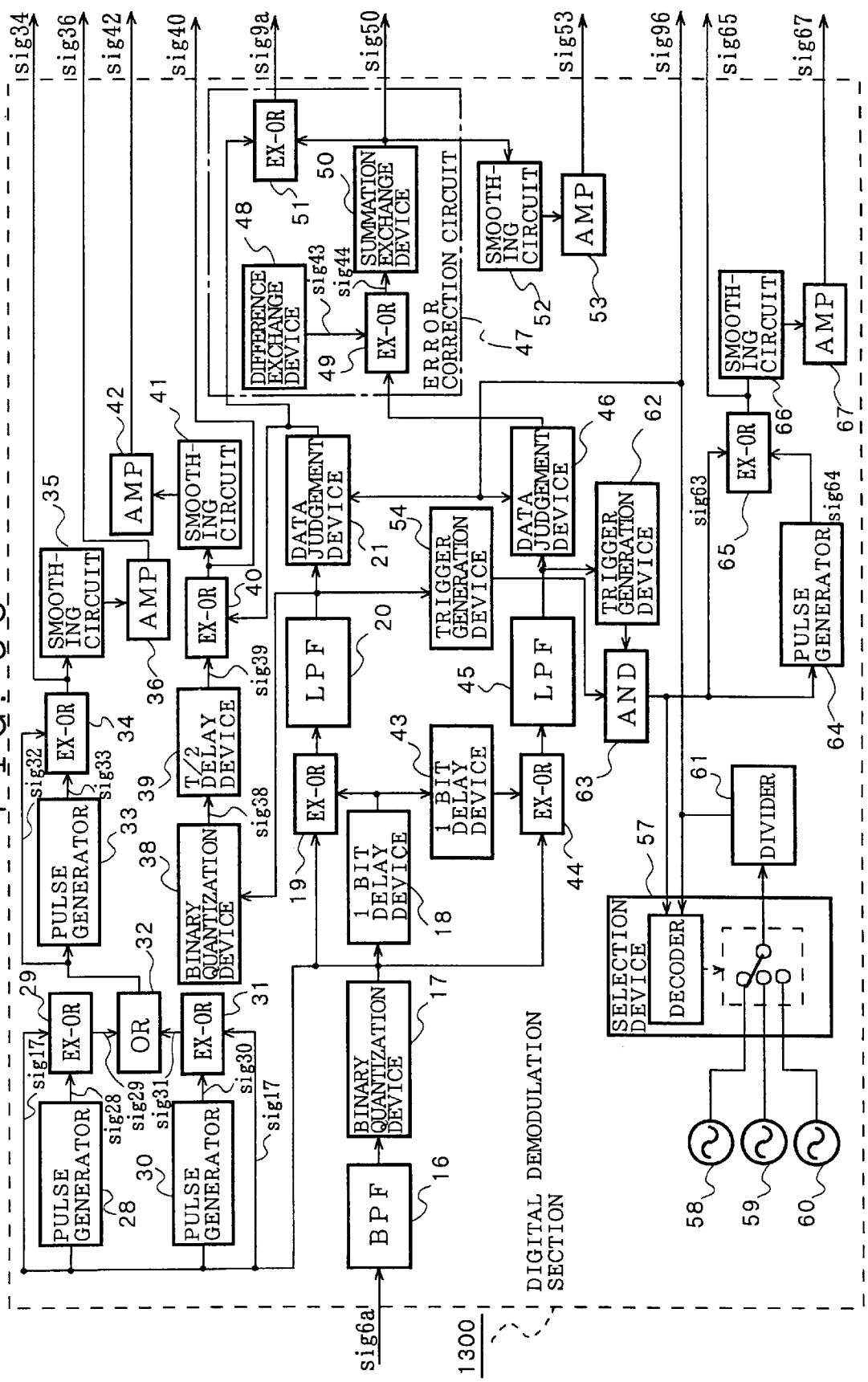
FIG. 38 is a block diagram showing a configuration of a digital demodulation section in the digital receiver as the preferred embodiment 11 according to the present invention.

In the digital receiver 1200 having the configuration shown in FIG. 37, a reference number 77 designates a digital detection demodulation section having a function for synthesizing a plurality of smoothed outputs (sig36, sig42, sig53, sig67) from the digital demodulation section 1300. FIG. 38 shows an example of the digital demodulation section 1300 for generating the plurality of the smoothed outputs (sig36, sig42, sig53, and sig67).

FIG. 38 is a block diagram showing a configuration diagram showing a configuration of the digital demodulation section 1300.

The configuration of the digital demodulation section 1300 of the embodiment shown in FIG. 38 has the configuration of the digital demodulation section 100 of the embodiment 1 shown in FIG. 1, the configuration of the digital demodulation section 400 of the embodiment 3 shown in FIG. 400, the configuration of the digital demodulation section 500 of the embodiment 4 shown in FIG. 11, and the configuration of the digital demodulation section 700 of the embodiment 6 shown in FIG. 18 described above. Therefore the detailed explanation of the digital demodulation section 1300 is omitted here.

The digital demodulation section 1300 shown in FIG. 38 transmits the plurality of the smoothed output signals (sig36, sig42, sig53, and sig67) to the digital detection demodulation section 77 in the digital receiver 1200 shown in FIG. 37.

Next, the operation of the digital receiver 1200 will now be explained.

Because the four smoothed output signals from the digital demodulation section 1300 shown in FIG. 38 are the same characteristics, the entire output characteristics is defined as:

$$sig77 = W1 \times sig36 + W2 \times sig42 + W3 \times sig53 + W4 \times sig67.$$

Thereby, the diversity section 3 is controlled by using the comparing output signal obtained by the comparing operation between the output signal (sig77) and the reference voltage VR7. The control section 11 receives the A/D converted signal from the A/D conversion device 76. Therefore by using the A/D converted signal, the control section 11 can perform more accurately control than only by using the smoothed signal.

EMBODIMENT 12

Figure 39:
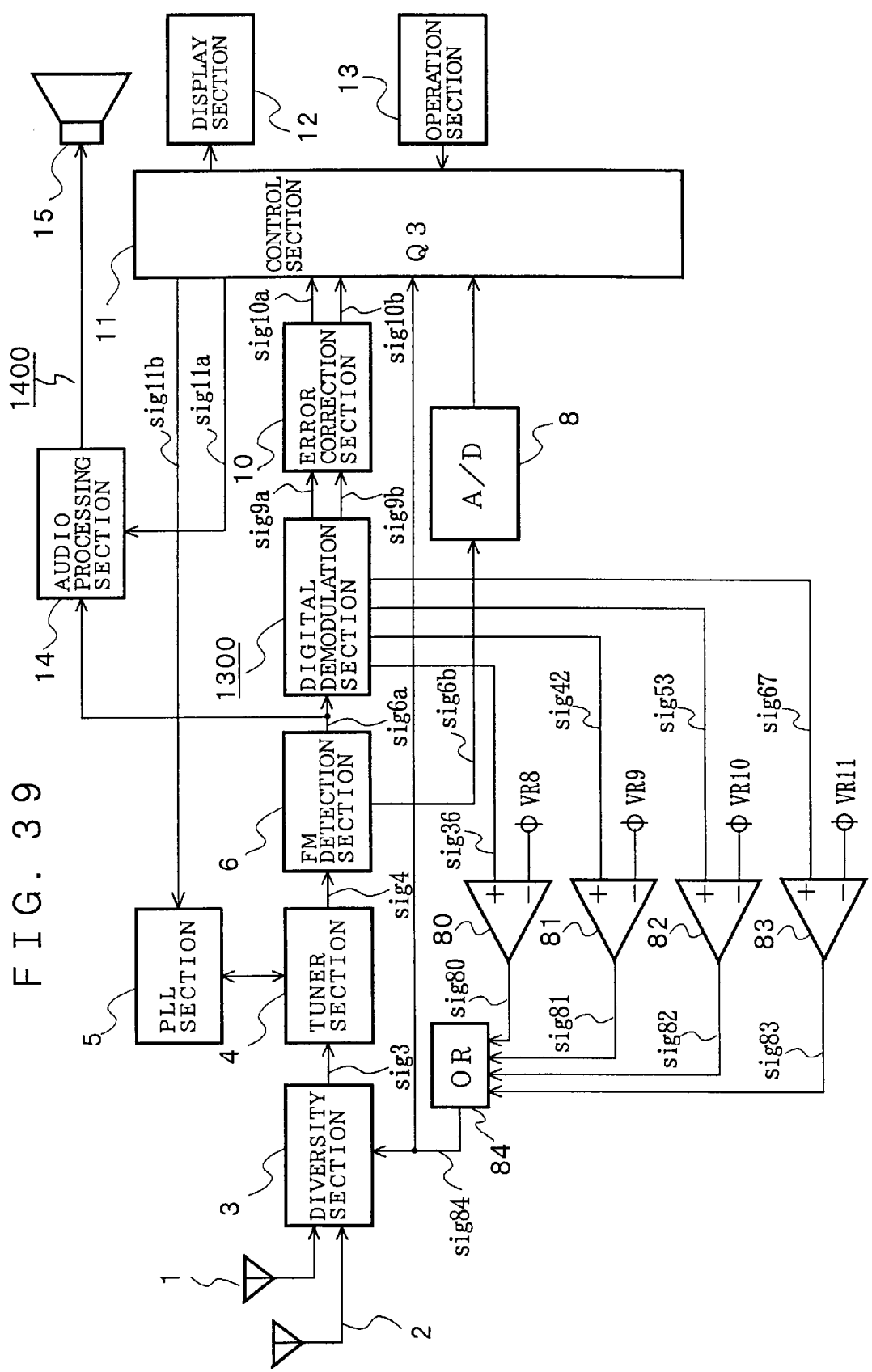
FIG. 39 is block diagram showing a configuration of a digital receiver as a preferred embodiment 12 according to the present invention.

FIG. 39 is a configuration diagram showing a configuration of a digital receiver 1400 of embodiment 12 according to the present invention. The digital receiver 1400 of this embodiment 12 includes the digital demodulation section 1300 shown in FIG. 38.

In the digital receiver 1400 shown in FIG. 39, components which are the same components in the embodiments 1 to 11 described above are designated by the same reference numbers and explanation thereof is omitted.

In the digital receiver 1400 shown in FIG. 39, reference number 80 designates a comparator for comparing the smoothed output (sig36) from the receiving quality detection device in the digital demodulation device 1300 and the reference voltage VR8 and for generating the comparison result, reference number 81 denotes a comparator for comparing the smoothed output signal (sig42) with the reference voltage VR9 and for generating the comparison result, reference number 82 denotes a comparator for comparing the smoothed output signal (sig53) with the reference voltage VR10 and for generating the comparison result, and reference number 83 denotes a comparator for comparing the smoothed output signal (sig67) with the reference voltage VR11 and for generating the comparison result. Reference number 84 designates a logical OR device for performing the logical OR operation among the comparison result outputs from the comparators 80 to 83.

Next, the operation of the digital receiver 1400 having the configuration shown in FIG. 39 will be explained.

The comparators 80 to 83 compares the smoothed signals (sig36, sig42, sig53, and sig67) with the reference voltages VR8 to VR11. Each comparator 80 to 83 is designed to generate the signal (sig80 to sig83) of the negative logical state when the receiving state is good, and to generate the signal (sig80 to sig83) of the positive logical state when the receiving state is poor. The diversity section 3 receives the result of the logical OR operation among the comparison result outputs (sig80 to sig83) executed by the logical OR device 84. The diversity section 3 is controlled by using the result of the logical OR operation to control the diversity section 3.

In addition, the result signal of the logical OR operation executed by the logical OR device 84 is transmitted to the port Q3 in the control section 11. Then, the control section 11 performs the desired processes by using this result signal from the logical OR device 84. Therefore by using the result signal, the control section 11 can perform more accurately control than only by using the smoothed signal from the receiving quality detection device.

Moreover, in the digital receiver 1400 of the embodiment 12, the comparators 80 to 83 for controlling the diversity section 3 are also used as comparison device through which the signals to control the operation of the control section 11 are transmitted to the control section 11. Thus, by setting the value of each of the reference voltages VR8 to VR11 to a voltage value which may be commonly used for a plurality of devices and systems, the circuit scale of a system such as the digital receiver of the present invention can be reduced.

In addition, in embodiments 1 to 12 according to the present invention, we explain the configurations and the operations of the digital FM multiplex broadcast receiver. However, the scope of the present invention is not limited to these embodiments. The present invention can be applicable to a general purposed receiver for receiving and processing a data signal which has been modulated into a digital signal form.

As clearly shown and explained in detail, in the digital receiver according to the present invention, received digital modulated signal and a detection output signal are converted into a binary signal in a digital form and the receiving quality of the received signal is detected by the receiving quality detection device in the digital demodulation section in the digital receiver based on the wave-form of this binary signal. Thereby, the estimation for the receiving quality of the received signal can be performed.

In addition, the digital receiver in another preferred embodiment of the present invention includes the receiving quality detection device for estimating the receiving quality of received data based on the pulse width of the error signal obtained by comparing the error signal, which is obtained for comparing the wave-form of the binary code signal of a received digital modulated signal with the first and second pulse wave-forms, with the wave-form of a predetermined third pulse wave-form. Thereby, the estimation for the receiving quality of the received signal can be performed.

Further, the digital receiver in another preferred embodiment of the present invention includes the receiving quality detection device for estimating the receiving quality of received data based on the pulse width of error signal obtained by comparing the binary wave-form of the detection output signal and the digital demodulated wave-form of a signal which is judged based on a synchronous clock signal. Thereby, the estimation for the receiving quality of the received signal can be performed.

Moreover, the digital receiver in another preferred embodiment of the present invention has the receiving quality detection device for estimating the receiving quality of received data based on the number of error correction pulses in the error correction means using the 2 bit delay detection operation. Thereby, the estimation for the receiving quality of the received signal can be performed.

Furthermore, the digital receiver in another preferred embodiment of the present invention has the synchronous clock reproduction device for switching oscillators based on a trigger signal obtained by the wave-form of a detection output signal and a synchronous clock signal. Thereby, a rapid and accurate synchronous clock signal can be obtained.

Moreover, the digital receiver in another preferred embodiment of the present invention has the synchronous clock reproduction device for switching oscillators based on the result of a logical AND operation of a trigger signals, obtained by the detection output wave-forms of first and second detection devices, and the synchronous clock signal. Thereby, a rapidly and accurate synchronous clock can be obtained and erroneous synchronous operation can be prevented.

In addition, the digital receiver in another preferred embodiment of the present invention has the stop circuit for stopping the synchronous scanning operation of the synchronous clock reproduction device based on the output signal from the receiving quality detection device. Therefore, erroneous synchronous operation can be prevented.

Moreover, the digital receiver in another preferred embodiment of the present invention has the first and second trigger generation devices for generating trigger signals based on the detection output wave-form from the first and second detection devices. The receiving quality detection device estimates the receiving quality of the received data while the output signals from the first and second trigger generation devices are generated at the same time. Thereby, the estimation for the receiving quality of the received signal can be performed.

Furthermore, the digital receiver in another preferred embodiment of the present invention has the diversity circuit for switching and synthesizing received output signals from antennas based on the output signal from the receiving quality detection device. Thereby, the diversity control operation can be performed with high accuracy.

Moreover, the digital receiver in another preferred embodiment of the present invention has the display section for displaying the receiving state of the received signal based on the output signal from the receiving quality detection device. Thereby, an operator can know the receiving state of the received signal.

In addition, in the digital receiver in another preferred embodiment of the present invention, a broadcast frequency which can be received is automatically selected based on the output signal from the receiving quality detection device. Thereby, the automatic selecting operation for FM broadcast stations which can be received is rapidly performed without selecting of FM broadcast station which cannot be received.

Further, the digital receiver in another preferred embodiment of the present invention can store the frequency which can be received into a memory and not store a frequency which cannot be received. Thereby, the automatic memory storing operation for storing only the frequency which may be received, namely automatic memory storing operation (automemory operation) can be performed immediately.

Furthermore, the digital receiver is another preferred embodiment of the present invention stores a frequency which can be received based on the output signal from the receiving quality detection device and the intensity of the receiving electric field of this frequency. Thereby, in a relay tuning operation for scanning another frequency when the receiving state of the current frequency becomes poor, it can be performed to search the frequency which can be received and the electric field strength of this frequency. In addition, because the frequency which can be received is stored in the memory, the frequency for the tuning operation can be selected by using the stored frequency even if the receiving state of the current frequency becomes poor. Therefore a rapid relay tuning operation for the frequency which will be received can be performed smoothly.

Furthermore, the digital receiver is another preferred embodiment of the present invention has the function for selecting at will one of the frequencies stored in a memory based on the receiving quality detection device and the frequency stored in the memory based on the strength of the receiving electric field. Thereby, an operator can select either the regular FM broadcast or the multiplex broadcast based on his request. The frequency is transmitting information which the operator can be optionally select.

Moreover, the digital receiver in another preferred embodiment of the present invention has the function for optionally switching one of the automatic broadcast frequency selection functions based on the output signal from the receiving quality detection device and based on the intensity of the receiving electric field of the received signal. Thereby, the automatic broadcast selection function is selected based on the intensity signal of the receiving electric field of the received signal when an operator wants to select the regular FM broadcast and the automatic broadcast selection function is selected based on the output signal from the receiving quality detection device when an operator wants to select the multiplex broadcasting. The frequency which is the transmitting information which the operator wants can be optionally selected.

Furthermore, the digital receiver in another preferred embodiment of the present invention has the function for optionally switching one of the automatic broadcast frequency selection functions based on the output signal from the receiving quality detection device and the automatic broadcast frequency selection function based on the intensity of the receiving electric field of the received signal. Thereby, the memory storing function for storing the frequency of the regular FM broadcasting based on the intensity of the receiving electric field of the received signal when an operator wants to automatically store the frequency of the regular FM broadcasting. On the other hand, the memory storing function for storing the frequency of the multiplex broadcasting when an operator wants to automatically store the frequency of the multiplex broadcasting. The frequency which is the transmitting information to which the operator wants can be automatically stored.

Moreover, the digital receiver in another preferred embodiment of the present invention includes the switch circuit for switching the output signal from the receiving quality detection device and the receiving electric field intensity signal or the stop signal. Thereby, the device and circuit of the present invention can be incorporated into a digital receiver without adding another input port.

Furthermore, the digital receiver in another preferred embodiment of the present invention performs predetermined processes based on the output signal from the receiving quality detection device and the receiving electric field intensity signal or the stop signal. Thereby, the estimation for the receiving quality of the received signal can be performed with high accuracy.

Moreover, the digital receiver in another preferred embodiment of the present invention has the smoothing circuit for smoothing the output signal from the receiving quality detection device. Thereby, the quality of the received signal can be represented by a voltage value, like the case of the receiving electric field intensity signal and the stop signal. Therefore the system control operation based on the quality of received signal can be easily performed.

Furthermore, the digital receiver in another preferred embodiment of the present invention has the configuration in which predetermined processes are performed based on the synthesizing output signal among the output signals from the plurality of the receiving quality detection devices. Thereby, the estimation for the receiving quality of the received signal can be performed with high accuracy.

Moreover, the digital receiver in another preferred embodiment of the present invention has the comparators for comparing the plurality of output signal from the plurality of receiving quality detection devices with the plurality of reference voltages. In addition, the logical OR operation is performed by the logical OR device among the comparison signals from the plurality of comparators and the result of the logical OR operation is transmitted to the control section in addition to the diversity section, thereby the high accuracy control operation can be executed. Further, because the reference voltages are commonly used for plurality of systems and devices in the digital receiver, the circuit scale can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital receiver comprising:
    a receiving section for receiving a digital modulated signal which has been modulated in digital form;
    a digital demodulation section for judging a logical state of a detection output signal which is obtained by performing a digital detection operation for said received digital modulated signal, for demodulating the received digital modulated signal, and for generating a data signal, said digital demodulation section including:
        binary conversion means for converting the received digital modulated signal into a binary signal; and
        a receiving quality detection device for detecting a receiving quality of the data signal based on a waveform of the binary signal.

2. A digital receiver comprising:
    a receiving section for receiving a digital modulated signal which has been modulated in digital form;
    a digital demodulation section for judging a logical state of a detection output signal which is obtained by performing a digital detection operation for said received digital modulated signal, for demodulating the received digital modulated signal, and for generating a data signal, said digital demodulation section including:
        binary conversion means for converting the received digital modulated signal into a binary signal; and
        a receiving quality detection device for detecting a receiving quality of the data signal based on a waveform of the binary signal; and
    pulse generation means for generating a first pulse having a time width which is obtained by subtracting a positive pulse width of the waveform of the binary signal from a first time width, a second pulse having a time width which is obtained by subtracting a negative pulse width of the waveform of the binary signal from a second time width, and a third pulse having a time width which is obtained by subtracting the time widths of the first and second pulses from a third time width,
    wherein said digital receiver estimates the receiving quality of the data signal based on the pulse widths of the first, second, and third pulses generated by said pulse generation means.

3. A digital receiver comprising:

a receiving section for receiving a digital modulated signal which has been modulated in digital form;

a digital demodulation section for judging a logical state of a detection output signal which is obtained by performing a digital detection operation for said received digital modulated signal, for demodulating the received digital modulated signal, and for generating a data signal, said digital demodulation section including:

binary conversion means for converting the received digital modulated signal into a binary signal; and waveform shift means for shifting said binary signal of the received digital modulated signal in phase;

a data judgement device for judging a state of the detection output signal based on a synchronous clock signal; and logical exclusive OR means for performing a logical exclusive OR operation on of a waveform output from said data judgement device and a waveform output from said wave-form shift means, wherein said digital receiver estimates the receiving quality of the data signal based on a pulse width of an output signal from said logical exclusive OR means.

4. A digital receiver comprising:

a receiving section for receiving a digital modulated signal which has been modulated in digital form;

a digital demodulation section for judging a logical state of a detection output signal which is obtained by performing a digital detection operation for said received digital modulated signal, for demodulating the received digital modulated signal, and for generating a data signal, said digital demodulation section including:

binary conversion means for converting the received digital modulated signal into a binary signal; and a smoothing circuit for smoothing an output signal from a receiving quality detection device; and an amplifier device for amplifying the smoothed signal from said smoothing circuit, wherein said digital receiver performs predetermined processes based on the smoothed signal from said smoothing circuit and based on the amplified signal from said amplifier device.

5. A digital receiver comprising:

a receiving section for receiving a digital modulated signal which has been modulated in digital form;

a digital demodulation section for judging a logical state of a detection output signal which is obtained by performing a digital detection operation for said received digital modulated signal, for demodulating the received digital modulated signal, and for generating a data signal, said digital demodulation section including:

binary conversion means for converting the received digital modulated signal into a binary signal; and a receiving quality detection device for detecting a receiving quality of the data signal based on a waveform of the binary signal; and a plurality of said receiving quality detection devices, wherein said digital receiver synthesizes output signals from said plurality of receiving quality detection devices and performs predetermined operations based on a result of the synthesizing operation.

6. A digital receiver comprising:

a receiving section for receiving a digital modulated signal which has been modulated in digital form;

a digital demodulation section for judging a logical state of a detection output signal which is obtained by performing a digital detection operation for said received digital modulated signal, for demodulating the received digital modulated signal, and for generating a data signal, said digital demodulation section including:

binary conversion means for converting the received digital modulated signal into a binary signal; and a receiving quality detection device for detecting a receiving quality of the data signal based on a waveform of the binary signal; and a plurality of comparators for comparing output signals from a plurality of receiving quality detection devices with a plurality of reference voltages; and logical OR means for performing a logical OR operation on comparing results output from said plurality of comparators, wherein an output from said logical OR means is output to a diversity section and a control section.

7. The digital receiver of claim 1, further comprising:

diversity means for selecting and synthesizing received outputs from a plurality of antennas based on an output signal from said receiving quality detection device.

8. The digital receiver of claim 1, further comprising:

display means for displaying a receiving state of the data signal based on an output signal from said receiving quality detection device.

9. The digital receiver of claim 1, further comprising:

a control section for selecting a receiving frequency based on an output signal from said receiving quality detection device.

10. A digital receiver comprising:

a receiving section for receiving a digital modulated signal which has been modulated in digital form;

a digital demodulation section for ludging a logical state of a detection output signal which is obtained bv performing a digital detection operation for said received digital modulated signal, for demodulating the received digital modulated signal, and for generating a data signal, said digital demodulation section including:

binary conversion means for converting the received digital modulated signal into a binary signal; and a receiving quality detection device for detecting a receiving quality of the data signal based on a waveform of the binary signal; and a Frequency Modulation (FM) detection section for generating a stop signal used for stopping a scanning operation of a receiving electric field strength signal and a frequency, which are outputs from a smoothed signal of an intermediate frequency signal;

switching means for switching between an output signal from said receiving quality detection device and the receiving electric field strength signal or the stop signal; and a control section for controlling a switching operation of said switching means.

11. The digital receiver of claim 1, further comprising:

a control section for selecting a receiving frequency based on an output signal from said receiving quality detection device and for storing the selected receiving frequency in a memory.

12. A digital receiver comprising:
a receiving section for receiving a digital modulated signal which has been modulated in digital form;
a digital demodulation section for judging a logical state of a detection output signal which is obtained by performing a digital detection operation for said received digital modulated signal, for demodulating the received digital modulated signal, and for generating a data signal, said digital demodulation section including:
  binary conversion means for converting the received digital modulated signal into a binary signal; and
  a receiving quality detection device for detecting a receiving quality of the data signal based on a waveform of the binary signal; and
a control section for selecting a receiving frequency based on an output signal from said receiving quality detection device and for storing the selected receiving frequency in a memory; and
wherein said control section performs predetermined processes based on the output signal from said receiving quality detection device and a receiving electric field strength signal and based on the output signal from said receiving quality detection device and the receiving electric field strength signal or a stop signal.

13. A digital receiver comprising:
a receiving section for receiving a digital modulated signal which has been modulated in digital form;
a digital demodulation section for detecting, judging, and demodulating the received digital modulated signal, and for generating a data signal, said digital demodulation section including,
  binary conversion means for converting the received digital modulated signal into a binary signal;
  a 2 bit delay detection section for delaying the received digital modulated signal by a 2 bit time period; and
  an error correction section for correcting an error code in the received digital modulated signal based on an output from said 2 bit delay detection section,
wherein said digital receiver estimates a receiving quality of the data signal based on a number of pulses from said error correction section within a predetermined time period.

14. The digital receiver of claim 13, wherein said digital demodulation section further includes,
a smoothing circuit for smoothing an output signal from a receiving quality detection device; and
an amplifier device for amplifying the smoothed signal from said smoothing circuit,
wherein said digital receiver performs predetermined processes based on the smoothed signal from said smoothing circuit and based on the amplified signal from said amplifier device.

15. A digital receiver comprising:
a receiving section for receiving a digital modulated signal which has been modulated in digital form;
a digital demodulation section for detecting, judging, and demodulating the received digital modulated signal, and for generating a data signal, said digital demodulation section including,
  detection means for detecting the received digital modulated signal;
  trigger generation means for generating a trigger signal based on a detection output signal;
  a plurality of oscillators, each generating a fixed frequency; and
  a synchronous clock reproduction device for generating a synchronous clock reproduction signal including,
    switch means for selecting one of said plurality of oscillators based on a high level and a low level of the synchronous clock reproduction signal while the trigger signal is being received; and
  a divider for dividing a frequency period of the synchronous clock reproduction signal based on one of said plurality of oscillators selected by said switch means.

16. The digital receiver of claim 15, wherein said detection means further includes first and second detection means for detecting the received digital modulated signal and for generating detection output signals,
said trigger generation means includes first and second trigger generation means for generating first and second trigger signals based on waveforms of the detection output signals, and
said switch means selecting one of said plurality of oscillators based on a high level and a low level of the synchronous clock reproduction signal while the first and second trigger signals are received at the same time; and a divider for dividing a frequency period of the synchronous clock reproduction signal based on one of said plurality of oscillators selected by said switch means.

17. The digital receiver of claim 16, wherein
said digital demodulation section further includes, binary conversion means for converting the digital modulated signal into a binary signal and a receiving quality detection device for detecting a quality of the data signal based on a waveform of the binary signal,
said synchronous clock reproduction device further including a stop circuit for stopping a synchronous scanning operation for the data signal based on an output signal from said receiving quality detection device.

18. The digital receiver of claim 15, wherein said digital demodulation section further includes,
a smoothing circuit for smoothing an output signal from a receiving quality detection device; and
an amplifier device for amplifying the smoothed signal from said smoothing circuit,
wherein said digital receiver performs predetermined processes based on the smoothed signal from said smoothing circuit and based on the amplified signal from said amplifier device.

19. A digital receiver comprising:
a receiving section for receiving a digital modulated signal which has been modulated in digital form;
a digital demodulation section for detecting, judging, and demodulating the received digital modulated signal, and for generating a data signal, said digital demodulation section further including,
  first and second detection means for detecting the received digital modulated signal and for generating detection output signals;
  first and second trigger generation means for generating first and second trigger signals based on waveforms of the detection output signals,
wherein said digital receiver perform predetermined processes while said first and second trigger means generate output signals at the same time.

20. The digital receiver of claim 19, wherein said digital demodulation section further includes,
a smoothing circuit for smoothing an output signal from a receiving quality detection device; and an amplifier device for amplifying the smoothed signal from said smoothing circuit, wherein said digital receiver performs predetermined processes based on the smoothed signal from said smoothing circuit and based on the amplified signal from said amplifier device.

* * * * *